US006859170B2

(12) United States Patent
Devereux et al.

(10) Patent No.: US 6,859,170 B2
(45) Date of Patent: Feb. 22, 2005

(54) EXTENDED KALMAN FILTER FOR AUTONOMOUS SATELLITE NAVIGATION SYSTEM

(75) Inventors: William S. Devereux, Glenwood, MD (US); Albert A. Chacos, Columbia, MD (US); Mark S. Asher, Ellicott City, MD (US); Dennis J. Duven, Silver Spring, MD (US); Thomas L. Kusterer, Elkridge, MD (US); Richard C. Morgan, Garrett Park, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/331,691

(22) Filed: Dec. 30, 2002

(65) Prior Publication Data

US 2003/0132878 A1 Jul. 17, 2003

Related U.S. Application Data

(62) Division of application No. 09/295,544, filed on Apr. 21, 1999, now Pat. No. 6,608,589.

(51) Int. Cl.[7] .................................................. G01S 5/14
(52) U.S. Cl. .................................. 342/357.06; 701/213
(58) Field of Search ...................... 342/357.06, 357.12; 701/13, 213

(56) References Cited

U.S. PATENT DOCUMENTS

| 5,192,957 | A | 3/1993 | Kennedy ..................... 342/357 |
| 5,546,309 | A | 8/1996 | Johnson et al. ............. 364/434 |
| 6,009,376 | A | 12/1999 | Brodie et al. ............... 701/226 |
| 6,069,583 | A | 5/2000 | Silvestrin et al. ...... 342/357.01 |
| 6,266,584 | B1 * | 7/2001 | Hur-Diaz et al. ............. 701/13 |

OTHER PUBLICATIONS

Upadhyay, T. et al, "Autonomous GPS/INS Navigation Experiment for Space Transfer Vehicle,", IEEE Trans. on Aerospace an Electronics Systems, vol. 29, No. 3, Jul. 1993. pp. 772–785.*
Hart, R. et al, "Global Positioning System (GPS) Enhanced Orbit Determination Experiment (GEODE) on the Small Satellite Technology Initiative (SSTI) Lewis Spacecraft," ION 1996, 10 pages.*
Hoech, Robert et al. "Design Capabilities and Performance of a Miniaturized Airborne GPS Receiver For Space Applications", Plans 1994. see entire document.
Braden, Kevin et al. Integrated Inertial Navigation System/Global Positioning System (INS/GPS) for Automatic Space Return Vehicle:. 9th proceeding of IEEE/AIAA/NASADigital Avionics System Conference. Oct. 1990. pp. 409–414. see entire document.
Meng, T.H. "Low–Power GPS Receiver Design," Oct. 1998, pp 1.
Marshall, B.. "A Low Cost Two Chip Solution for CPS Sensor Applications," 1997.
Mattos, P.G.. "WAAS/EGNOS–Ready 2–Chip GPS Chipset," 1996.
Soehren, W.A. "Ectos–Reusable Software for Navigation Guidance and Control Applications." 1996.

(List continued on next page.)

Primary Examiner—Gregory C. Issing
(74) Attorney, Agent, or Firm—Francis A. Cooch

(57) ABSTRACT

An autonomous navigation system for an orbital platform incorporating a global positioning system based navigation device optimized for low-Earth orbit and medium-Earth orbit applications including a 12 channel, GPS tracking application-specific integrated circuit (15) operating in concert with a computer system (90) implementing an extended Kalman filter and orbit propagator which autonomously generates estimates of position, velocity and time to enable planning, prediction and execution of event-based commanding of mission operations.

15 Claims, 19 Drawing Sheets

OTHER PUBLICATIONS

Upadhyay, Triveni et al. "Autonomous GPS/INS Navigation Experiment for Space Transfer Vehicle". IEEE Trans. on Aerospace and Electronic Systems, vol. 29, No. 3, Jul. 1993, pp. 772–785.

Frank, G. B. et al. "Collins Next Generation Digital GPS Receiver". 1990 Plans Mar. 1990. pp. 286–292.

Bauer, F.H. et al. "Spacebourne GPS Current Status and Future Visions". 1998. IEEE Aerospace Conf, Mar. 1998, pp. 195–208, vol. 3.

Dakermanji, G. et al. "The Thermosphere, Ionosphere, Mesophere Energetics and Dynamics (Timed) Spacecraft Power Systems"., Proceedings of the 32nd Intersociety Energy Conversion Engineering Conference, 1997 (IECEC–97), Jul. 1997, pp 544–549 vol. 1.

Unwin, Martin, "Results from the PoSat GPS Experiment". Position Location and Navigation Symposium, 1994, Apr. 1994, pp. 598–604.

Technology for Small Spacecraft. Chap 7, ppl 57–65, 1994, The Acadeny Oressm (http://www.nap.edu/openbook/039050758/htm/R1.html).

Felhauser, T. et al. "ASN–22 Combined GPS/Glonass Receiver Module". AION GPS–97, pp 1–18.

Lofgre, Jean Pierrre Utter,. "(S) GPS (Spaceborne) Global Positioning Systems". Spaceborne GPS Report to the Swedish Space Corporation [http://munin.irf.se/frames/technology_main_gps2.html]Aug. 30, 2001.

Data Reference Sheet AN4855, MITEL Semiconductor, GP2000 Receiver Hardware Design, pp. 1–53.

Data Reference Sheet DS4077, ZARLINK Semiconductor, GP2021 GPS 12–Channel Correlation pp. 1–63.

Evans, C. et al. "The Design and Analysis of Integrated Navigation Systems Using Real INS and GPS Data." Aerospace and Electronics conference, 1995. NAEC 1995, Proceedings of the (IEEE) 1995 National. pp. 22–26.

* cited by examiner

EXTENDED KALMAN FILTER FOR AUTONOMOUS SATELLITE NAVIGATION SYSTEM

CROSS-REFERENCE TO RELATED APPLICATION

This application is a division of prior filed U.S. application Ser. No. 09/295,544, filed Apr. 21, 1999 now U.S. Pat. No. 6,608,589.

STATEMENT OF GOVERNMENTAL INTEREST

The Government has rights in this invention pursuant to Contract No. NAS5-97271 awarded by the National Aeronautics and Space Administration.

BACKGROUND OF THE INVENTION

1. Field of the Invention

This invention relates to global positioning system based navigation techniques for developing position and velocity data required for autonomous operation of satellites incorporating on-board, event-based command systems.

2. Discussion of the Related Art

Spacecraft tracking and navigation began when The Johns Hopkins University Applied Physics Laboratory determined Sputnik's orbital parameters as a function of the doppler shift of an on-board radio beacon. That was in 1957. Soon thereafter, that organization devised and developed the Navy Transit Satellite Navigation System which provided global navigation services for the military and civilian community for over 35 years. The "TRANSIT" system used a network of low earth orbit satellites and therefore it was unacceptable for most spacecraft navigation applications.

A limited number of experimental systems developed by the Applied Physics Laboratory (APL), NASA and the U.S. Air Force provided semi-autonomous means for orbit determination and prediction. The experimental system provided ground-based orbit determination for spacecraft through the use of complex ground stations and coherent transponders that reside on the spacecraft to be tracked. The French National Space Agency has operated a similar system, DORIS, since the early 1990s. However, the high cost of operating such systems has forced spacecraft operators to find other tracking methods.

Over the last three decades, APL and other organizations have demonstrated the feasibility of using GPS for positioning satellites and other high dynamic platforms. For over 20 years, the APL developed SATRACK system has utilized GPS translators and ground-based signal processing systems for trajectory reconstruction and guidance system evaluation of Navy Trident missiles. The first GPS-based navigation of a satellite occurred on Transat, an APL spacecraft launched in 1978 and operated for over 10 years. Transat was a Transit navigation satellite with an on-board GPS translator.

Autonomous positioning of satellites using space borne GPS receivers was first demonstrated in the early 1980s when APL developed and flew four GPSPAC systems, and in the early to mid 1990s when NASA and the Jet Propulsion Laboratory used GPS receivers on the TOPEX/Poseidon spacecraft. More recently, other programs have adopted the use of GPS-based navigation systems for spacecraft. For instance, U.S. Pat. No. 5,109,346 for "Autonomous Spacecraft Navigation System" issued to J. Wertz on Apr. 28, 1992 describes a system using onboard observations of the earth, sun and moon to determine spacecraft attitude, instantaneous position and orbit based on multiple position estimates. Position and orbit data are derived by multiple deterministic solutions, including some that employ star sensors and gyros, and the multiple solutions are accumulated in a Kalman filter to provide continuous estimates of position and orbit for use when the sun or moon is not visible.

Developing totally autonomous satellites results in large cost savings because of the elimination of ground support stations. In addition, ground supported satellites are subject to ongoing maintenance costs and are prone to serious malfunction if ground support stations are damaged or if control signal transmissions are interfered with.

OBJECTIVES OF THE INVENTION

A primary objective of the present invention is to provide a satellite for collecting data which utilizes on-board event-based command techniques relying on a navigation system which uses an extended Kalman filter to process data derived from a plurality of global positioning satellites.

A further objective of the present invention is to provide an orbital platform for collecting data which utilizes an autonomous navigation system incorporating an application specific integrated circuit for processing signals from global positioning satellites in concert with an extended Kalman filter.

Another objective is to provide an autonomous, on-board, event-based command system responsive to a GPS based navigation system for controlling data collection functions on-board low-earth-orbit and medium-earth-orbit satellites.

A further objective of the invention is to provide an extended Kalman filter combined with an application specific integrated circuit for determining continuous real time earth-sun vector data, from a GPS constellation comprised of at least four satellites.

A still further objective is to provide an autonomous navigation system whose primary input data is derived from at least four satellites of a GPS constellation.

An objective of the invention is to provide an extended Kalman filter for interpreting data, from a GPS constellation comprised of at least four satellites and predicting ground contact event times therefrom.

Another objective is to provide an application specific integrated circuit for processing data required for tracking global positioning system satellites.

A further objective of the invention is to provide an extended Kalman filter combined with an application specific integrated circuit for interpreting data, from a GPS constellation comprised of at least four satellites, as continuous real-time orbital platform position and velocity.

A still further objective of the invention is to provide an extended Kalman filter combined with an application specific integrated circuit for propagating state vectors to allow estimating future orbital platform position from a GPS constellation comprised of at least four satellites.

SUMMARY OF THE INVENTION

The primary purpose of the present invention is to provide an autonomous navigation system for satellites to be employed in NASA's Solar Terrestrial Probe Program for measuring Thermosphere, Ionosphere, Mesosphere, Energetics, and Dynamics (TIMED). The TIMED program is a remote atmospheric remote sensing mission to study the interaction of the Sun and Earth's atmosphere. This spacecraft serves as an orbital platform for four instruments that measure the basic state parameters and energy balance of the mesospheric, lower thermospheic, and ionospheric regions, i.e. MLTI regions of the atmosphere. The program investigates and documents the energetics of the MLTI region, i.e., its pressure, temperature, density, and wind structure and the relative importance of various sources and sinks of energy. To make the required measurements, a 625-km circular orbit inclined 74.1 degrees with a nodal regression of 7200 per year is used. On-orbit instruments augmented by an array of ground-based instruments provide the basic measurements required by the mission. The instruments require precise knowledge of position and velocity of the orbital platform to perform their mission. This is accomplished by the autonomous navigation and time keeping system which provides position, velocity, time, and earth-sun vector data and notification of defined orbital events in real-time. It also generates predictions of events such as ground stations contacts. In addition, it generates orbital element sets which are down-linked for use by ground station antenna pointing systems. The navigation system contains two processors; a tracking processor which is responsible for controlling and interacting with GPS hardware in order to obtain raw tracking data and the navigation processor which is responsible for command and telemetry handling, determination of navigation solutions, generation of tracking acquisition aids and generation of the output data products. To simplify command control, the GPS based navigation system (GNS) is used to produce accurate estimates of position, velocity, and time to an event-based command system.

The GNS uses SPS ranging signals broadcast from the constellation of GPS satellites. The SPS ranging signal, referred to as L1 is Binary Phase Shift Key (BPSK) modulated. The modulation consists of two components that are modulo-2 summed: (1) a 1.023 MHz Pseudo-Random Noise (PRN) code known as the coarse acquisition (CA) code and (2), a 50 Hz navigation message. The CA code sequence repeats every 1 ms. The GNS receiver demodulates the received code from the L1 carrier, and detects the time offset between the received and a locally generated replica of the code. The receiver also reconstructs the navigation message data.

To compute TIMED spacecraft position, velocity, and time, the GNS determines the pseudorange to four or more GPS satellites in track. The propagation time to each GPS satellite is obtained by determining the difference between transmit and receipt times of the CA code. The pseudorange to each GPS satellite is computed by multiplying each propagation time measurement by the speed of light.

The navigation message transmitted from each GPS satellite provides data which are required to support the position determination process. That includes information to determine satellite time of transmission, satellite position, satellite health, satellite clock correction, time transferred to UTC, and constellation status.

FIG. 1 illustrates the 660 kg TIMED spacecraft which is three-axis stabilized and NADIR pointing. The majority of the bus electronics are contained in an integrated electronics module (IEM). The IEM is a highly integrated system with major spacecraft bus subsystems implemented on cards in a card cage to eliminate the more common self-contained modules or "black boxes". The subsystems that populate the IEM are on cards which have common mechanical interfaces based on the Stretch SEM-E form-factor to simplify the design process. Two IBM processors are employed, configured as single-string redundant systems with a 1553 bus connecting the two.

A graphite epoxy optical bench is mounted on the spacecraft's zenith-facing surface to provide a thermally stable mounting surface for TIMED Doppler Interferometer (TIDI) telescopes and the attitude system's star trackers (required to satisfy TIDI attitude knowledge requirements). Two GPS Navigation System (GNS) antennas are mounted atop composite masts on the optical bench for performing on-orbit GPS attitude determination verification with a precision reference, or truth, data set.

The TIMED mission and spacecraft top-level command and control requirements are satisfied by the GNS which is designed specifically for TIMED and implemented on Application-Specific Integrated Circuits (ASIC). Although designed for TIMED, the GNS will satisfy the functional requirements that are typically placed on spaceborne autonomous navigation systems for LEO or MEO host vehicles.

The GNS includes redundant Standard Positioning Service (SPS) receiver systems with access to the GPS civilian ranging code called the coarse acquisition (CA) code that modulates the L1 (1575.42 MHz) signal. The GNS is a state-of-the-art spaceborne system optimized for autonomous on-orbit operations. The GNS is radiation tolerant, has extensive command and telemetry capability, provides access to raw and intermediate data products, supports on-orbit software reprogramming, is designed to accommodate the large doppler signal, dynamic range resulting from orbital velocities, and implements robust signal acquisition, navigation, and orbit determination algorithms.

DESCRIPTION OF THE PREFERRED EMBODIMENT

Figure 1:
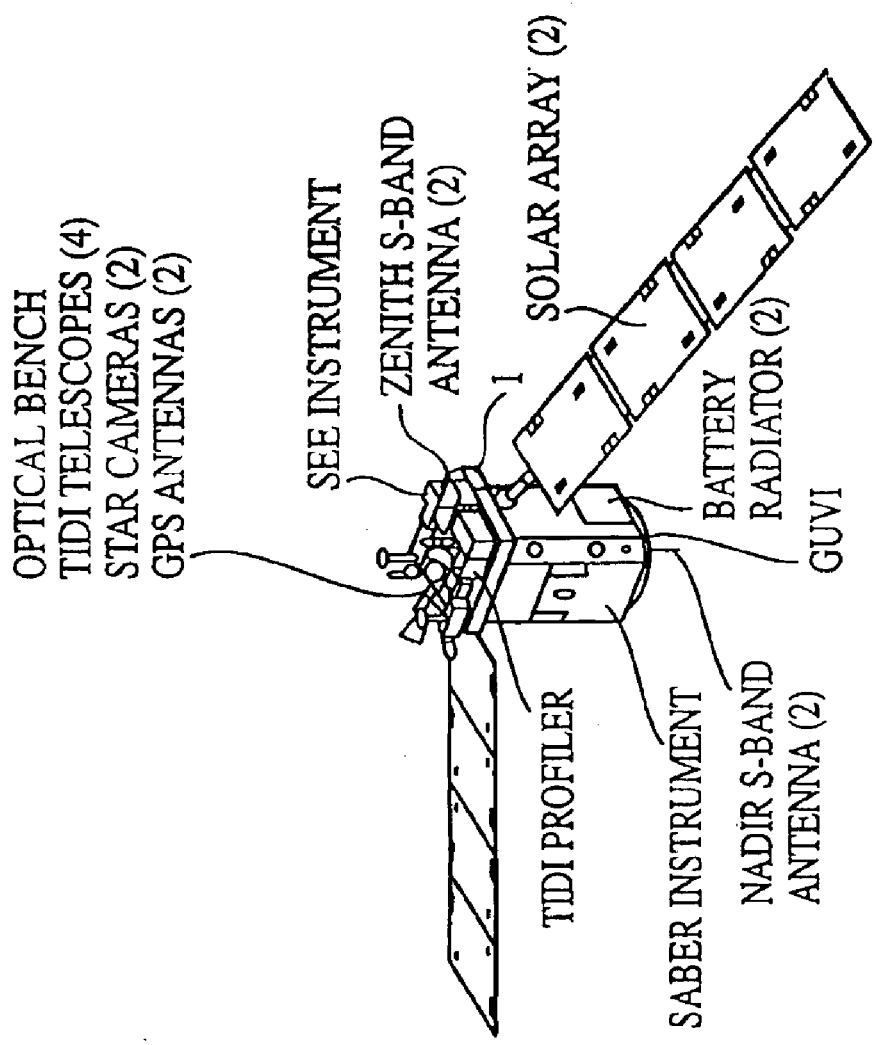
FIG. 1 is a simplified line drawing of the TIMED spacecraft illustrating the relative positioning of the major subassemblies.

The TIMED spacecraft major components include a system for sounding of the atmosphere using broadband emission radiometry to measure pressure, temperature and infrared cooling. This is the SABER instrumentation package. Located on the underside of SABER, FIG. 1, is a Global Ultraviolet Imager (GUVI) for obtaining temperature profiles and auroral energy inputs. A pair of NADIR S-band antennas are located with the GUVI.

A graphite epoxy optical bench is positioned on top of the SABER instrumentation package. The bench serves as a mounting base for the TIMED Doppler Interferometer (TIDI) profiler and four TIDI telescopes that constitute the TIMED Doppler Interferometer system which obtains wind and temperature profiles. A pair of star cameras, positioned on the bench, provide inputs to attitude star trackers which supply the attitude knowledge requirements of the TIDI. Also positioned on the optical bench is the Solar Extreme-UV Experiment (SEE) which measures solar x-ray, UV and FUV irradiance and a pair of S-band antennas.

Power for the system is derived from a battery power supply augmented by two solar arrays.

The primary electronics for the TIMED system are contained in an integrated electronics module (IEM). The system is redundant, being comprised of two IEMs, IEM #1 and IEM #2, see FIG. 3. Each IEM includes a 2.5 Gbit SSR with command and telemetry interface on a command and data handling card. An RF telecommunications card includes an uplink receiver and down link transmitter. A DC/DC converter card, 94, contains a pair of voltage converters. Also contained in each IEM is a GPS navigation system, GNS. Each GNS includes a GPS receiver card, 10, and a processor card, 90, containing dual Mongoose V processors.

The GPS navigation system provides: 1) estimated position and velocity of the satellite; 2) estimated UTC time and transfer to the command and data handling card; 3) estimated earth-sun vector data; 4) position-based event notifications; 5) position-based event predictions; 6) autonomous orbit determination; 7) data for non-GPS navigation; and 8) support for on-orbit software up-loading.

The GPS navigation system, i.e., GNS, operations and specifications are presented in Table 1.

TABLE 1

GNS Operations and Specifications.

| Parameter | Operation or Specification |
|---|---|
| Position (P) | <300 m (3 σ), Geodetic latitude, longitude, height (<10 m predicted) |
| Velocity V) | <25 cm/sec (3 σ), east, north, up (<5 cm/sec predicted) |
| Coordinate frame | ECEF-CTS (ECI-CIS for use by attitude system) |
| Earth-Sun vector (S) | 0.06° (3 σ) |
| Time of validity of PVS | UTC 1-sec epochs |
| Time, output signal (T) | 100 μsec (3 σ) (<1 μsec predicted) |
| Time, output data (T) | CCSDS Unsegmented Time Code (CUC) Epoch: OH, Jan. 6, 1980 |
| Data rate of PVST | 1 Hz |
| Event notification (E) | Notify spacecraft of events, 5 sec uncertainty |
| Events: | Terminator crossing: primary and backup ground contacts: SAA; polar region |
| Orbit determination | Every 12 hours, predict forward 60 hours |
| Data format: | NORAD 2-line element set and one state vector per ground contact |
| Event predictions | Every 12 hours, predict forward 60 hours |

TABLE 1-continued

GNS Operations and Specifications.

| | |
|---|---|
| Non-GPS navigation | No accuracy reqs; errors grow w/atmospheric density uncertainty |
| Autonomous operations | TTFF <30 mm, (cold start) 90% probable; <2 min (warm start) |
| Uploads accepted: | Solar flux; Geomag. Index; Polar wander; UTI-GPS time offset |
| Input voltage | ±15 Vdc and ±5 Vdc |
| Power dissipation | ≈7 W (1.5 W not including processors) |
| Physical configuration | Two 2-sided stretch SEM-E circuit boards + preamp + antenna |
| Radiation | 5 krads (Si); latch-up immune (GTA & proc. >1 Mrad, RF IC: ≧50 krads) |

Figure 2:
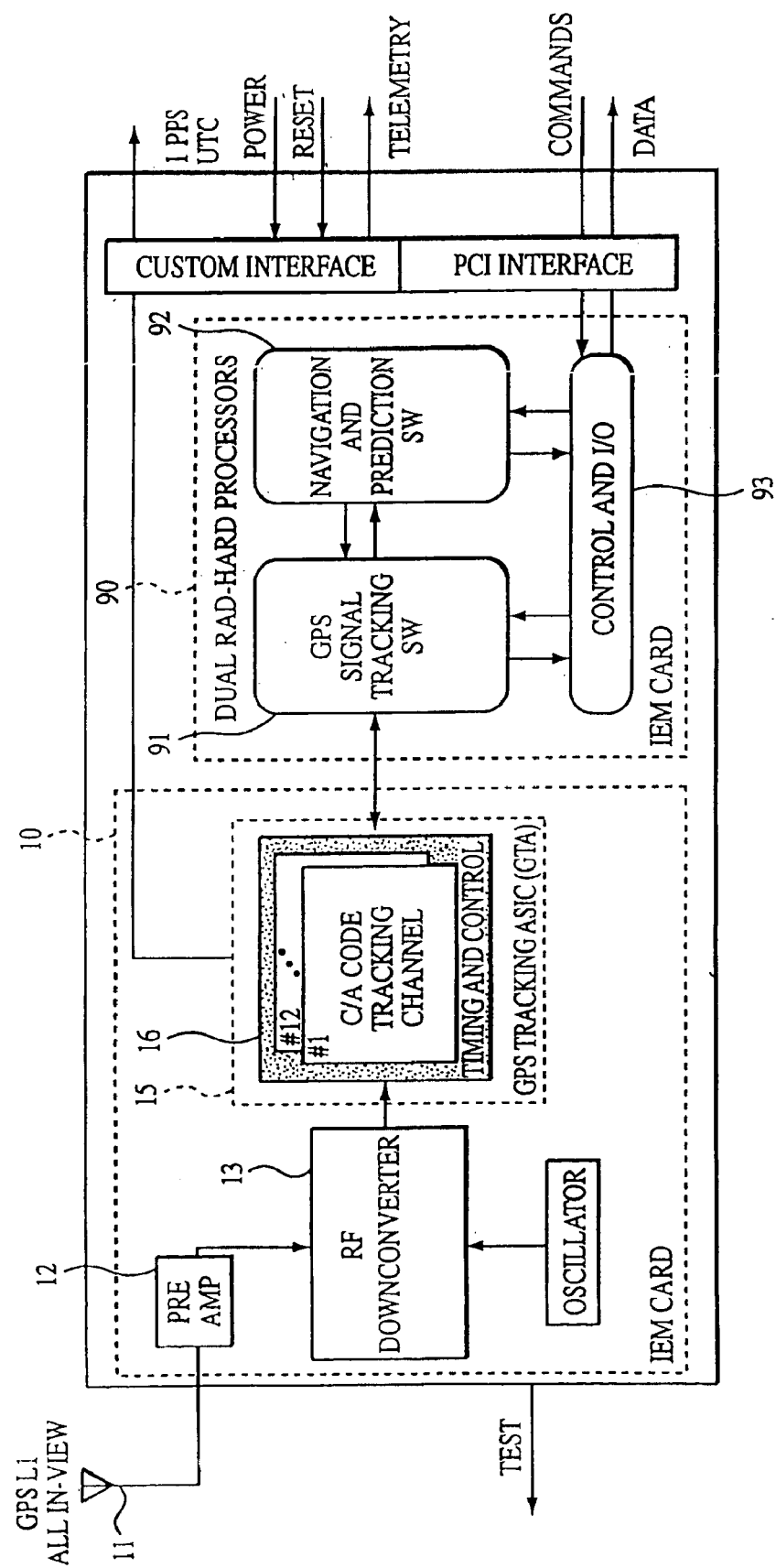
FIG. 2 is a simplified block diagram of the TIMED GPS Navigation System (GNS).

FIG. 2 is a simplified block diagram of the GNS. The receive antenna, 11, is located on the optical bench on the zenith-pointing surface of the orbital platform. The preamplifier, 12, consisting of pre-select filters and a low noise amplifier, is located just underneath the optical bench. The preamplifier generates the dominant component of system thermal noise power and conditions the received signals and noise for processing by the RF downconverter, 13. The downconverter, using a low-noise, temperature-compensated crystal oscillator (TCXO) as a frequency reference, downconverts L-band signals to the baseband and converts the resultant analog signal to a two-bit, three-level digital signal.

At the heart of the electronics is a low-voltage, low-power, radiation-hardened, high-speed application specific integrated circuit (ASIC), 15. This GPS Tracking ASIC (GTA) implements all the GPS-specific digital hardware functions.

The received GPS signals are converted to baseband digital signals and input to the GTA from the downconverter, 13, via a baseband electronics interface board. The GTA, under software control, implements 12 independent GPS tracking channels, 16, provides timing and control functions, and incorporates a built-in-test capability. The device is designed to accept up to four downconverted inputs to support future attitude determination capabilities and can be daisy-chained to support over 72 tracking channels. It will support P/Y code operations with additional external hardware.

The GNS's computer system, 90, comprises two Mongoose V radiation-hardened 32-bit processors, the tracking processor (TP), 91, and the navigation processor (NP), 92, and associated memory and interface support circuitry. Each Mongoose V operates at 12 MHz with no wait states for memory access. The two-processor approach is used to ensure adequate processor throughput. In an alternate embodiment, a single processor, such as a 20-MHz Mongoose V processor is used. The tracking processor, 91, implements the GNS acquisition, tracking, and data preprocessing functions, and outputs its products to the navigation processor, 92. Optimized "lost in space" or "sky search" signal acquisition algorithms may be executed on the tracking processor. These algorithms are designed to minimize the cold-start time-to-first-fix and to minimize the likelihood of on-orbit GNS signal acquisition problems. The navigation processor, 92, implements numerous functions including the command, control, and telemetry processing, and the navigation and orbit determination algorithms including a 45-state extended Kalman filter, orbit propagator, event detector and predictor, and an orbit element set generator.

Figure 3A:
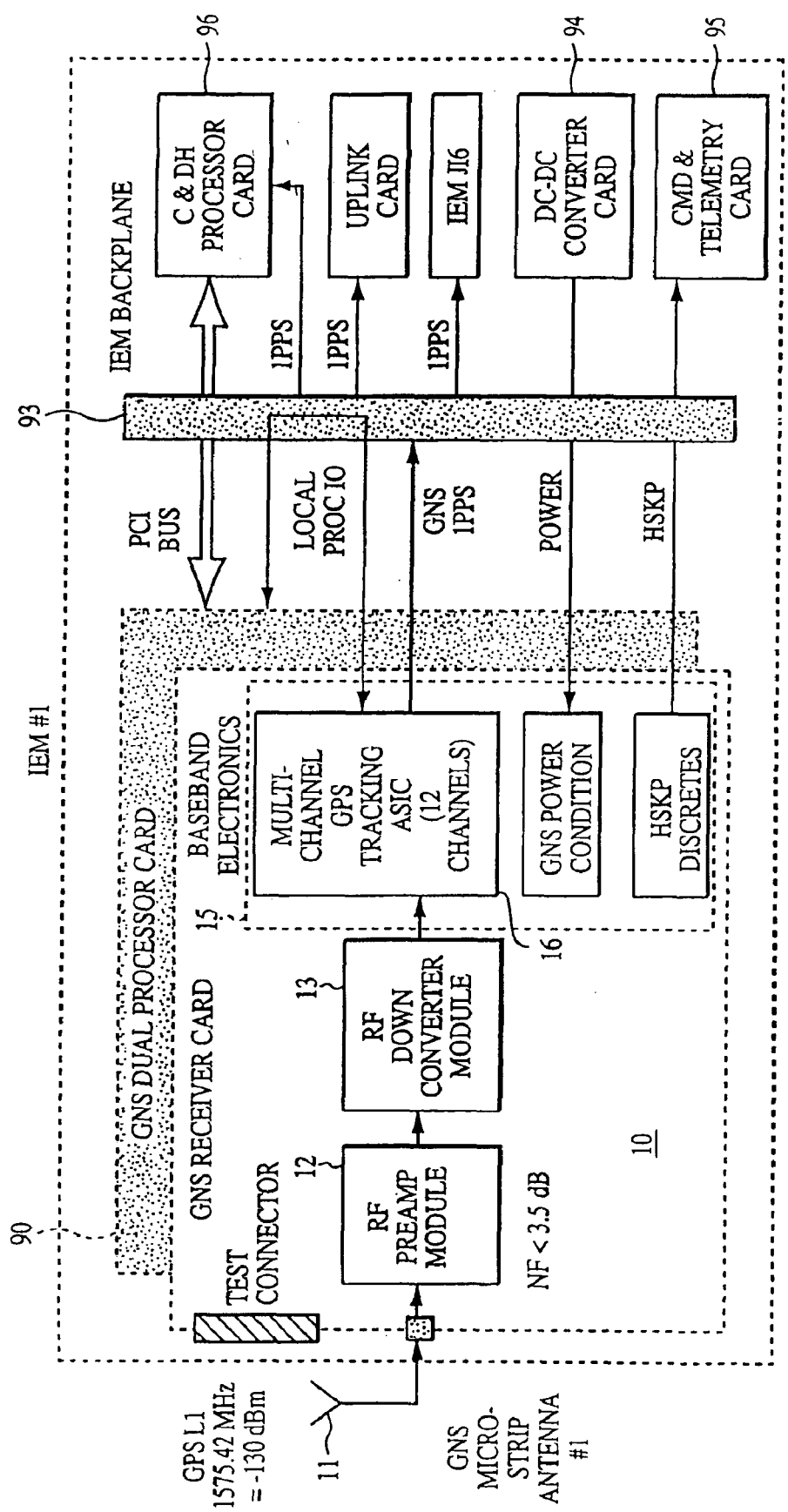
FIG. 3 is a block diagram of the hardware implementation of the GNS.
Figure 3B:
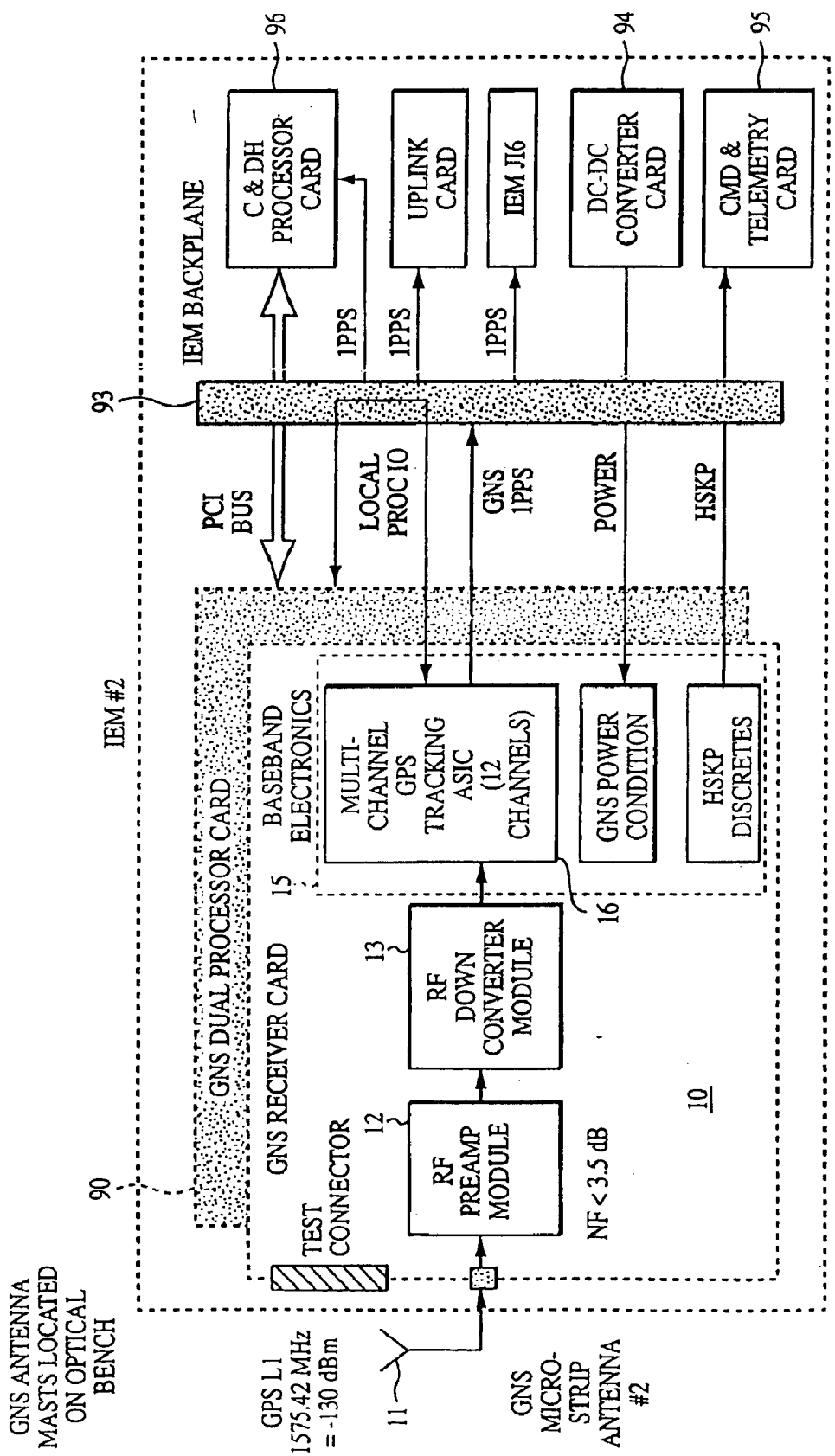

The GNS is implemented redundantly on two identical TIMED Integrated Electronics Modules (IEM), each of which includes a GNS receiver card, 10, and a GNS dual-processor card, 90, see FIG. 3. The receiver card, 10, and processor card, 90, interface to each other and to the rest of the IEM via a backplane bus, 93. Regulated DC power, 94, and discrete reset signals are input to each card and discrete analog telemetry signals and a 1 PPS signal, steered to align with UTC, are output via the Cmd & Telemetry card, 95. The interface to the IEM's command and data handling (C&DH) system, 96, including input commands and all output data products, is provided through a 16-bit, 2.5-MHz (40 Mbps) implementation of the PCI bus through the backplane connector.

Figure 16:
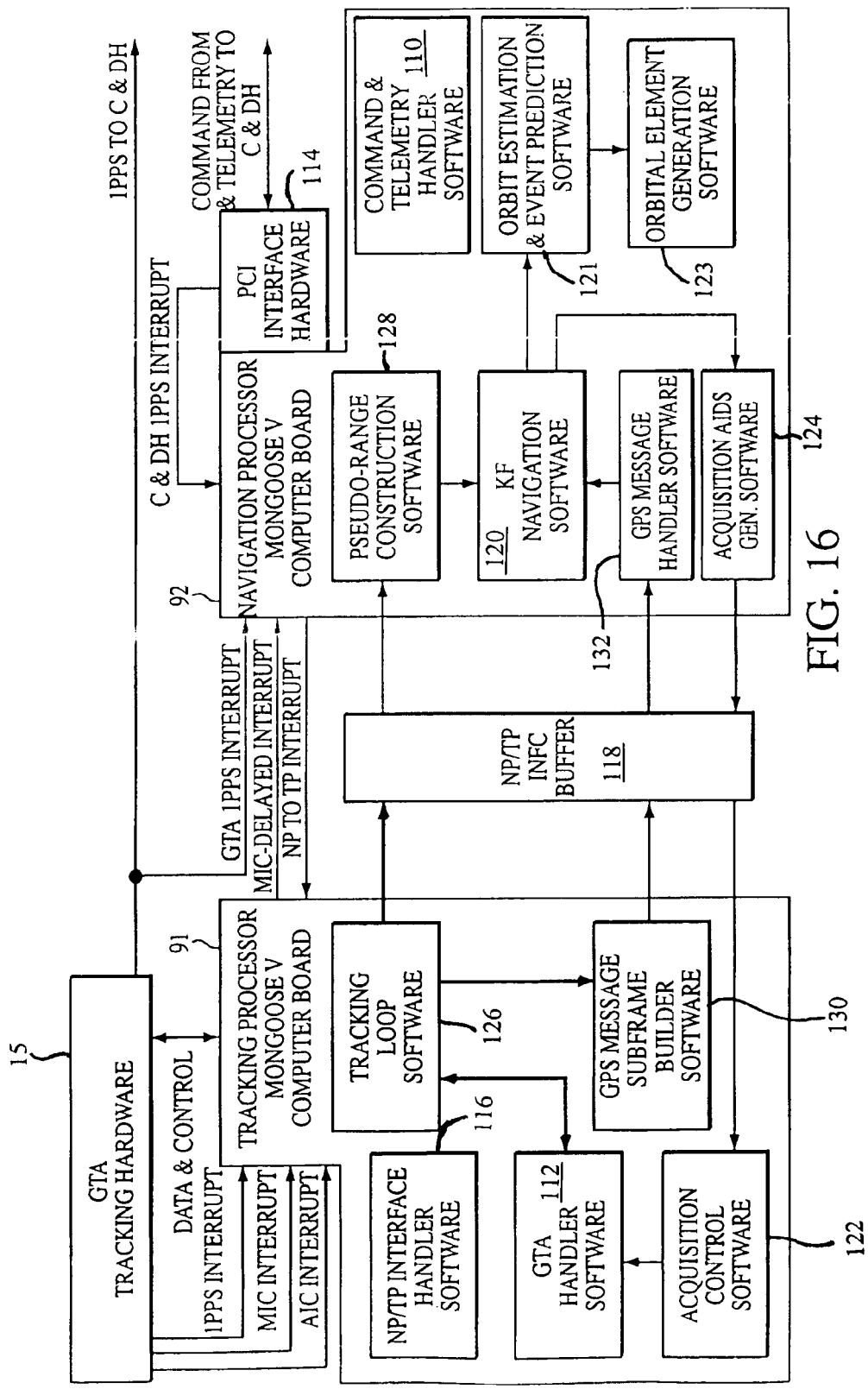
FIG. 16 is a functional block diagram of the dual processor subsystem implementation of the GNS software.

Six major elements comprise each GNS, they are: 1) a GNS micro-strip antenna, 11; 2) an RF subsystem on a GNS receiver card, 10; 3) a baseband electronics subsystem on the GNS receiver card, 15; 4) a dual processor subsystem on an independent GNS dual processor card, 90; 5) an IEM backplane bus I/O network, 93; and 6) the system soft-ware, FIG. 16.

GNS Antenna

Each GNS antenna is a single-element microstrip patch bonded to a truncated, cone-shaped ground plane. The antenna is painted with a thermal control paint and coated with 1200 angstroms of $SiO_2$ to protect the paint from atomic oxygen erosion on orbit. The element is tuned, after compensation for the effects of the paint, to receive right-hand circular polarized (RHCP) signals at the GPS L1 frequency of 1575.42 MHz with a nominal bandwidth of 5 MHz. In the preferred embodiment, the antenna is a modification of a space-qualified design produced by Ball Aerospace and Technology Corp. The shaped ground plane provides excellent gain (nominally $\geq$2.5-dBiC) at $\geq$10° elevations. Antenna gain on the order of +5 dBiC is achieved at zenith. To eliminate obstruction of the GPS signals and to minimize multipath effects, the antenna is mounted on top of a graphite epoxy pedestal, which in turn, is mounted on the zenith optical bench, providing a full hemisphere of unobstructed coverage.

RF Subsystem

The RF subsystem, FIG. 3, is comprised of a GNS Receiver Card, 10, for each GPS antenna, 11. Each receiver card, 10, includes four RF preamplifier modules, 12, which are space-qualified COTS devices with a preselect L1 filter and a low-noise amplifier, 122 of FIG. 4. The filter is comprised of a 3-dB bandwidth at 30 MHz element, 1231 and a 90-dB bandwidth at 250 MHz element, 123. It amplifies the band-passed raw received signal and applies it to an RF, L-band downconverter module, 13.

The downconverter, 13, is based on a COTS triple-superheterodyne downconverting integrated circuit, such as a Plessey 6P2010, adapted for the GNS design. It is a plastic encapsulated microcircuit (PEM). There are eight downconverters, 13, on a GNS receiver card, 10, but only one is illustrated for simplicity as in the case of the eight RF preamplifiers, 12.

A PPL frequency synthesizer, 19, functions as the local oscillator for the downconverter. It is driven by the fundamental reference oscillator, 17, which is a high-stability, low-noise TCXO crystal oscillator. The oscillator's phase noise is less than 45 dBc at 1 Hz offset from the carrier and −95 dBc at 10 Hz with stability of less than ±1 part per million (PPM) over all operating temperatures. The reference oscillator, 18, also generates the system clock for the GTA. A surface acoustic wave (SAW) filter, 18, in the second intermediate frequency (IF) circuit provides filtering of out-of-band signals and noise and establishes the system bandwidth.

There are four RF receiver channels on each GNS receiver card, 10. Each receiver channel comprises two RF preamplifier modules, 12, and two RF downconverter modules, 13, supplying a set of complementary I and Q signals. Thus the eight RF preamplifier/downconverter circuits provide sampled two-bit, three-level signals in four sets of complementary I-signals, comp1 and comp2, and complimentary Q-signals, comp1 and comp2, for digital processing.

Figure 4:
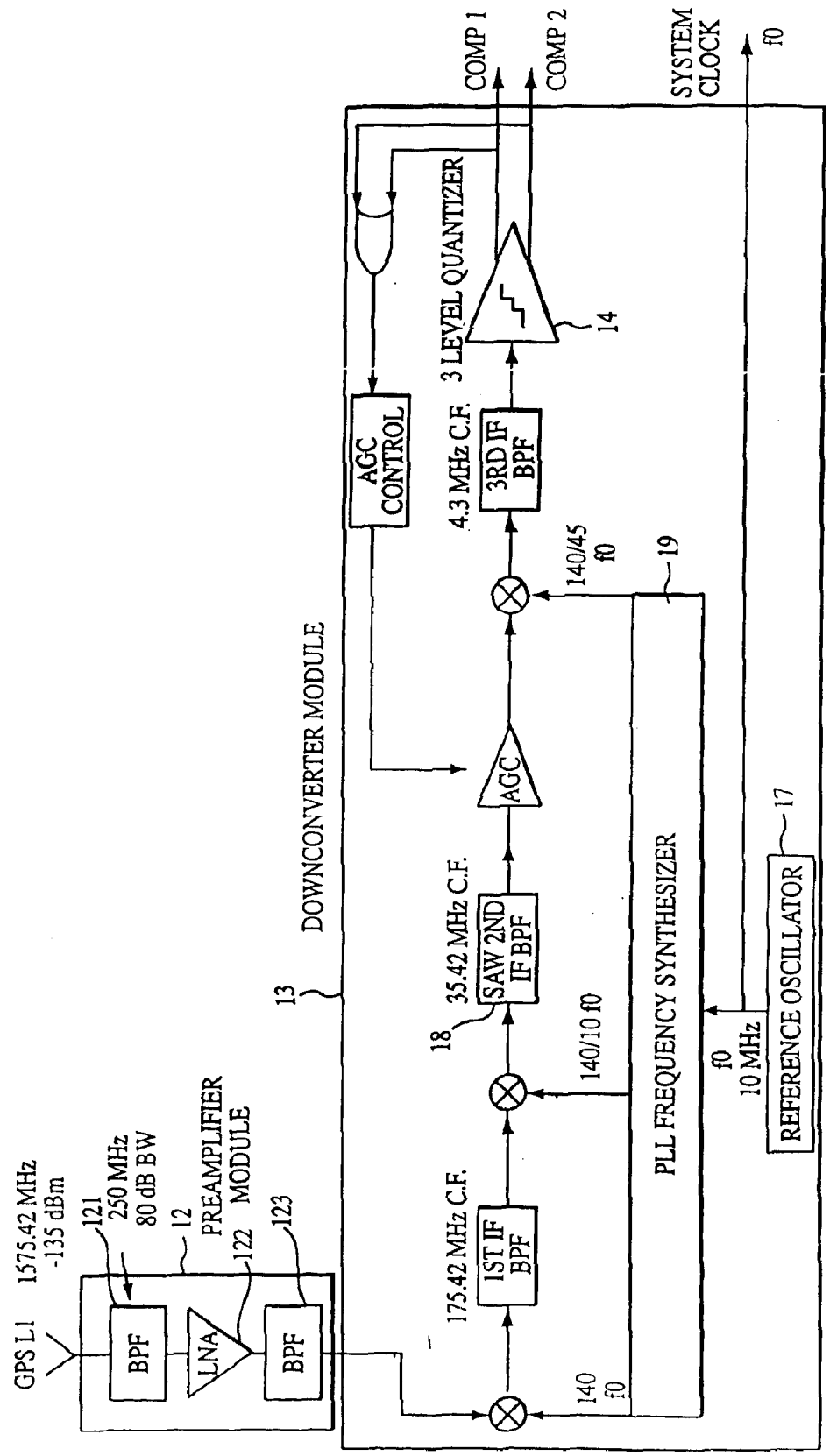
FIG. 4 is a block diagram of one of the RF front ends.

A block diagram of one of the RF front ends is presented by FIG. 4 to illustrates how the GPS signal is downconverted and digitized in the preamplifiers, 12, and downconverters, 13. These modules produce a single pair of complimentary outputs as I-signals or Q-signals. After downconversion, the signal is buried in noise but it is extracted as the state of a three level quantizer, 14. The outputs of the eight quantizers, as I-signal or Q-signal comp1 and comp2, are applied to the baseband electronics module, 15 of FIG. 3, as the four GPS receiver channel output signal pair sets, comp1 and comp2 for I and Q signals. The signals are applied to an associated one of the four input channels of the GPS tracking application specific integrated circuit, 16, which is part of the baseband electronics system, 15.

Baseband Electronics Subsystem

Figure 5:
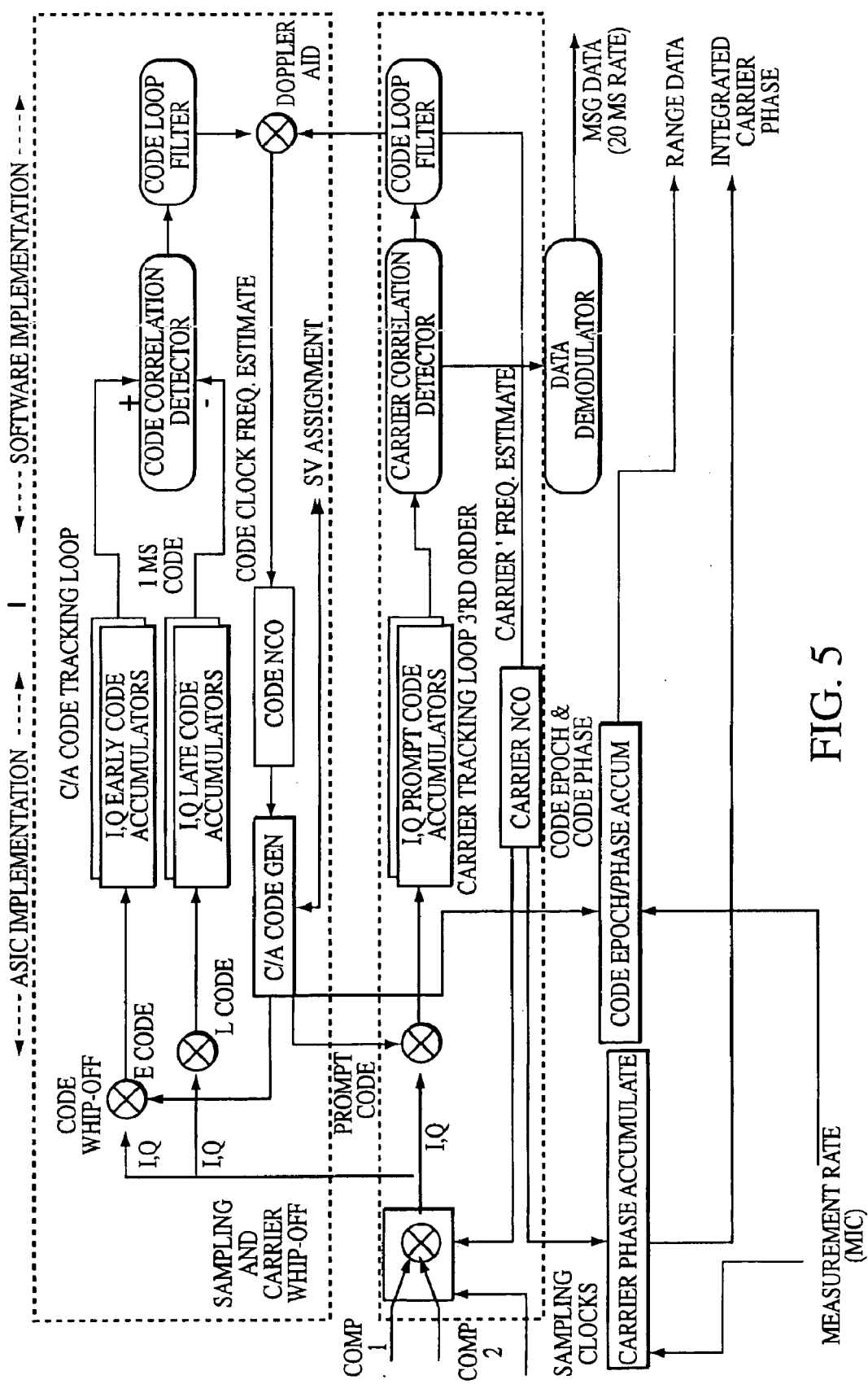
FIG. 5 is a functional diagram of the baseband electronics subsystem identifying hardware and software components.

The baseband electronics subsystem is comprised of the hardware and software elements illustrated in FIG. 5. The software element is an extended Kalman filter process executed by microprocessors on the processor cards 90. The hardware is comprised of processor cards 90 and receiver cards 10 which are constructed around a GPS tracking application specific integrated circuit or GTA.

Figure 6:
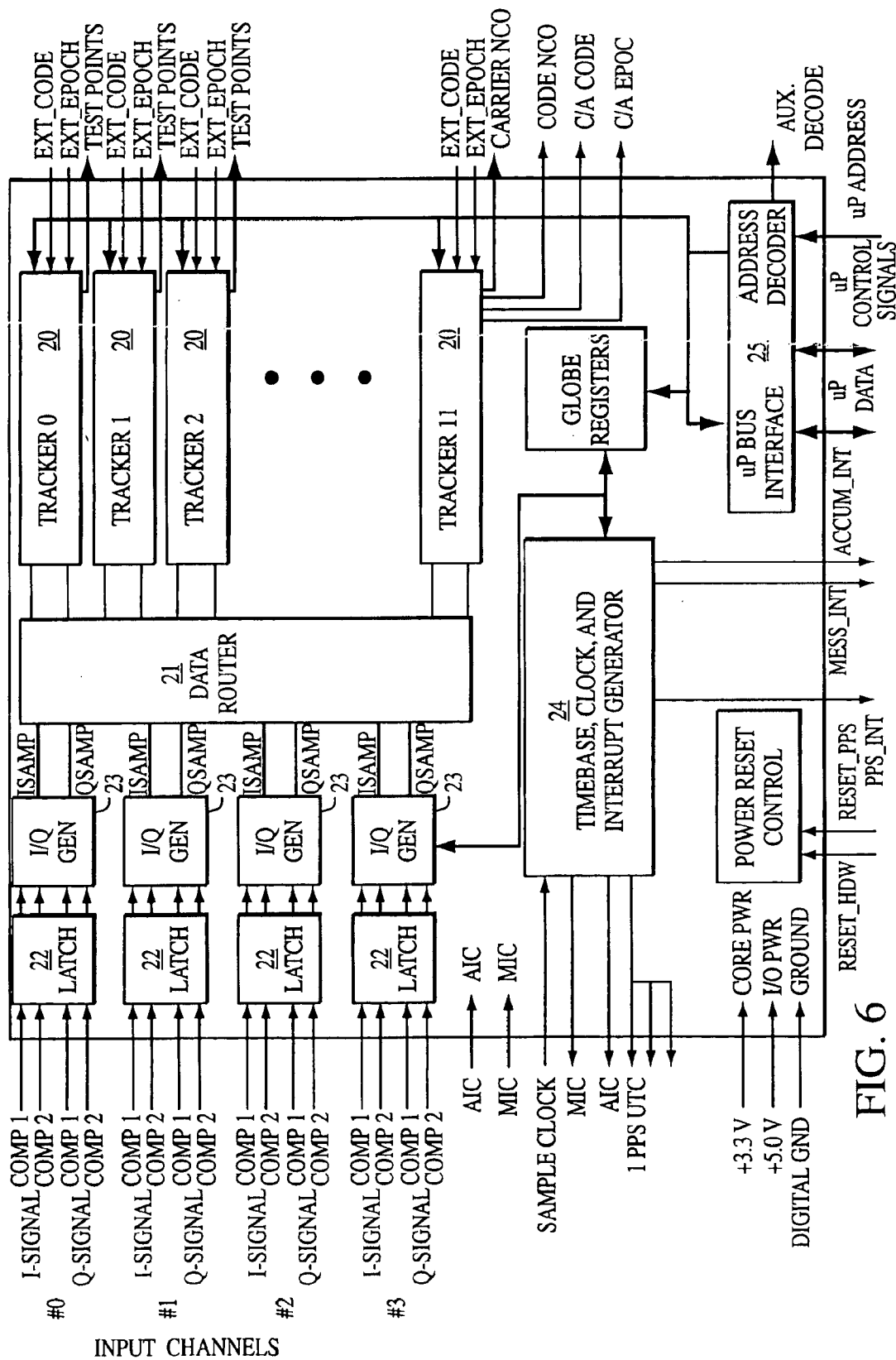
FIG. 6 is a simplified block diagram of the GPS tracking application specific integrated circuit (GTA).

FIG. 6 is a simplified block diagram of the GTA. It is implemented in radiation hardened CMOS circuitry providing 12 independent tracker channels, 20, for acquiring and tracking the downconverted GPS signals from four receiver channels. The GPS downconverted signals are applied to the GTA input which comprises four identical IF input channels, each of which includes a data latch, 22, and an I/Q generation module, 23, for adapting various input formats to the needs of the GTA circuitry and program routines. The I/Q generation modules supply quadrature and non-quadrature in-phase data to a data router, 21, which feeds the data to an available one of the 12 tracker channels, 20, as a function of channel availability and GPS satellite source. The GTA is relatively self contained in that it includes a time base, a clock, an interrupt generator, 24, and a 16-bit microprocessor memory-mapped interface, 25. Each of the 12 tracking channels, 20, incorporate full in-phase and quadrature (I&Q) tracking loops that correlate local replicas of the GPS PRN codes with the received signals. When acquiring and tracking GPS signals, numerically controlled oscillators (NCOs) are steered by the tracking processor's control loop filters to force alignment of the received PRN codes and the locally generated replicas clocked by the NCOs. Similarly, the reconstructed transmitted carrier signal is tracked by a carrier tracking loop. Each of the 12 channels also serve as a signal search engine when new GPS satellites come into view of the GNS antennas.

The GTA handles a wide variety of sampled data inputs. The expected forms of sampled input to the GTA include both 1 bit and 1.5 bit versions of quadrature (I&Q) and non-quadrature (I only) outputs from the downconverters. Quadrature inputs are desirable when the downconversion process results in spectral folding due to a lower than nominal sampling rate. The losses of spectral folding are recovered when quadrature samples are used in a single side-band (SSB) carrier mixing process which removes the image frequency in the signal band. If spectral folding does not occur in the downconversion process, the non-quadrature (I only) samples are adequate.

Figure 7:
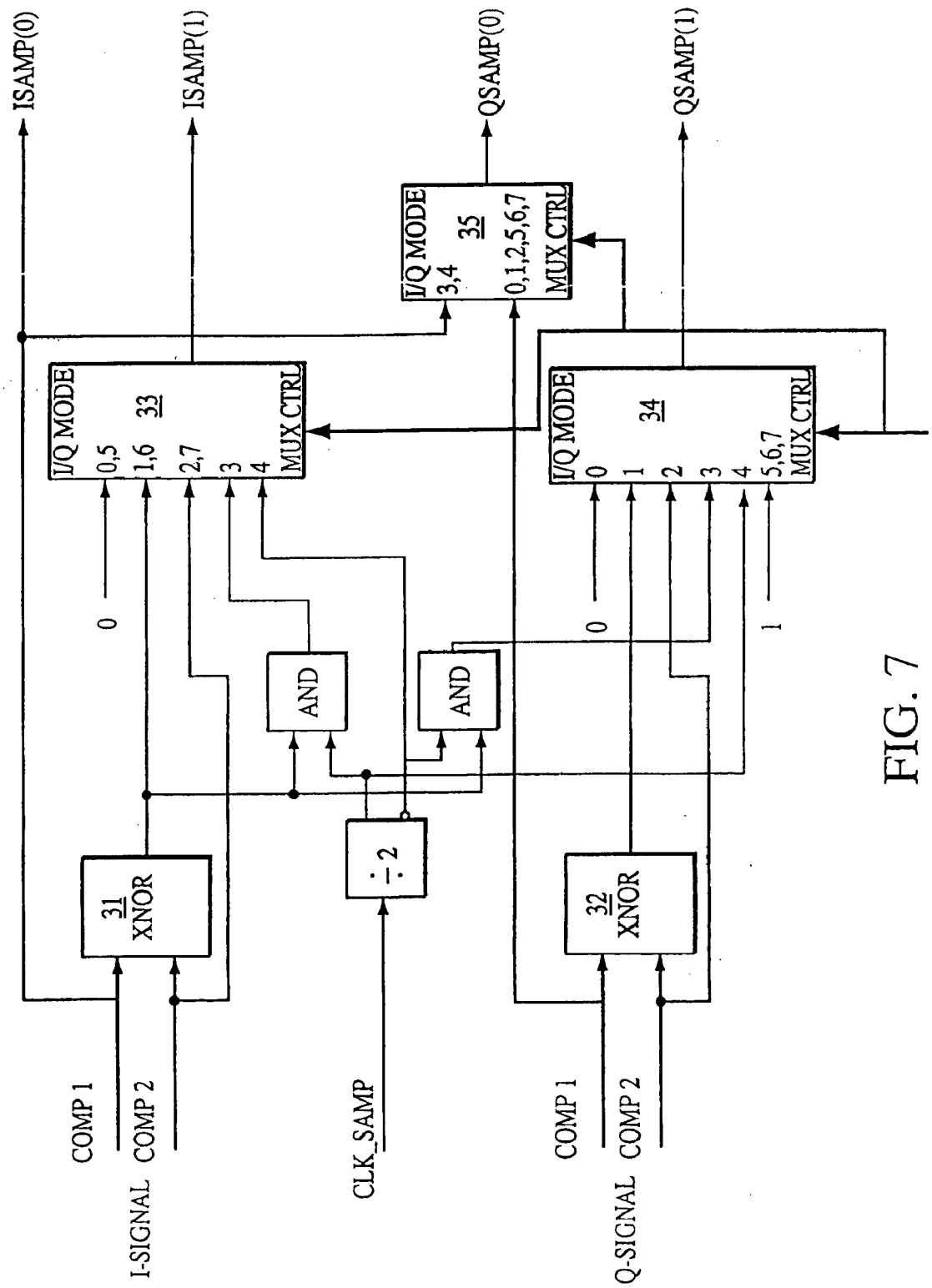
FIG. 7 is a schematic diagram of one of the four input latch and I/Q generator channels of the GTA.

Regardless of the GPS signal data type received from the RF downconverters, 13, it is applied to one of the four input channels to the GTA. FIG. 7 is a schematic diagram of the input latch, 22, and I/Q generator, 23, circuits which form each of the four input channels. The latch circuit includes a pair of exclusive NOR gates, 31 and 32, which route the data in separate non-quadrature, I, and quadrature, Q, paths to enable the system to obtain an ideal set of quadrature sampled data. The I and Q input signals are each comprised of complimentary outputs comp1 and comp2. This approach is used because of its inherent immunity to phase imbalances which exists between carriers in the quadrature downconverters. Each exclusive NOR gate, 31 and 32, provides inputs to the I/Q multiplexers 33 and 34. The multiplexers, 33 and 34, are each responsive to both exclusive NOR gate outputs and the comp2 inputs in the I and Q channels. The comp1 I and Q channel inputs are applied to a third multiplexer, 35. The three multiplexers, 33, 34, and 35, form the channel's I/Q generation module, 23, which enables the channel to handle different input formats and convert them to an output which the remainder of the GTA can recognize. There are eight different modes of operation which the I/Q generator can handle. Each mode is listed and described in Table 2 in terms of the output produced for the reset of the GTA. This table includes the definition of the 1.5 bit output signal in terms of two actual bits. During the I-only operation (Modes 5–7), the zero bit of the Q sample is set. The I/Q generation module 1.5 bit representations are presented in Table 3.

TABLE 2

I/Q Generation Modes

Mode Description

0  I & Q, 1 Bit, use comp1 input of both I & Q channels
1  I & Q, 1.5 bit, generate zeros from comp1 and comp2 inputs
2  I & Q, 1.5 bit, comp2=zero bit function for both I & Q
3  I & Q, 1.5 bit, generate quadrature data from non-quadrature data
4  I & Q, 1 bit, generate quadrature data from non-quadrature data
5  I, 1 bit, use comp1 input from I channel only
6  I, 1.5 bit, generate zero bit from comp1 and comp2 inputs
7  I, 1.5 bit, comp2=zero bit function for I only

TABLE 3

1.5 Bit Representations

| Signal Value | Sample (1) | Sample (2) |
|---|---|---|
| −1 | 0 | 0 |
| 0 | 1 | X (don't care) |
| 1 | 0 | 1 |

Figure 8:
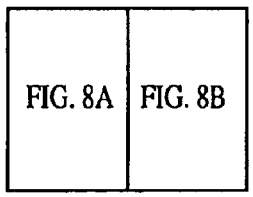
FIG. 8 is a functional block diagram of one of the 12 tracker channels of the GTA.
Figure 8A:
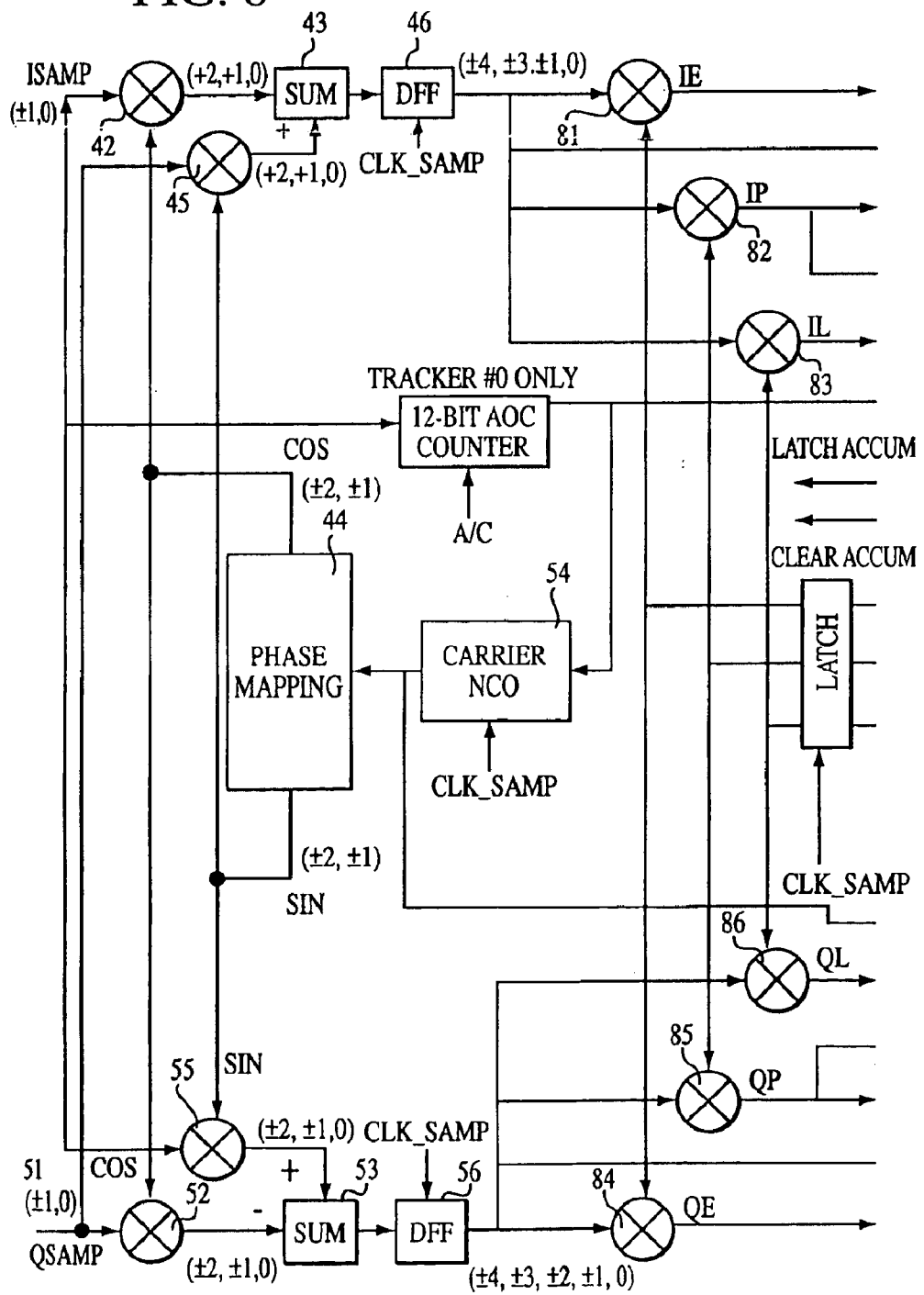
Figure 8B:
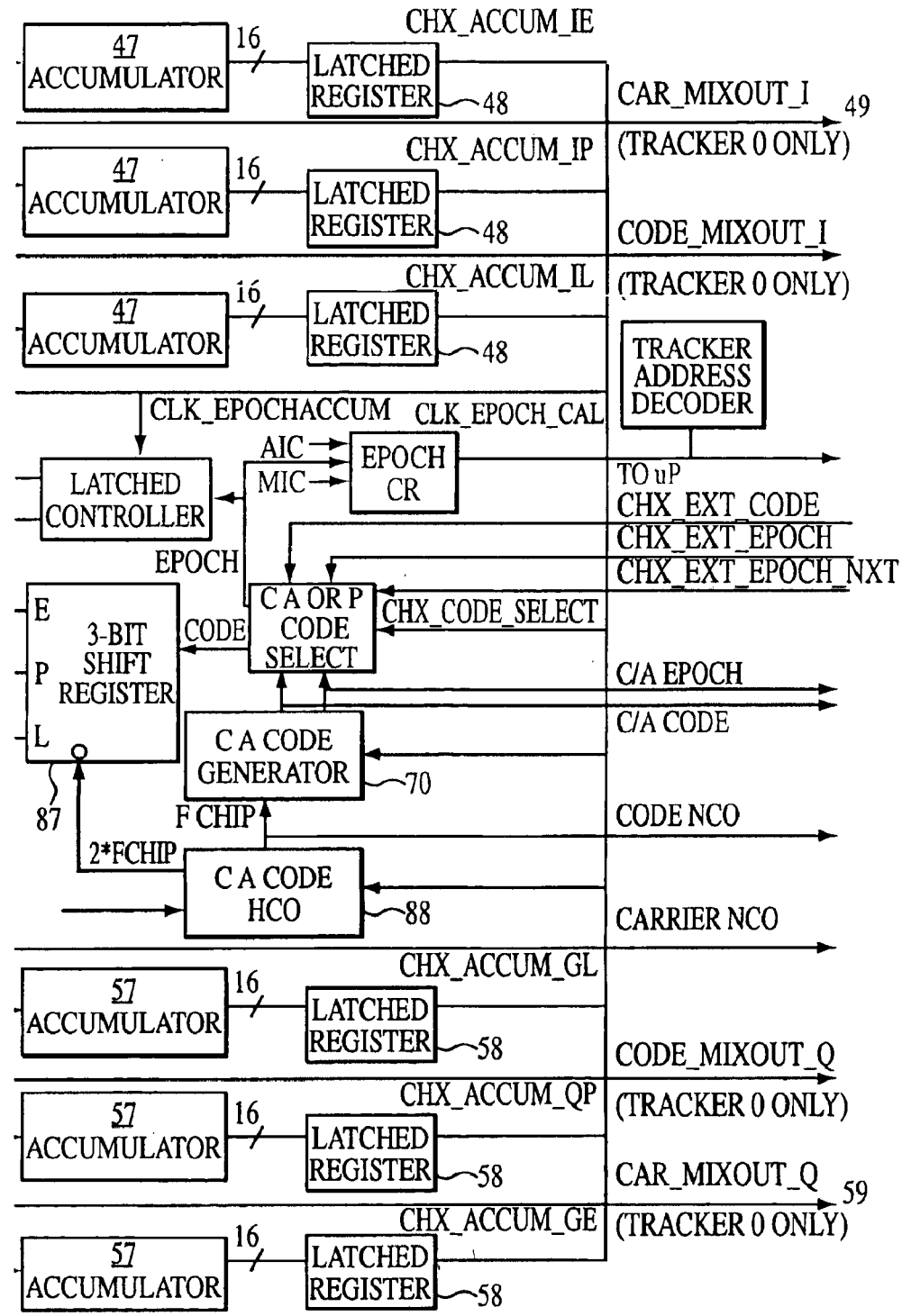

The data router 21 acts as an intelligent distribution means for the outputs of the I/Q generators, 23. It provides an I sample and a Q sample input pair to one of the 12 tracker channels, 20. As seen in FIG. 8, the functional block diagram of one of the tracker channels, each tracker channel includes an I sample input, 41, and a Q sample input, 51, from the data router. The I and Q sample channels are identical so only the I sample channel is discussed in detail. It is comprised of a suming network 43 which combines the outputs of two carrier mixing operations, 42 and 45. The first mixing operation, 42, multiplies the I sample input, 41, with a cosine function from the phase mapping generator 44. The other mixing operation, 45, multiplies the Q sample input 51 with a sine function from the phase mapping generator 44. The output of the summing network 43 is re-clocked with a flip-flop 46 which provides parallel outputs to the three code mixers comprised of accumulators 47 and associated latched registers 48 and an un-mixed output 49.

The Q sample channel is nearly identical to the I sample channel. It is identified in FIG. 8 by reference designators 51, 52, 53, 55, 56, 57, 58 and 59 which provided functions similar to those provided by the circuit elements 41, 42, 43, 45, 46, 47, 48 and 49 of the I sample channel. The key difference is the summing operation 53 is indicating the difference between the mixing outputs 55 and 52.

Figure 9:
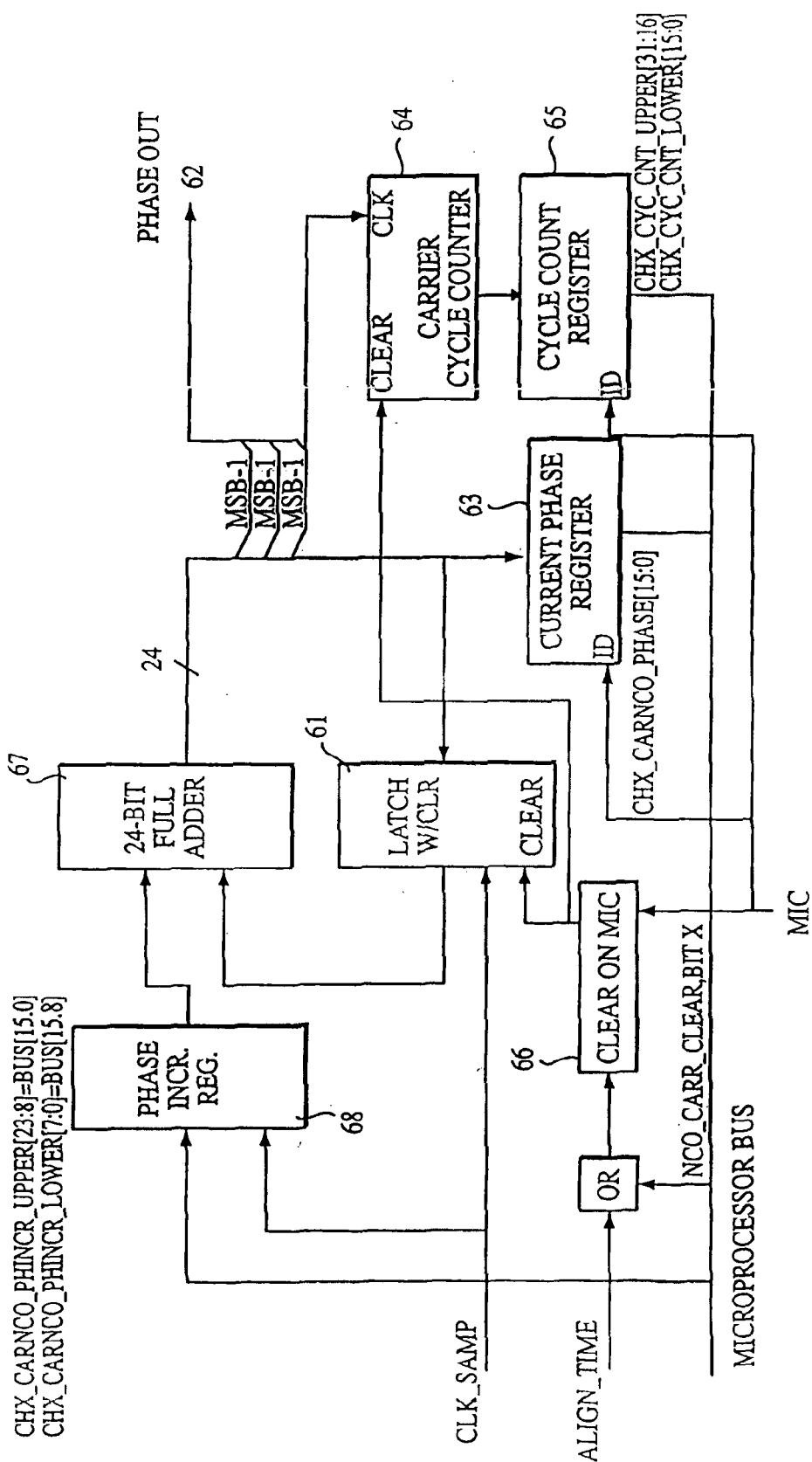
FIG. 9 is a block diagram of the carrier numerically controlled oscillator, NCO, which functions as a local oscillator for the final down conversion at the head end of a tracker channel.

The outputs of the flip-flops 46 and 56 represent the final downconversion process which is achieved using an adjustable local oscillator frequency to accommodate the variable Doppler shift present in the GPS downlink. A numerically controlled oscillator, the carrier NCO, 54, generates a digitally responsive version of the local oscillator frequency required for the final downconversion process. A block diagram of the oscillator is presented in FIG. 9. It uses a 24-bit full adder, 67, to provide the sequential logic which is clocked at the sample rate of the signal by latch 61 and kept in phase with sample by the phase and rate of phase change circuit 68. The three most significant bits, MSBs, of the adder provide the phase output, 62, to the mixing process in the sample channels via the phase mapping means 44. The carrier NCO provides the system with an ability to vary local oscillator frequency. A register, 63, allows the system to read the current phase information. The system can set the NCO output to 0s at anytime. The carrier NCO has a 32 bit counter, 64, with which it keeps track of the number of carrier cycles occurring during each measurement period and provides integrated Doppler estimates during GPS tracking. It's value is read by the microprocessor on each measurement interval. The carrier cycle counter and NCO phase are set to 0 by either an align__time condition or an nco__car__clear condition. The controls are maintained by the microprocessor and actions occur only on the first positive edge of the MIC signal following a clear request. The 3 bit phase output of the carrier NCO, 54, is mapped to sine and cosine components according to Table 4.

TABLE 4

Carrier NCO Phase Mapping

| Carrier NCO Phase | Cosine Value | Sine Value |
|---|---|---|
| 000 | +2 | +1 |
| 001 | +1 | +2 |
| 010 | −1 | +2 |
| 011 | −2 | +1 |
| 100 | −2 | −1 |
| 101 | −1 | −2 |
| 110 | +1 | −2 |
| 111 | +2 | −1 |

Three fundamental signals act as inputs during the carrier mixing process in FIG. 8. The three signals are the two quadrature sample data components, Isamp, 41, and Qsamp, 51, and three bits of phase from the carrier NCO, 54. The two quadrature carrier components, cosine and a sine, are generated by the phase mapper, 44, from the carrier NCO phase information according to the data presented in Table 4. The carrier mixing process is similar to processing employed for single sideband modulation (SSB). This technique provides a large amount of image rejection. It is used to prevent image products from folding back down to the desired signal band and corrupting the signal. The fundamental mixing process is represented by the equations:

$$I = Isamp*cos + Qsamp*sin$$

$$Q = Isamp*sin - Qsamp*cos$$

The carrier mixing process is implemented with multiple-bit accuracy. The input samples, Isamp and Qsamp, have the values −1, 0, or +1. The sine and cosine components from the carrier NCO have the values −2, −1, +1, and +2. This results in mixing outputs which can take on the values 0, ±1, ±2, ±3, and ±4. These values are represented by a four bit binary output defined in Table 5. The outputs are re-clocked at the sample clock rate for timing considerations.

TABLE 5

Multi-Value Bit Definition

| Value | Binary |
|---|---|
| −4 | 0000 |
| −3 | 0001 |
| −2 | 0010 |
| −1 | 0011 |
| 0 | 1XXX |
| 1 | 0100 |
| 2 | 0101 |
| 3 | 0110 |
| 4 | 0111 |

Figure 10:
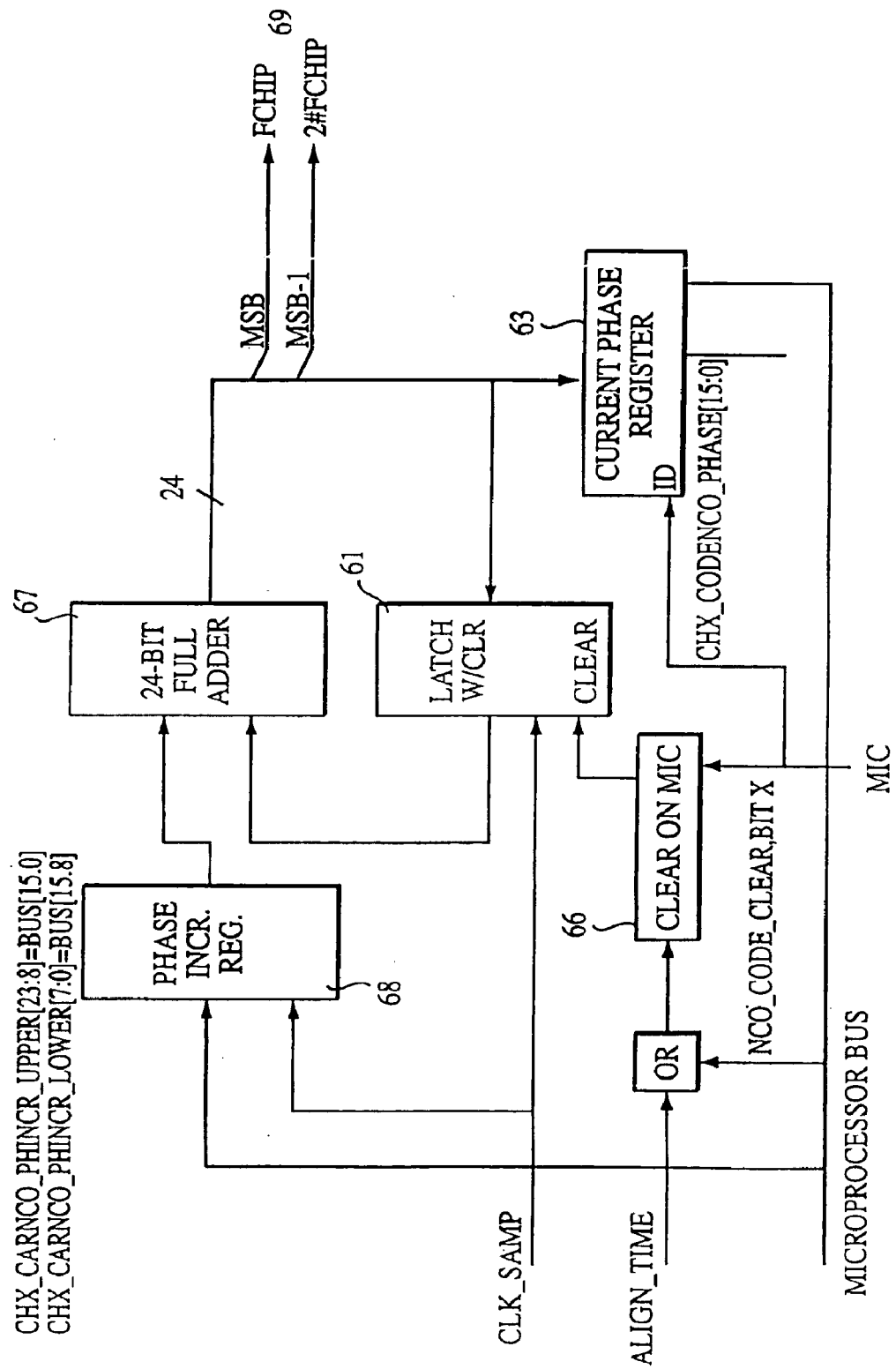
FIG. 10 is a block diagram of the numerically controlled oscillator used to clock the GPS coarse acquisition code.

The numerically controlled oscillator, NCO, which clocks the GPS course acquisition code generator circuit, the CA code NCO, 88, is similar to the carrier NCO, 54. A block diagram of the CA code NCO 88 is presented in FIG. 10. To emphasize the similarity between the NCOs 54 and 88, common reference designators are used to indicate identical circuits in FIGS. 9 and 10. For instance, in FIG. 10, the CA code NCO phase and rate of phase change is set by register, 68, which is identical to register 68 in FIG. 9. It is also controlled by the microprocessor bus as in the carrier NCO. The phase increment register, chx_code_phincr, is used to set the phase offset incremented to the current phase at every sample clock time as in the carrier NCO. The current phase clock of the CA code NCO, 88, is read at the current phase register, 63, by performing a microprocessor read from the address chx_codenco_phase as with the current phase register 63 of the carrier NCO, 54,. Verification of correct CA code NCO operation is determined by directing the microprocessor to clear the current phase prior to the next phase addition by setting the appropriate bit in the register nco_code_clear. This clear operation occurs at the next measurement interval clock, MIC, cycle.

Figure 11:
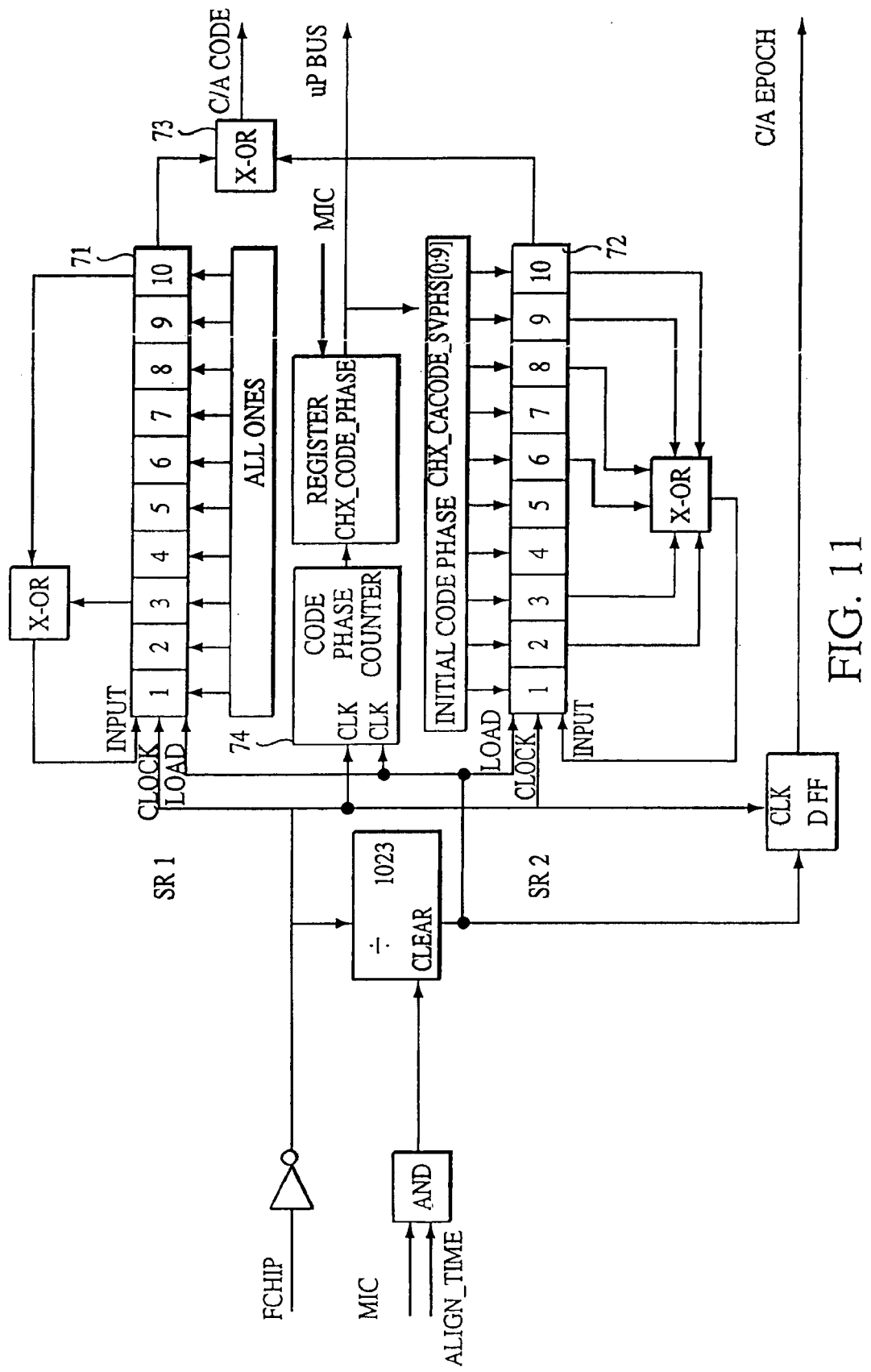
FIG. 11 is a block diagram of the GPS coarse acquisition code generator.

The GPS coarse acquisition code numerically controlled oscillator, CA code NCO, 88 of FIG. 8, provides an output to the GPS course acquisition code generator 70. A block diagram of generator 70 is illustrated in FIG. 11. It incorporates two shift registers, 71 and 72, which generate the PRN codes that are summed together by the modulo-2 summing means 73 to produce the desired GPS coarse acquisition code. Each shift register is clocked on the negative edge of the CA code NCO fchip to ensure that the code generator is initialized at a specific time so the current phase of the code may be derived from a code phase counter. The code phase counter, 74, is a 10-bit counter that resets to a value of zero at every epoch and increments by one on every chip. Critical timing is achieved with the use of the align_time signal form the microprocessor along with the MIC signal. Different codes corresponding to each GPS space vehicle are generated by verying the initial phase of the lower shift register. It is possible to start generation of a GPS course acquisition code at a point besides its epoch by initializing the top register to something other than all 1s.

The next step in processing consists of mixing the signals, i.e. the outputs of the differentiators 46 and 56, with a locally generated replica of the code used during the data modulation produced by CA code generator 70. This process occurs simultaneously in six differential mixing circuits, 81 through 86, for every tracker. The purpose is to lock frequency and phase of the code present on the received signal with a locally generated code. Both the I and Q outputs of the carrier mixing are multiplied by three time-shifted versions of the local code produced by the 3-bit shift register 87. This results in a total of six code mixing and correlation operations per tracker. Early, prompt, and late time-shifted versions of the code are used because their ½ chip delay offsets provide good code acquisition and tracking performance.

The code mixing process is illustrated in the functional block diagram of a single tracker in FIG. 8. The components of the I and Q carrier mixing products are clocked at the input sample rate and the code to be mixed with them is clocked at twice the CA code numerically controlled oscillator rate, i.e., CA code NCO, 88, rate. Because the CA code NCO is clocked at the sample rate, data transitions for all of the involve signals occur on the same boundaries. Both the I and Q carrier mixing products are adjusted so they are represented by the values 0, ±1, ±2, ±3, and ±4. Using the code values ±1, the output of the code mixers, 81 through 86, take on the same range of values as the outputs of the carrier mixing process.

After the code mixing process, the GPS signal outputs IE, IP, IL, QE, QP, and QL are loaded in the registers forming the appropriate accumulators, 47 and 57. Because the accumulator can be implemented easier as an up-counter instead of an up/down-counter, the representation of the mixer outputs is changed by adding an offset of +4 to the mixer outputs. The new values represent the increment value corresponding to each possible code mixing output. The process is repeated for subsequent values of the products coming out of each code mixer. This represents the correlation operation of a GPS receiver. See Table 6.

TABLE 6

Relationship of Code Mixing Output to Counter Increment

| Code Mixing Value | Code Mixing Bindery | Counter Increment Value | Counter Increment Binary |
|---|---|---|---|
| −4 | 0000 | 0 | 0000 |
| −3 | 0001 | 1 | 0001 |
| −2 | 0010 | 2 | 0010 |
| −1 | 0011 | 3 | 0011 |
| 0 | 1XXX | 4 | 0100 |
| 1 | 0100 | 5 | 0101 |
| 2 | 0101 | 6 | 0110 |
| 3 | 0110 | 7 | 0111 |
| 4 | 0111 | 8 | 1000 |

The six accumulator values from the code mixing outputs of each tracker are normally latched into a register 48 or 58, at every internally generated code epoch. However, to reduce the load on the microprocessor, each tracker has the capability of latching the data at a multiple number of epochs. Each tracker can be program so that anywhere from 1 to 20 epochs may occur between latching of the accumulator contents.

Figure 12:
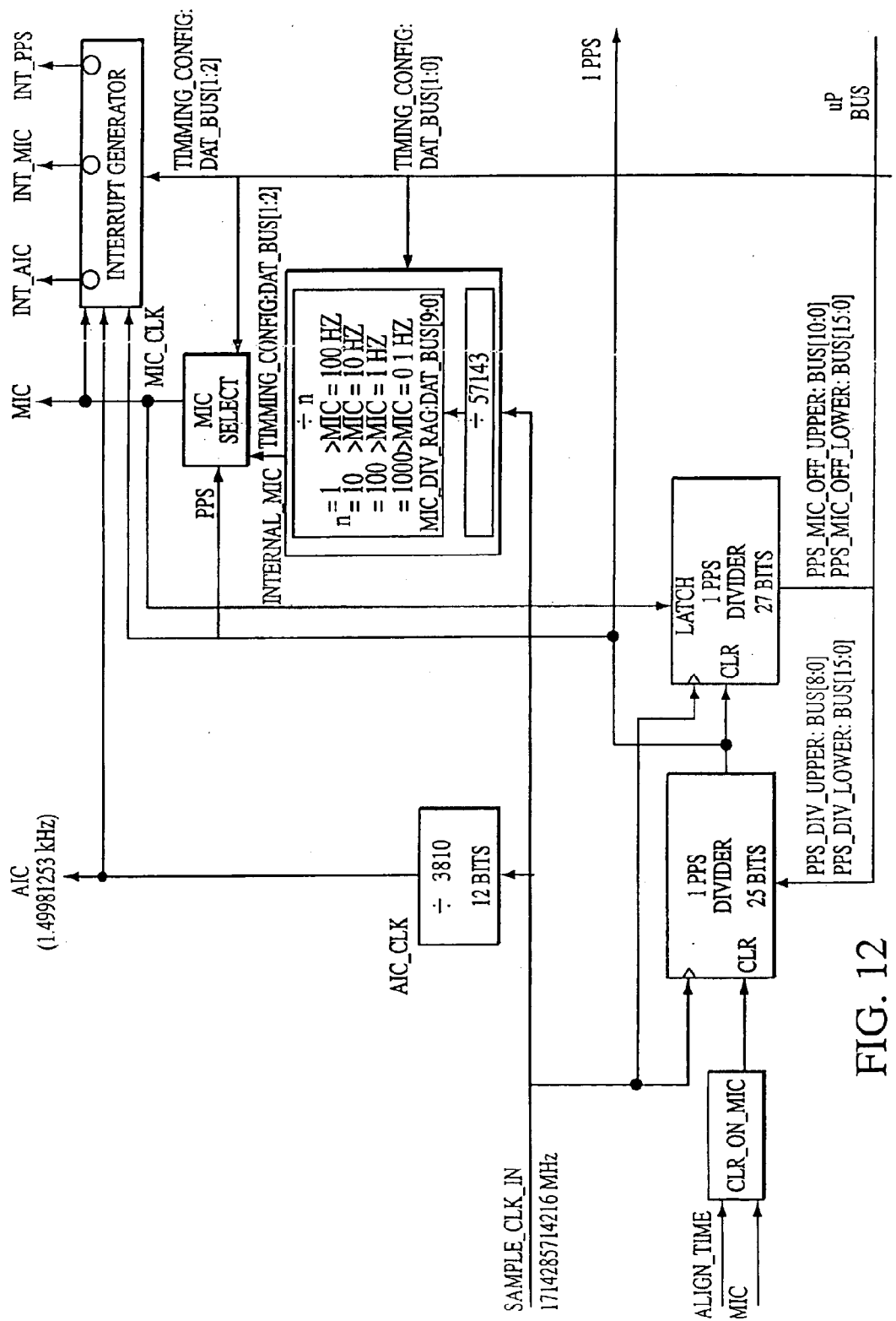
FIG. 12 is a block diagram of the clock and interrupt generation unit.

The timebase, clock, and interrupt generator, 24, create all timing and interrupt signals for the GTA. Certain portions of the clock generator work specifically with the TIMED frequency plan while other parts of the generator are adapted to provide different frequency and timing requirements. FIG. 12 is a block diagram of the timing and interrupt generator. The generator is normally driven by the same sample clock that the rest of the GPA uses for data processing.

A common clock or timing signal is required to efficiently allow the microprocessor to download the latched accumulator values between epoch states. This download signal, the accumulator or interval clock (AIC), occurs at a 1.499812 kHz rate or a period of 666.75 microseconds. It is used to generate an interrupt for the microprocessor.

The measurement interval clock (MIC) is a timing signal used to notify the microprocessor when measurement readings are to be be made. The MIC is used as a reference time for aligning other signals such as the carrier and CA code NCOs and code generator outputs. The MIC has four different, selectable rates, they are 100 Hz, 10 Hz, 1 Hz and 0.1 Hz. During applications requiring critical timing measurements, a 1 PPS signal is used as the MIC. When using one of the internal MIC rates, this signal is a non-square waveform with a positive pulse width of two AIC clock periods, or 1333.34 microseconds.

The time base generation circuit provides a 1 pulse-per-second (pps) UTC clock reference that is used to control the TIMED spacecraft timing system. Under control of a tracking loop in the navigation processor's extended Kalman filter, a numerically controlled oscillator is continually controlled such that it outputs a 1-PPS signal that is steered to align it with UTC's 1-second epochs. This is accomplished by using a 25-bit synchronous divider (counter) which is clocked by the sample_clk signal. When the counter reaches a value set by the microprocessor, the 1 PPS signal is set high and the counter resets to zero. The 1 PPS signal is then set low halfway through the next count to create a clock with a 50% duty cycle. This clock is capable of being aligned with UTC time by modifying the 25 bit maximum count value. Initially the 1 PPS divider is aligned with the MIC signal. This is achieved whenever an align_time signal occurs.

The time offset between the MIC and a 1 PPS signals must be measurable. The measurement is obtained with a second counter that determines the time interval between the 1 PPS rising edge and the next MIC rising edge. Two registers hold the number of sampleclk cycles which occurred between the two signals.

The GTA is implemented on a radiation-hardened HR23OO series CMOS gate array produced by Honeywell Solid State Electronics Center. The GTA uses over 200,000 gates, operates on 3.3 V for internal circuits and 5 V for input/output, and dissipates ≈200 mW.

Receiver Timing

Receiver timing is unique for TIMED. The receiver contains a fundamental oscillator which drives a group of frequency dividers, one of which is coupled into the receiver clock to produce a function of true time which is uncontrolled or open loop time. Controlled time is created by a control process that drives the system time bias to zero. The process is modeled as a continuous time adjustment to frequency error which converts an uncontrolled time function to a controlled time function of true time for use by the Kalman filter.

Correct modeling of the TIMED orbital dynamics and the GPS measurements is key to achieving good navigation performance. This includes having adequate gravity and drag models and correct modeling of the measurements derived from the GPS receiver carrier and code tracking loops. Modeling the effects of the receiver clock error on the measurements is critical. A unique feature of the GNS receiver is the control of the sampling times of the tracking loops to align with Universal Coordinated Time (UTC) time tics.

FIG. 4 illustrates how the GPS signal is downconverted and digitized by preamplifier 12 and downconverter 13. These circuit uses a Plessy RF front end and the GPS\L1 signal is downconverted from 1575.42 Mhz to 4.3 MHz. This technology leaves the signal buried in noise. The final output of the module is the state of a three level quantizer, 14.

The outputs of the quantizer are processed by an application-specific integrated circuit, as shown in FIG. 6. As previously stated, the ASIC chip includes twelve replications of a GPS tracker, so up to twelve GPS satellites can be tracked. The signals are sampled and distributed to the 12 trackers by four receiver channels. In the trackers, this signal samples are digitally mixed with a local carrier and code. The sampling accomplishes an additional downconversion of the L1 signal to −1.4054 Mhz. The negative sign arises because the signal is oversampled and downconverted through zero frequency. This results in a reversal of sign in the Doppler shift. After lockup, the local carrier and code are in phase with the received carrier and code. The GPS message data is retrieved inside the carrier tracking loop as the pseudo-range and integrated carrier. The data is manipulated by an extended Kalman filter implemented by software in the mongoose microprocessors.

The software used by the system is presented by way of mathematical functions to avoid hardware and programing language ambiguities. To simplify the presentation, the analysis considers the pseudo-range and integrated carrier produced by the code epoch accumulator and the carrier phase accumulator using the output of a single exemplary tracker channel. These accumulators are sampled at interrupts generated by the Measurement Interrupt Clock (MIC). The timing of this interrupt is controlled by the Kalman filter so that at steady state, it occurs as close to the UTC time tics as possible. Since this is different than what normally occurs in a Kalman processed GPS evaluation, a thorough discussion of the receiver timing is presented. Receiver timing is developed by the GNS software which implements the following equations, where:

Vectors/matrices are represented as lower/upper case (x/T). The transpose of a vector or matrix is denoted as $x^t$. For quantities that depend on a particular tracking channel, the tracking channel superscript v is used. Thus $\sigma^v$ is the pseudo-range associated with tracking channel v. Quantities associated with GPS satellites are identified by their tracking channel index (as opposed to their PRN or SV numbers). Thus $x^v(\tau)$ is the position implied by the GPS message ephemeris for the satellite being tracked by channel v. Estimates are denoted as $\hat{x}$. Reference receiver time is denoted by t while true time is denoted by $\tau$. The reference times at the MIC interrupt event are denoted by $t_k$. Sometimes $t_k$ is used to denote a general Kalman filter update time. (Note that these form a subset of the MIC times since a measurement is processed every $m^{th}$ MIC interrupt.) The apriori/aposteriori estimates of quantities at $t_k$ are denoted as $\hat{x}_{k/k-1}/\hat{x}_{k/k}$. Unless otherwise stated, all vector quantities are expressed in the Conventional Inertial System (CIS).

Figure 13:
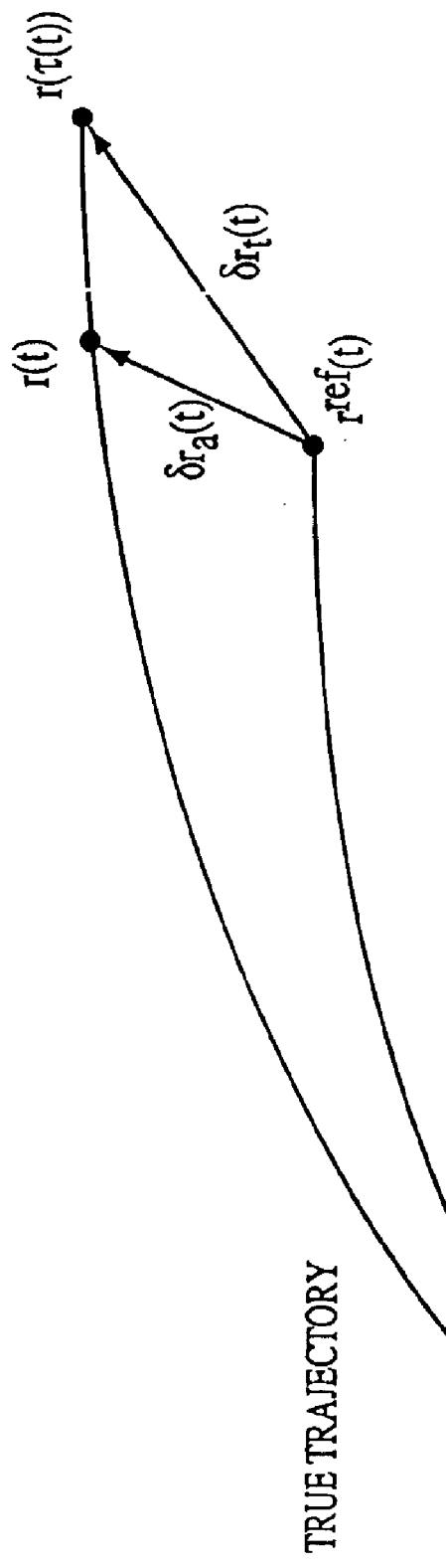
FIG. 13 illustrates the time error conventions related to trajectory position.

Basically, the system uses an imprecise clock. To develop error equations for a navigation system which contains an imprecise clock, a precise definition of error is required. This is accomplished in the software by defining the asynchronous errors as:

$$\delta_a x(t) = x(t) - x^{ref}(t)$$

where x(•) is any function of time, x(t) is its true value, and $x^{ref}(t)$ is its reference value according to the GNS system. Similarly, the synchronous errors are defined as:

$$\delta_s x(t) = x(\tau(t)) - x^{ref}(t) \qquad (5)$$

where τ(t) is a function that takes the nominal time t of the GNS system into the corresponding true time. This situation is illustrated graphically in FIG. 13, where τ(t)>t is assumed. If the difference τ(t)−t is small, and the difference between the true trajectory and the reference trajectory is small, the following relations hold between the two error conventions:

$$\delta_s x(t) \approx \delta_a x(t) + \dot{x}(t)(\tau(t) - t) \qquad (1)$$

where $\dot{x}(t) \equiv dx/dt$.

The synchronous error is the error in $x^{ref}(t)$ ignoring the time tagging errors of the GNS clock, while the asynchronous error takes these errors into account. If the difference between the indicated and true time to be the state is defined as T≡t−τ(t), the appropriate transformation between asynchronous and synchronous errors is:

$$\begin{bmatrix} \delta_s x(t) \\ T(t) \end{bmatrix} = \begin{bmatrix} I & -\dot{x}(t) \\ 0 & 1 \end{bmatrix} \begin{bmatrix} \delta_a x(t) \\ T(t) \end{bmatrix}$$

and the associated suitably partition covariance is:

$$\begin{bmatrix} cov(\delta_s x) & cov(\delta_s x, T) \\ (symm) & cov(T) \end{bmatrix} = \begin{bmatrix} I & -\dot{x}(t) \\ 0 & 1 \end{bmatrix} \begin{bmatrix} cov(\delta_a x) & cov(\delta_a x, T) \\ (symm) & cov(T) \end{bmatrix} \begin{bmatrix} I & -\dot{x}(t) \\ 0 & 1 \end{bmatrix}^t$$

For most sections in the following development, the synchronous error convention will serve as the default. It will be written without a subscript.

For the uncontrolled time receiver reference times, Let τ represent the independent variable true time. The receiver contains a fundamental oscillator with instantaneous frequency $f_0(\tau)^1$. (For the TIMED GNS receiver using a Plessy RF Front End, $f_0$ is nominally 10 MHz.) It drives a group of frequency dividers, one of which is coupled into the receiver clock. The output of this frequency divider as a function of true time is:

$$s(\tau) = \sin\left(\frac{1}{k_c}\left[\int_{\tau_{set}}^{\tau} 2\pi f_0(\xi) + \phi_{set}\right]\right)$$
$$= \sin(\varphi(\tau)/k_c)$$

where $k_c$ is the (rational) divide-down ratio. (For TIMED the system clock is coupled directly into the fundamental oscillator, so that $k_c=1$) The true time at which the clock was set is $\tau_{set}$, the phase (in radians) of the fundamental oscillator is $$\varphi(\tau) = 2\pi \int_{\tau_{set}}^{\tau} f_0(\xi) d\xi + \phi_{set}, \text{ and } \phi_{set} \in [0, 2\pi]$$

is an arbitrary phase of the fundamental oscillator at $\tau_{set}$. The number of complete cycles executed by this sinusoid since $\tau_{set}$ is $N_{cycles}(\tau) = \text{floor}[(\Phi(\tau) - \phi_{set})/2\pi k_c]$. If $f_0^{ref}$ cycles per second are being executed by the fundamental oscillator, the estimate of time is:

$$t^*(\tau) = \frac{k_c N_{cycle}(\tau)}{f_0^{ref}} + t_{set}$$
$$= \frac{k_c \cdot \text{floor}[(\varphi(\tau) - \phi_{set})/2\pi k_c]}{f_0^{ref}} = t_{set}$$

where $t_{set}$ is the value placed in the clock at $\tau_{set}$. Dispensing with the floor function since all times of interest (the sampling times) occur when the oscillator has executed an integral number of cycles (i.e. when $(\Phi(\tau) - \phi_{set})/2\pi$ is an integral multiple of $k_c$).
Then:

$$t^*(\tau) = \frac{(\varphi(\tau) - \phi_{set})/2\pi}{f_0^{ref}} \qquad (2)$$
$$= \int_{\tau_{set}}^{\tau} \frac{f_0(\xi)}{f_0^{ref}} d\xi = t_{set}$$
$$= \int_{\tau_{set}}^{\tau} (1 - \varepsilon(\xi)) d\xi + t_{set}$$
$$= t_{set} + (\tau - \tau_{set}) - \int_{\tau_{set}}^{\tau} \varepsilon(\xi) d\xi$$

where the fractional frequency error is defined by:

$$\varepsilon(\tau) \equiv \frac{f_0^{ref} - f_0(\tau)}{f_0^{ref}} \qquad (3)$$

This is the uncontrolled or open loop time. If $t_{set} = \tau_{set}$ and $$f_0(\xi) = f_0^{ref}$$

there will be no error and $t^*(\tau) = \tau$. Since this is not the case, there will be an error defined by:

$$T^*(\tau) = t^*(\tau) - \tau \qquad (4)$$
$$= t_{set} - \tau_{set} - \int_{\tau_{set}}^{\tau} \varepsilon(\xi) d\xi$$

Note that $t^*(\tau)$ is the function that takes true time into the simultaneous uncontrolled reference time. Note also that the divide-down ratio $k_c$ does not appear. This function is inverted to obtain the true time, $\tau(t^*)$, as a function of uncontrolled reference time. This function is defined implicitly by:

$$t^* = t_{set} = (\tau(t^*) - \tau_{set}) - \int_{\tau_{set}}^{\tau(t^*)} \varepsilon(\xi) d(\xi) \qquad (5)$$

The instantaneous phase of the fundamental oscillator is recovered from $t^*(\tau)$ by solving equation (2) for $\Phi(\tau)$ to get:

$$\varphi(\tau) = 2\pi f_0^{ref}(t^*(\tau) - t_{set}) + \phi_{set}$$
$$= 2\pi f_0^{ref}([\tau = T^*(\tau)] - t_{set} = \phi_{set})$$
$$= 2\pi f_0^{ref}(\tau = T^*(\tau)) + \phi_{set}$$

where $\phi_{set}$ has been modified to include $t_{set}$, because only $\Phi(\tau)$ is significant, modulo $2\pi$ and $(t_{set} 2\pi f_0^{ref}) \mod(2\pi)$ can be absorbed in $\phi_{set}$.

The uncontrolled time thus far defined is used to derive controlled time by driving the system time bias to zero. A quantized and control in a discrete time system is modeled as a continuous time adjustment to the frequency error. Applying the control process to equation (2) produces:

$$t(\tau) = t_{set} + (\tau - \tau_{set}) - \int_{\tau_{set}}^{\tau} [\varepsilon(\xi) - u(\xi)]d\xi \qquad (6)$$

where $t(\tau)$ is the system reference time as a function of true time, including the control effects, and $u(\tau)$ is the continuous time process used to represent the control. Its dimensions are seconds/second (the same as fractional frequency error). Note that $t(\tau)$ is the function that takes true time into simultaneous controlled reference time. This function is inverted to obtain the true time, $\tau(t)$, as a function of controlled reference time. The inverse function is defined implicitly by:

$$t = t_{set} + (\tau(t) - \tau_{set}) - \int_{\tau_{set}}^{\tau(t)} [\varepsilon(\xi) - u(\xi)]d\xi \qquad (7)$$

Defining the (controlled) clock bias to be that quantity which when subtracted from the (controlled) reference time gives the corresponding true time:

$$T(\tau) = t(\tau) - \tau \qquad (8)$$

$$= t_{set} - \int_{\tau_{set}}^{\tau} [\varepsilon(\xi) - u(\xi)]d\xi$$

The rate of change of $T(\tau)$ with respect to true time is then:

$$\frac{dT}{d\tau} = -\varepsilon(\tau) + u(\tau) \qquad (9)$$

The Kalman filter runs according to receiver time, therefor the derivative of $T(t)=T(\tau(t))$ with respect to t. By the chain rule, this is $$\frac{dT(t)}{dt} = \frac{dT(\tau(t))}{d\tau} \cdot \frac{d\tau(t)}{dt} \qquad (10)$$

$\dot{\tau}(t) = d\tau/dt$ is derived by differentiating equation (7) with respect to t using the Leibniz rule which produces:

$$1 = (1 - \varepsilon(\tau(t)) + u(\tau(t)))\dot{\tau}(t)$$

or $$\dot{\tau}(t) = \frac{1}{1 + u(t) - \varepsilon(t)} \qquad (11)$$

where $\varepsilon(t) \equiv \varepsilon(\tau(t))$ and $u(t) \equiv u(\tau(t))$. Substituting equations (11) and (9) into equation (10) yields:

$$\frac{dT(t)}{dt} = \frac{u(t) - \varepsilon(t)}{1 + u(t) - \varepsilon(t)} \qquad (12)$$

$$= (u(t) - \varepsilon(t))\dot{\tau}(t)$$

The variables $\tau$ and t represent the true time and controlled reference time independent variables as well and the functions $\tau(t)$ and its inverse $t(\tau)$. The distinction is clear from the context. When appropriate, superscripts identify the system to which the time functions pertain. Thus, a reference time from the Guidance and Navigation System (GNS) leads to the corresponding true time:

$$\tau(t) = t - T(t) \qquad (13)$$

By a notational slight-of-hand, as in equation (13), functions may be accessed according to receiver time instead of true time. This is accomplished by writing T(t) to mean $T(\tau(t))$. The GNS time t represents the number of seconds in the GPS standard epoch. It is stored in two variables so that precision will not be lost:

$$t_k = MIC\_time_k + t_{int}$$

where $MIC\_time_k$ is the number of seconds since GNS turn-on and $t_{int}$ is an integer that brings the sum $MIC\_time_k + t_{int}$ close to the desired value when time is initially set.

MIC slew control, u(t), is a continuous time representation of the digital process used to control the timing of the MIC interrupt in the GNS receiver so that it aligns with UTC tic boundaries. The GNS receiver continually estimates the difference between its internal clock and GPS time. The GPS time differs from UTC by an integer; therefore the GPS time tics are coincident with UTC tics. In the actual digital implementation, the MIC interval counter is strobed by $f_0/k_c$. An interrupt is generated and the counter resets when the counter reaches a value written into a memory location on the GPS Tracking ASIC (GTA). The desired number of clock cycles between MIC interrupts is known as the MIC register count and is determined from Kalman filter estimates.

The objectives of the digital control are to compensate for the time bias error and the fractional frequency errors, and to bring the MIC interrupt into coincidence with the UTC tics. The control will be applied across the whole Kalman update interval consisting of m MIC interrupts so the difference between the true and nominal MIC interval times can be minimized. As described earlier, the nominal time since the GPS standard epoch is constructed as:

$$t_k = MIC\_time_k + t_{int}$$

The corresponding estimate of true time after a measurement update is found by removing the bias from the reference time:

$$\hat{\tau}_{k/k} = MIC\_time_k + t_{int} - \hat{T}_{k/k} \qquad (14)$$

It takes far less time to eliminate the clock bias and to align the MIC with UTC tic's if the clock bias is removed by absorbing it in $t_{int}$:

$$t_{int} \Leftarrow t_{int} - \text{round}\{\hat{T}_{k/k}\}$$

$$\hat{T}_{k/k} \Leftarrow \hat{T}_{k/k} - \text{round}\{\hat{T}_{k/k}\} \qquad (15)$$

where round$\{x\}$ is the closest integer to x, i.e.

$$\text{round}\{x\} = \arg\min_{i \in Z} |i - x| \qquad (16)$$

where Z are the integers. It is clear that this redefinition leaves the estimate of true time given by equation (14) unchanged. This redefinition is done after every measurement update. If the MIC slew is operating in steady state, the time bias will be maintained at a very small value and this redefinition will not do anything. The absorption of the integral part of the clock bias will only happen after the first measurement update or if the MIC slew is deactivated.

Assuming $\tau_k$ denotes $k^{th}$ sampling time, then the $k^{th}$ MIC interrupt is triggered when the GTA MIC counter (which is strobed at the frequency $f_0/k_c$) counts up to a prescribed value, n(k). The GTA MIC counter then resets. The true MIC interrupt times ($\tau_k$, k=1,2,3 . . . ) are thus defined by:

$$\frac{1}{k_c}\int_{\tau_{k-1}}^{\tau_k} f_0(\xi) d\xi = n(k)$$

where $\tau_0$ is the true turn on time.

The Kalman update interval contains m MIC intervals and a Kalman crank interval is:

$$\frac{1}{k_c}\int_{\tau_k}^{\tau_{k+m}} f_0(\xi) d\xi = \sum_{i=k+m}^{k+m} n(i)$$

Figure 14:
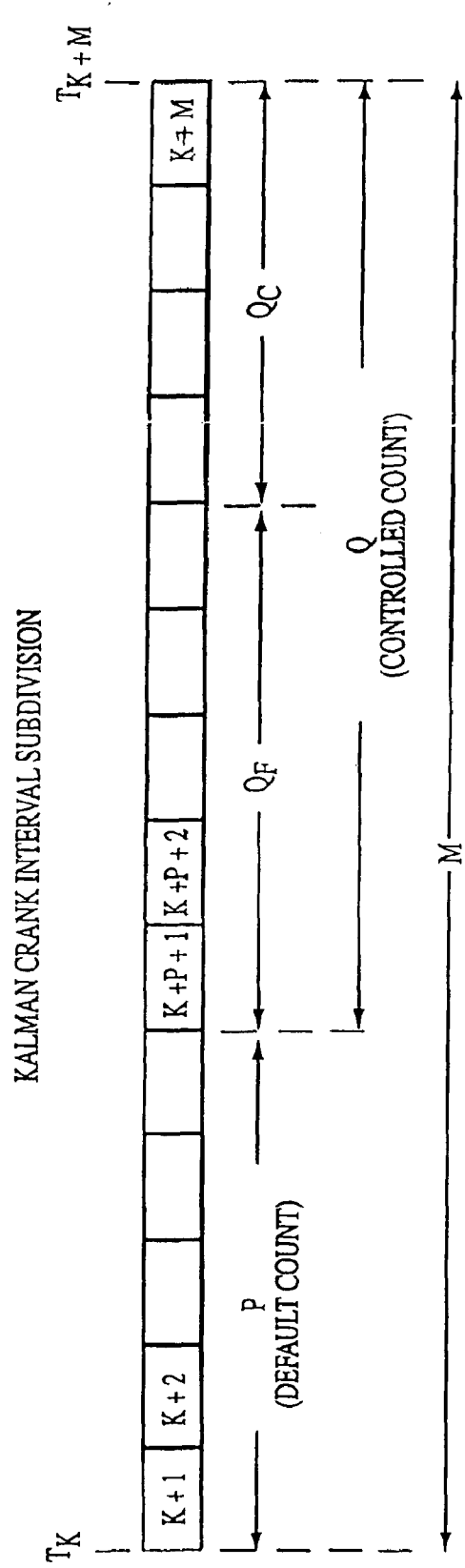
FIG. 14 is a graphic depiction of Kalman crank interval subdivisions.

The update interval is divided into subsections of length p and q=m−p, as in FIG. 14.

For the first p MIC intervals, the measurement update calculations at $t_k$ are still underway and a default MIC interval count $n_d$ is used. The value for the default MIC interval count is based on the previously estimated fractional frequency error so that the true MIC interval times are as close to the nominal as possible: (If this is the first Kalman crank, the estimate comes from preflight calibration of the oscillator.)

$$n_d = \text{round}\{\Delta_{MIC} \cdot f_0^{ref}(1-\hat{\epsilon}_{k-m/k-m})/k_c\}$$

For the remainder of the Kalman crank interval, the MIC interval counts are calculated to minimize the time bias estimate predicted at the end of the crank interval:

$$\frac{f_0}{k_c}(\tau_{k+m} - \tau_k) = pn_d + \sum_{i=k+p+1}^{k+m} n(i) \quad (17)$$

assuming $f_0(\xi)$ is slowly varying. Using the above definitions for the receiver time bias and frequency errors:

$$\tau_k = t_k - T(t_k)$$

then $$\tau_{k+m} = t_{k+m} - T(t_{k+m})$$

and $$f_0 = f_0^{ref}(1-\epsilon(t_k))$$

Substituting these values into equation (17) yields:

$$\frac{f_0^{ref}(1-\epsilon(t_k))}{k_c}(t_{k+m} - T(t_{k+m}) - [t_k - T(t_k)]) = pn_d + \sum_{i=k+p+1}^{k+m} n(i)$$

Let $\Delta_{MIC} = t_{k+1} - t_k$ be the nominal MIC interval in seconds (=1 sec). Then $t_{k+m} - t_k = m \cdot \Delta_{MIC}$, and:

$$\frac{f_0^{ref}(1-\epsilon(t_k))}{k_c}(m \cdot \Delta_{MIC} - [T(t_{k+m}) - T(t_k)]) = pn_d + \sum_{i=k+p+1}^{k+m} n(i)$$

Minimizing to find the integer sequence n(i) which makes the clock bias at the next crank as small as possible:

$$|T(t_{k+m})| = \left| m \cdot \Delta_{MIC} + T(t_k) - \left[ pn_d + \sum_{i=k+p+1}^{k+m} n(i) \right] \frac{k_c}{f_0^{ref}(1-\epsilon(t_k))} \right|$$

Note that this optimization problem defines only the sum of the sequence $$S = \sum_{i=k+p+1}^{k+m} n(i)$$

and can be expressed in the form:

$$S^* = \underset{S \in Z}{\text{argmin}} |A - SB| \quad (18)$$
$$= \underset{S \in Z}{\text{argmin}} |B(A/B - S)|$$
$$= \underset{S \in Z}{\text{argmin}} |A/B - S|$$

where:

$$A = m \cdot \Delta_{MIC} + T(t_k) - pn_d\left(\frac{k_c}{f_0^{ref}(1-\epsilon(t_k))}\right)$$

$$B = \frac{k_c}{f_0^{ref}(1-\epsilon(t_k))}$$

By definition of the round function, the minimum of equation (18) is attained if:

$$S^* = \text{round}(A/B) \quad (19)$$
$$= \text{round}\left[\frac{f_0^{ref}(1-\epsilon(t_k))}{k_c}(m \cdot \Delta_{MIC} + T(t_k))\right] - pn_d$$
$$= \text{round}\left[\frac{f_0^{ref}(1-\hat{\epsilon}_{k/k})}{k_c}(m \cdot \Delta_{MIC} + \hat{T}_{k/k})\right] - pn_d$$

The last line is used for computation because the causal estimates are substituted for the true quantities $\epsilon(t_k)$ and $T(t_k)$, which are unknown.

The optimal sum is generate by the following sequence which is preferred over other sequences because it produces a minimum variance from the optimal mean count value $S^*/q$. The last q MIC intervals in the Kalman crank are divided into two groups, one with $q_f$ intervals using n(i)= floor($S^*/q$) as the MIC register count and one with $q_c = q - q_f$ intervals with n(i)=floor($S^*/q$)+1 as the count: (20)

$$n(i) = \begin{cases} n_f = \text{floor}(S^*/q) & i \in \{k+p+1, k+p+2, \ldots k+p+q_f\} \\ n_c = \text{floor}(S^*/q)+1 & i \in \{k+p+q_f+1, k+p+q_f+2, \ldots k+m\} \end{cases}$$

The sum of the sequence is:

$$\sum_{i=k+p+1}^{k+m} n(i) = q_f \cdot n_f + q_c n_c$$
$$= q_f \cdot n_f + (q - q_f)(n_f + 1)$$

The integer $q_f$ that generates the minimum variance sequence that satisfies $$\sum_{i=k+p+1}^{k+m} n(i) = S^* \text{ is}: S^* = q_f \cdot n_f + (q - q_f)(n_f + 1)$$

which yields:

$$q_f = q(n_f+1) - S^* \quad (21)$$

which is greater than zero, provided $q, S^* \geq 1$. Then $q_c$ is:

$$q_c = q - q_f \quad (22)$$
$$= S^* - q \cdot n_f$$

During the period between the first two Kalman cranks, the MIC slew has to absorb time errors up to ½ second in magnitude. The MIC is disseminated to the spacecraft as a 1-PPS timing source. There for, the time between MIC interrupts cannot be shorter than 0.9999 seconds. ($\Delta_{MIC}=1$ sec.) To ensure that this constraint is met in the presence of a 100 nanosecond time quantization on the GTA and clock estimation uncertainties, the GNS uses a tighter constraint of $0.9999+100\times10^{-9}+3\sigma_T$ seconds, where $\sigma_T$ is the estimation uncertainty of the receiver clock in seconds. Since $\Delta_{MIC}$ is expected to be 1 second and $\sigma_T$ is expected to be around 100 nanoseconds, $\delta=9.96\times10^{-5}$ is used. If the shortest true time interval between MIC interrupts is less than $\Delta_{MIC}(1-\delta)$, the system redefines the MIC counts for MIC intervals k+p+2 to k+m so that the true time interval between MIC interrupts is as close to $\Delta_{MIC}$ as possible and lengthens the k+p+1$^{th}$ MIC interval so that the total length of the Kalman crank is increased by an integer number of seconds so that the length of the crank is $m\Delta_{MIC}+s$ seconds.

The MIC interrupt has been brought into coincidence with UTC boundaries at the true time of the next Kalman crank, this is still the case if an integer number of true seconds are added to the Kalman crank interval. The rate of change of the time bias estimate in the Kalman filter is computed based on the actual time sequence of MIC counts, assuring that the estimate of the time bias will evolve correctly.

The best estimate of the shortest true time interval resulting from the calculations this far is $n_f k_c / (f_0^{ref}(1-\epsilon_{k/k}))$. The minimum MIC interval constraint will be violated (on $q_f$ intervals) if:

$$\frac{n_f k_c}{f_0^{ref}(1-\hat{\epsilon}_{k/k})} < \Delta_{MIC}(1-\delta) \quad (23)$$

If the foregoing is true, the system redefines the true MIC interval for MIC interrupts k+p+2 to k+m to be as close to the nominal MIC interval as possible:

$$n(i) = n_{d,nxt} \; i \in [k+p+2, k+m] \quad (24)$$

where $$n_{d,nxt} = \text{round}\left\{\frac{\Delta_{MIC} f_0^{ref}(1-\hat{\epsilon}_{k/k})}{k_c}\right\}$$

The foregoing is the value for the default MIC count that is used for the next Kalman crank interval.

Next, the counts for the k+p+1$^{th}$ interval are defined so that the whole Kalman crank interval is lengthened by s seconds, according to the estimates of the clock parameters. A lengthening of s seconds means that instead of steering the clock bias to zero, the count is selected for this new interval so that the clock bias $T(t_{k+m})$ is as close to -s as possible. n(k+p+1) is selected from the integers to minimize:

$$|T(t_{k+m}) + s| = \left|m \cdot \Delta_{MIC} + T(t_k) - \left[pn_d + \sum_{i=k+p+1}^{k+m} n(i)\right]\frac{k_c}{f_0^{ref}(1-\varepsilon(t_k))} + s\right|$$

$$= \left|A + s - B \sum_{i=k+p+1}^{k+m} n(i)\right|$$

$$= |A + s - B[n(k+p+1) + (q-1)n_{d,nxt}]|$$

$$= |A' - Bn(k+p+1)|$$

where A and B are as defined in equation (18) and $A'=A+s-B(q-1)n_{d,nxt}$. The optimal integer value for n(k+p+1) is then:

$$n(k+p+1) = \text{round}\{A'/B\}$$

$$= \text{round}\left\{\frac{A+s-B(q-1)n_{d,nxt}}{B}\right\}$$

$$= \text{round}\left\{\frac{A+s}{B} - (q-1)n_{d,nxt}\right\}$$

$$= \text{round}\left\{\frac{f_0^{ref}(1-\hat{\epsilon}_{k/k})(m \cdot \Delta_{MIC} + \hat{T}_{k/k} + s)}{k_c} - pn_d - (q-1)n_{d,nxt}\right\}$$

$$= \text{round}\left\{\frac{f_0^{ref}(1-\hat{\epsilon}_{k/k})(m \cdot \Delta_{MIC} + \hat{T}_{k/k} + s)}{k_c}\right\} - pn_d - (q-1)n_{d,nxt}$$

The integer s is chosen so that the true-time length of MIC interval (k+p+1) is greater than $\Delta_{MIC}(1-\delta)$. This is accomplished by setting $\Delta_{\tau_{k+p+1}} > \Delta_{MIC}(1-\delta)$ or:

$$n(k+p+1) > \Delta_{MIC}(1-\delta)\frac{f_0(1-\varepsilon_k)}{k_c} \quad (25)$$

Since round(x) > x−½ for x > 0: n(k+p+1) > n'(s) where:

$$n'(s) = \frac{f_0^{ref}(1-\hat{\epsilon}_{k/k})(m \cdot \Delta_{MIC} + \hat{T}_{k/k} + s)}{k_c} - pn_d - (q-1)n_{d,nxt} - \frac{1}{2}$$

If the magnitude of the oscillator fractional frequency error is bounded by $|\epsilon_k|<\beta$, s is selected so that $$n(k+p+1) > n'(s) > \tag{26}$$

$$\Delta_{MIC}(1-\delta)\frac{f_0^{ref}(1+\beta)}{k_c} > \Delta_{MIC}(1-\delta)\frac{f_0^{ref}(1-\epsilon_k)}{k_c}$$

or $$s > \frac{k_c}{f_0^{ref}(1-\hat{\epsilon}_{k/k})}\left[\Delta_{MIC}(1-\delta)\frac{f_0^{ref}(1+\beta)}{k_c} + \frac{1}{2} + (q-1)n_{d,nxt} + pn_d\right] - m\cdot\Delta_{MIC} - \hat{T}_{k/k}$$

so $$s = ceil\left\{\frac{k_c}{f_0^{ref}(1-\hat{\epsilon}_{k/k})}\left[\begin{array}{l}\Delta_{MIC}(1-\delta)\frac{f_0^{ref}(1+\beta)}{k_c} + \frac{1}{2} + \\ (q-1)n_{d,nxt} + pn_d - m\cdot\Delta_{MIC} - \hat{T}_{k/k}\end{array}\right]\right\}$$

The upper bound for s is defined by:

$$s < ceil\left\{\frac{k_c}{f_0^{ref}(1-\beta)}\left[\Delta_{MIC}\frac{f_0^{ref}(1+\beta)}{k_c}((1-\delta)+(q-1)+p)+\frac{1}{2}\right]-m\cdot\Delta_{MIC}-\hat{T}_{k/k}\right\}$$

$$= ceil\left\{\left[\Delta_{MIC}\frac{(1+\delta)}{(1-\delta)}(m-\delta)+\frac{k_c}{2f_0^{ref}(2-\delta)}\right]-m\cdot\Delta_{MIC}-\hat{T}_{k/k}\right\}$$

$$< ceil\left\{\frac{m}{1-\beta}\left(2\beta\Delta_{MIC}+\frac{k_c}{2f_0^{ref}}\right)-\hat{T}_{k/k}\right\}$$

Now $|\hat{T}_{k/k}|\leq \frac{1}{2}$ since the whole value part of the clock bias is absorbed in $t_{int}$ (see equation 15), so $s\leq 1$ if:

$$\frac{m}{1-\beta}\left(2\beta\Delta_{MIC}+\frac{k_c}{2f_0^{ref}}\right) < \frac{1}{2}$$

This implies $$\beta < \frac{f_0^{ref}-mk_c}{(4m\Delta_{MIC}+1)f_0^{ref}}$$

With default values of m=180, $\Delta_{MIC}$=1 and $f_0^{ref}=10^6$; $\beta < 1.3867 \times 10^{-3}$ guarantees $s \leq 1$. This is a very loose requirement for the oscillator fractional frequency error (and its estimate) since the expected flight oscillator will be bounded by 30 ppm.

The the following equations are used for calculation of the MIC interval counts for a Kalman crank interval. The default control used for the first p interval is:

$$n_d = round\{\Delta_{MIC}\cdot f_0^{ref}(1-\hat{\epsilon}_{k/k})/k_c\} \tag{27}$$

then $$A = m\cdot\Delta_{MIC} + \hat{T}_{k/k} - pn_d\left(\frac{k_c}{f_0^{ref}(1-\hat{\epsilon}_{k/k})}\right) \tag{28}$$

$$B = \frac{k_c}{f_0^{ref}(1-\hat{\epsilon}_{k/k})}$$

$S^*=round(A/B)$ $n_f=floor(S^*/q)$ and $$n_c = n_f + 1 \tag{29}$$

If the minimum MIC constraint is satisfied (as it is in steady-state operation), i.e.:

$$\frac{n_f k_c}{f_0^{ref}(1-\hat{\epsilon}_{k/k})} \geq \Delta_{MIC}(1-\delta) \tag{30}$$

using the baseline rules:

$$n(i) = \begin{cases} n_d & i \in \{k+1, ..., k+p\} \\ n_f & i \in \{k+p+1, ..., k+p+q_f\} \\ n_c & i \in \{k+p+q_f+1, ..., k+p+m\} \end{cases} \tag{31}$$

where $q_f = q(n_f+1) - S^*$. If the minimum MIC interval constraint is violated, the following is calculated:

$$n_{d,nxt} = round\left\{\frac{\Delta_{MIC} f_0^{ref}(1-\hat{\epsilon}_{k/k})}{k_c}\right\} \tag{32}$$

$$s = ceil\left\{\frac{k_c}{f_0^{ref}(1-\hat{\epsilon}_{k/k})}\left[\begin{array}{l}\Delta_{MIC}(1-\delta)\frac{f_0^{ref}(1+\beta)}{k_c}+\frac{1}{2}+ \\ (q-1)n_{d,nxt}+pn_d-m\cdot\Delta_{MIC}-\hat{T}_{k/k}\end{array}\right]\right\}$$

$$A' = A + s - B(q-1)n_{d,nxt}$$

using the rule:

$$n(i) = \begin{cases} n_b & i \in \{k+1, ..., k+p\} \\ round\{A'/B\} & i \in \{k+p+1\} \\ n_{n,nxt} & i \in \{k+p+2, ..., k+p+m\} \end{cases} \tag{33}$$

The average rate of change of the time bias over the Kalman update interval is:

$$\bar{u}_k = \frac{\hat{T}_{k+m/k} - \hat{T}_{k/k}}{m\cdot\Delta_{MIC}}$$

Which is manipulated to:

$$\frac{f_0^{ref}(1-\hat{\epsilon}_{k/k})}{k_c}(m\cdot\Delta_{MIC}-\hat{T}_{k+m/k}+\hat{T}_{k/k})\sum_{i=k+1}^{k+m}n(i) \tag{34}$$

to obtain:

$$\bar{u}_k = 1 - \frac{k_c \sum_{i=k+1}^{k+m} n(i)}{m \cdot \Delta_{MIC} \cdot f_0^{ref}(1 - \hat{\varepsilon}_{k/k})}$$

This is the (constant) deterministic control value that is applied across the receiver time interval $[t, t_{k+m}]$ when propagating the estimate of receiver time bias in equation (12).

Figure 15:
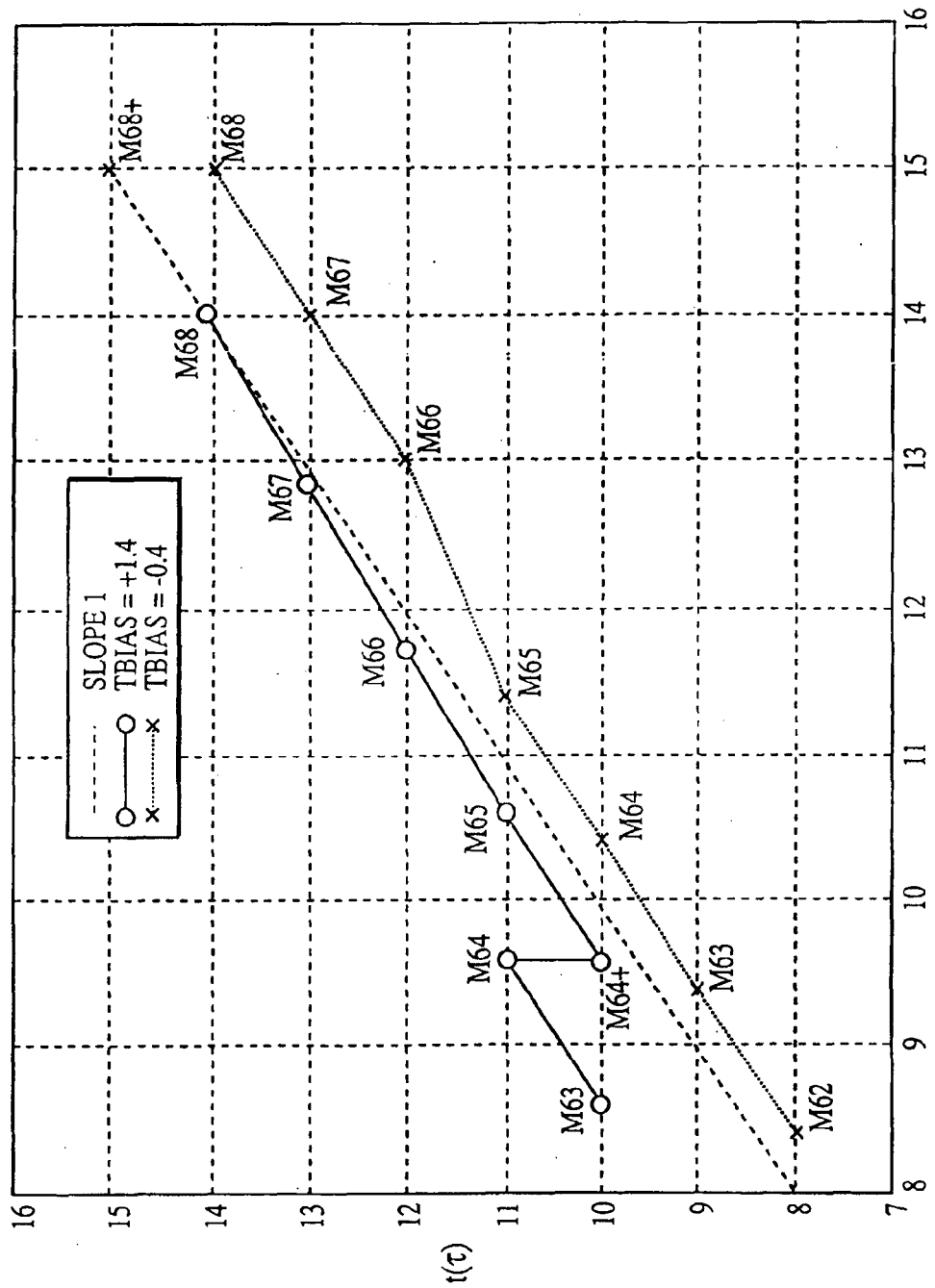
FIG. 15 is a graph of the MIC slew control.

To illustrate the operation of the MIC slew control, consider first a case in which the MIC interval is 1 second, the Kalman crank interval is 4 seconds, and the delay in implementing the MIC slew is 1 second (p=1). Assume that the time bias estimated after the 64th MIC interrupt is 1.4 seconds, that there is no frequency error, and that the time bias is perfectly estimated. This scenario is illustrated in FIG. 15 where the data is identified with o's (the "o" data):

After the rounded time bias is removed using equation (15), the time bias drops immediately to 0.4 seconds. This corresponds to point M64+. Note that the time bias is the difference between the "o" data and the slope 1 line. Following this, there is a period of one second in which the default MIC interval count ($n_d$) is used. The MIC slew control then removes the remaining 0.4 seconds of time bias by calculating a MIC interval count profile from equations (28) and (31). (The quantization effects are ignored in this example since they will not show up on a plot.) Since the time bias is positive, the unquantized MIC interval count is greater than its default value and the true time between MIC interrupts is lengthened so that the minimum length constraint is not active.

Next consider the case where the time bias estimated after the 64th MIC is −0.4 seconds. The true time between MIC interrupts resulting from using equation (31) would be lengthened by $^{0.4}/_3$ seconds. Therefore the minimum length constraint becomes active and the true time in the Kalman crank is increased by one second. The MIC is then aligned with the UTC time tics in the interval between MIC interrupts 65 and 66. During this alignment, the true time interval between MIC interrupts is increased to 1.6 seconds. Note that in this example also, there is a period after the 64th MIC in which the default MIC interval count is used. At the next Kalman crank time (the 68th MIC interval) the MIC interrupt is aligned with the UTC tic, but the time bias is now +1 second. Since equation (34) was used to propagate the filter estimate of the time bias, the Kalman filter "knows" this. When equation (15) is again invoked, the time bias is reset to zero (point M68+).

Dual-Processor Subsystems

Figure 17:
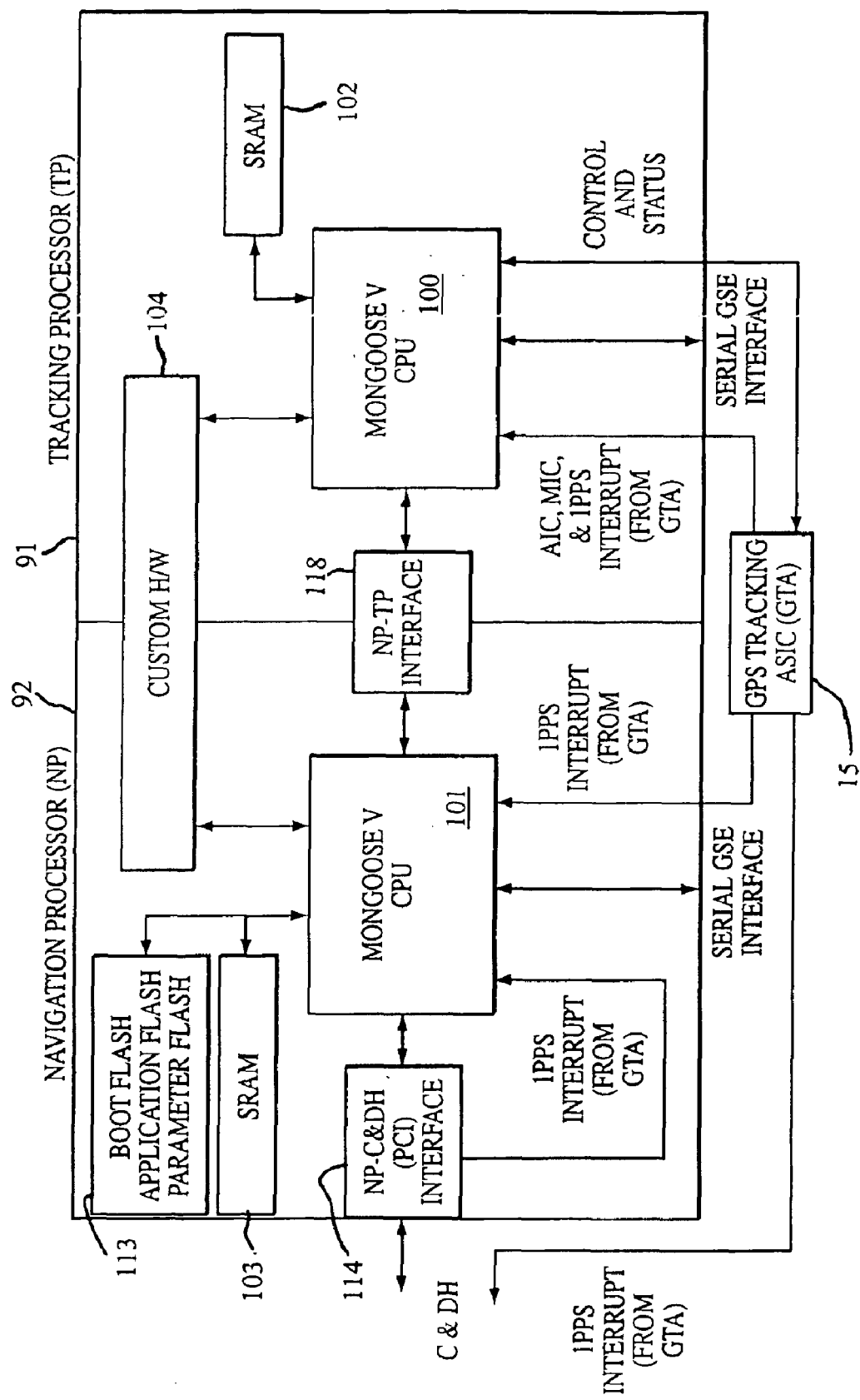
FIG. 17 is a simplified hardware layout of the dual processor subsystem.

The GNS software executes on two processors, a tracking processor 91 and a navigation processor 92. In the preferred embodiment, two Mongoose V, Synova, Inc. processors 100, 101 are used. They run on an adaptation of the 32-bit MIPS processor architecture. Like the GTA, the processors are implemented on a rad-hard HR2300 series gate array from Honeywell. FIG. 16 is a functional block diagram of the dual processor and FIG. 17 is a simplified layout of the hardware. Both processor hardware configurations are nearly identical and include Static Random Access Memory 102, 103 and other custom hardware 104 with the exception that the navigation processor has a command and telemetry interface with the spacecraft 110 and the tracking processor has a control and data interface to the GTA 112. In addition, the tracking processor has no nonvolatile memory and thus is slaved to the navigation processor, which is responsible for booting it up 113 after a reset and continually monitoring its health.

The navigation processor communicates with the spacecraft via a memory-mapped, 8-Kbyte, dual-port RAM (DPRAM), which interfaces to PCI hardware 114 on the spacecraft side of the DPRAM. The "sharing" of the DPIAN between the GNS and the spacecraft is arbitrated by the GSE by use of interrupts and defined access timing constraints. The navigation and tracking processors communicate with each other via interface software 116 and another memory-mapped 8-Kbyte DPRAM 118 and, like wise, arbitrate their access with the use of interrupts and defined timing constraints. While the navigation processor has read/write access to this entire DPRAM, the tracking processor has read/write access to the upper 4 Kbytes but only read access to the lower 4 Kbytes. This "read-only" memory provides a "pseudo-non-volatile memory" for the tracking processor, which is utilized during boot-up. The tracking processor communicates with the GTA via a custom address and data bus used for sending control and configuration information and receiving data and status. The software executes an extended Kalman filter 120 and provides orbit estimation and event prediction 121 and generates orbital elements 123 which is presented by way of a mathematical model immediately after the following functional descriptions of the software and its tasks.

GNS Software

The GNS software is presented as a functional block diagram in FIG. 16. It is partitioned between the tracking processor and navigation processor based on functional requirements, system topology, and required and available processor throughput. The navigation processor utilizes an embedded Operating System (OS) such as the Nucleus Plus produced by Accelerated Technologies, but only in a limited manner i.e., limited to task switching, interrupt handling, and minimal use of events and semaphores. The tracking processor does not make use of an OS due to unacceptable interrupt latencies on its high-rate interrupt (~667 sec). All navigation and tracking processor software is written in ANSI C, except for a minimal amount of modularized assembly code.

Tracking Processor Software

The major tasks performed by the GNS tracking software are listed in table 7. This software, in conjunction with the GTA, can acquire and track up to 12 space vehicles (SVs). The software 122 supports aided-search and sky-search acquisition modes for acquiring satellites on a channel-by-channel basis. In aided-search, aids 124 generated by the navigation processor are used to determine the SV pseudo-random noise (PRN) and the Doppler range searched out for potential acquisition. In sky-search, no aids are provided and the system searches a wide Doppler range for SV PRNs from a predetermined set. For each signal acquired, the software uses a third-order, phase locked loop 126 to track the carrier, and an aided first-order, delay-locked loop to track the CA code. A signal monitor is used to determine when a channel drops lock. When this occurs, the processor autonomously tries to reacquire the satellite with a short search. If this fails, the channel switches to the sky-search acquisition mode or if aided by the NP, to the aided acquisition mode.

The software makes carrier and pseudo-range measurements 128 every second for each satellite in track, and outputs these data to the navigation processor. In addition, the software builds GNS message subframes 130, validates them using the message parity bits, and then out puts validated subframes to the navigation processor message handler software 132. Interrupts generated by the GTA control the sampling and processing of the data from the 2 tracking channels on the GTA. A measurement signal generated by the GTA is used to control processing and handling of the pseudo-range and carrier phase data, and subsequent output to the navigation processor.

TABLE 7

Major GNS Tracking Software Tasks

Accept and apply acquisition aids
Execute sky-search algorithm in absence of aids
Control the GTA
Track up to 12 SVs simultaneously
Generate validated GPS message subframes
Determine SV transmit time for latched data
Execute commands from the navigation processor Navigation Processor Software Table 8 details the major tasks performed by the navigation processor. The core of the navigation processor software is the Kalman filter task, which consists of two main parts: the Extended Kalman Filter (EKF) and the Short-Term Propagator (STP). The Kalman filter updates the state vector and covariance at 180-second intervals and the STP generates all of the data products and outputs them at 1-second intervals.

TABLE 8

Major GNS Navigation Software Tasks

Process 1 CCSDS telecommand packet per second
Output 6 CCSDS telemetry packets per second
Output unpacketized data to guidance and control instruments every second
Generate a pseudo-range table
Build OPS message data stores
Execute Kalman filter crank every 180 seconds
Output a PVTSE data set once per second; (PVTSE = Position, velocity, time, Sun vector events)
Generate acquisition aids
Generate control for steering 1 PPS signal
Generate and output long-term propagation data The GNS uses a Fault Detection and Exclusion (FOB) RAIM technique. The software excludes measurements from the GSE whose residuals exceed a defined threshold via the Kalman filter. The GNS uses a current-state EKF to obtain the current best estimate of the position and velocity of the TIMED satellite center of mass. The EKF is essentially a simulation corrected by periodic measurement updates. The updates normally occur every 180 seconds and process GNS range and phase measurements for up to 12 satellites in track. The state propagation in the EKF contains a Jacchia upper atmospheric density model and a gravity model using degree and order 15 spherical harmonics from the EGM96 database.

The EKF uses a state space containing 45 states, defined in Table 9, to model the measurements. The drag error state normally represents the error in the drag model, which is dominated by the unpredictability of the upper atmospheric density. If the parameters for the density model are unavailable, the drag error state can be used to model the whole drag effect.

TABLE 9

The GNS EKF State Space

| Parameter | Number of States: |
|---|---|
| Position | 3 |
| Velocity | 3 |
| Drag Parameter Error | 1 |
| Clock Error | 1 |
| Frequency Error | 1 |
| Selective Availability Markov Process | 24 |
| Integrated Carrier Phase Bias | 12 |
| Total | 45 |

The prediction capability of the EKF is primarily determined by how rapidly the atmospheric density fluctuates in reaction to solar activity, which will be at a maximum during the TIMED mission.

The clock and frequency error states are used within a control system that drives the STA's measurement clock and 1 PPS output to be coincident with UTC epochs. This latching signal is also used to define the time of validity of the output data products.

A two-state damped harmonic oscillator driven by process noise models the selective availability errors for each SV link. The integrated carrier phase bias is used to model the integer ambiguity associated with the phase tracking process. These selective availability (SA) Markov and carrier phase biases are reinitialized when new satellites are brought into track or during reacquisition after a tracking loss of lock.

After each measurement update, the Kalman filter state is propagated for 180 seconds to the next (anticipated) update time. After this, the STP propagates the state for two more 180-second intervals. These additional propagations are used only for generating real time GNS output data products for the spacecraft (position, velocity, time, Sun vector, event notification flags, and data validity flags) and do not affect the Kalman filter solution. A 5th degree Hermite interpolating polynomial is fit to the three points position and three velocity points forming the boundaries of the two additional propagations. The interpolating polynomial matches position and velocity at the boundary points and is used to interpolate position and velocity to one second intervals. The interpolated position and velocity are used to generate the five event notification flags: 1) primary ground station contact, 2) backup ground station contact, 3) SAA encounter, 4) polar region and 5) day/night at sub-satellite point (used for signaling a terminator crossing).

Approximately every 12 hours, a long-term propagation (LTP) is executed in order to predict the primary and backup ground station contacts, and the SAA encounters for the next 60 hours. The duration of the propagation is limited by the required accuracy of the data, which is largely dependent on the uncertainty of the atmospheric density at solar max. During the LTP, a state vector corresponding to each predicted ground station contact is saved and used to generate an orbital element set for the respective contact. All of the LTP data products are used solely on the ground (i.e., not utilized onboard) by the MOC and the instrument Payload Operations Centers (POC).

Extended Kalman Filter

The TIMED system thus far described is realized through the application of an extended Kalman filter. The filter distills information accumulated from received GPS signals into current state estimates. This is accomplished by propagation and measurement equations which involve nonlinear transformations of the state. A mathematical model defining the processes of the program implementation of the extended Kalman filter is presented immediately after the following graphic description of the filter.

The time update of the Kalman filter state contains models for the earth's gravity field and for drag. However, since the drag model is uncertain, an error state is included in the state space. Small errors induced by these and other sources are eliminated by a linearization process wherein small errors in the state are estimated and added to the whole value state.

The filter processes both pseudo-range and carrier phase measurements. The pseudo-range measurements offer a noisy (3–5 m with CA code) measurement of slant range from the TIMED satellite to each GPS satellite. The carrier phase measurements provide precise measurements of line-of-sight velocity which is fully exploited only when the selective availability mode is off.

The Kalman filter state space is divided into two partitions which are dynamically uncoupled. The first partition includes the states which directly determine the satellite position and time, i.e., position, velocity, drag parameter error, receiver clock and frequency bias. These states evolve according to nonlinear dynamics. The influence of the receiver position on the measurements is also a nonlinear transformation.

The filter estimates current position and velocity in the conventional inertial system (J2000). The position and velocity change as a result of gravitational acceleration (as provided by a 15×15 spherical harmonic model) and the drag acceleration (provided by the U.S. Space Command high altitude atmosphere model). Any errors in the drag model are absorbed by the drag error state.

The effects of the imperfect receiver clock are modeled by the time bias and clock frequency error which have been defined in the Receiver Timing section of this patent specification. The time rate of change of the receiver clock is the receiver frequency error.

The second partition of the state space contains states which do not directly affect TIMED position and time. They are used to model errors in the GPS measurements. These states evolve according to linear dynamics and their influence on the measurements is also linear.

These selective availability states are a set of second-order Markov processes, one for each link, which model the effect of selective availability on the pseudo-range and carrier phase measurements. A second order process is used with an undamped natural frequency of 300 seconds, damping ratio of 0.4, and a steady state standard deviation of 75 m. When a GPS track is initiated, the selective availability state standard deviation is initialized with the steady state standard deviation.

The carrier phase bias states model the unknown cycle ambiguity in the phase-derived range. The carrier phase bias state standard deviation is initialized at 1.e9 when a new track is initiated, or when loss of phase-lock is detected.

The Kalman filter can be initialized in one of three ways: 1) The normal mode of initialization through pre-loaded orbital insertion data. The separation position and velocity in an ECEF coordinate system are loaded by command prior to launch. When the separation event is detected, the Kalman filter transforms the initial conditions to J2000, initialize its state and covariance, resets the crank interval counter, and begins cycling. 2) through a GPS doublet. In this mode, the GPS point solutions are used to establish the initial position, velocity and associated covariance. This process assumes that the point solutions are close enough in time that the TIMED velocity can be regarded as constant. The Kalman filter uses the GPS doublet to reinitialize this state if it detects that its state vector is inconsistent with a large number of GPS measurements. 3) through a commanded upload. In this mode a NORAD two line element set (compatible with the SGP4 orbit propagator) is transformed to a J2000 state vector and covariance by the ground system. This mode is intended for unusual cases in which the GPS cannot function.

The filter time update propagates the state and covariance between measurements. The filter time update is done immediately after the measurement update so that the MIC corrections can be spread evenly across a Kalman crank interval. This requires that the Kalman filter measurement updates be evenly spaced.

Every 180 seconds, difference measurements are formed on the basis tracker and GTA data latched at the corresponding MIC. The difference measurements are the pseudo-range and carrier phase minus their predicted values. At this time, measurement sensitivity is calculated. The filter state and covariance are updated by the measurement update process. The Kalman filter residuals are monitored to verify that there are no huge discrepancies between the Kalman filter state and the measurements. If there are, the filter is reinitialized using the GPS doublet. After the measurement update, the GNS output products are generated and a check is made to determine whether the long-term propagation should begin.

The independent variable in this state propagation is receiver time. An increment of receiver time differs from an increment of true time because of the receiver oscillator frequency error. The position, velocity, drag, clock and fractional frequency error states (the dynamic states) are coupled dynamically to each other by a system of nonlinear ordinary differential equations, the derivations of which commences with equation (35). A transition matrix that propagates small errors in these states is generated using the gradient of the dynamic state derivative with respect to the dynamic state. This discrete time process noise matrix for the dynamic states is also found by integrating its o.d.e. which involves the same gradient.

The system of nonlinear ordinary differential equations describing the state dynamics is solved by using an $8^{th}$ order Runge-Kutta Fehlberg algorithm. The performance of the filter begins to degrade because of measurement thinning if the step size is increased beyond 180 seconds. Because propagation is from measurement to measurement, a fixed-step size version of the algorithm is used. The RFK8 algorithm requires 12 function evaluations per step. The subroutine that implements the algorithm integrates vector (not matrix) differential equations. Therefore, the discrete time process noise matrix must be remapped into a vector as well as its derivative.

The selective availability (SA) states and the phase biases (the "sat" states) obey linear dynamics. The separation between measurements is constant, allowing the continuous part of the transition matrix and discrete time process noise to be precomputed. The "sat" states are ordered according to tracker channel. The transition matrix (and the discrete time process noise matrix for the "sat" states) model the effects of a new GPS satellite in a given tracking channel.

A full state ("dyn"+"sat") transition matrix is formed from the block-diagonal concatenation of the "dyn" and "sat" transition matrices. The "dyn" partition is computed by solving an o.d.e. containing the "dyn" state derivative gradient. The covariance factor is updated for deterministic effects by premultiplying it by the full state transition matrix using a sparse matrix multiply routine. To accomplish the stochastic update of the covariance factor, a vertical concatenation of the deterministically updated covariance factor and the full-state discrete time process noise factor is formed. This array is then decomposed into an orthogonal matrix and upper triangular matrix using a sparse QR decomposition algorithm. The updated covariance factor (transpose) is found in the upper part of the upper triangular matrix.

The raw pseudo-range and carrier phase measurements are formed from the following quantities: 1) fractional chip count (pass-through from GTA); 2) chips into epoch (pass-through from GTA); 3) epochs into bit (from tracking SW bit sync process); 4) high order bits of Z-count or TOW (Time Of Week) (from message); 5) GPS week (from message); 6) whole cycle count; 7) fractional cycle count; and 8) receiver time.

Predicted pseudo-range and carrier phase for each satellite in track is then calculated from the receiver position, the SA and phase bias states of the GPS message ephemeris. Since the predicted pseudo-range is a function of the satellite position at the predicted transmit time (which in turn depends on the predicted pseudo-range) this process is iterative. The Kalman filter processes the difference between the raw measurements and their predicted values. The measurement sensitivity depends on the unit vectors from the TIMED satellite to the GPS satellites in track. They are produced in the calculation of predicted pseudo-range.

In the Levy square root covariance Kalman filter derivations, the array on the left of equation (67) is formed from the measurement noise factor, the time-updated covariance factor, and the measurement. This array is factored into an orthogonal matrix and an upper triangular matrix containing the measurement update covariance factor, and the W matrix which is used to compute the Kalman gain.

After every measurement update, the filter launches a low precision state propagation to fill a table containing position, velocity, sun-vector, event notifications, and time for the next 180+ seconds. In this mode the orbit propagator may only use the J2 part of the gravity module to improve execution speed. The event notifications are: 1) entry into the South Atlantic Anomaly (SAA) or Polar regions, 2) ground contacts and 3) terminator crossings.

Every 12 hours, the Kalman filter launches a high precision orbit propagation using its last computed state vector. This trajectory is monitored for contact events and any SAA entry. When a contact event is found, the trajectory points near the AOS are used to define an element set appropriate for used in the NORAD SGP4 algorithm. After every measurement update, the Kalman filter produces acquisition aides for the tracking software. The aids contain Doppler and Doppler rate for all GPS satellites based on the current TIMED state vector and current almanac ephemeris.

To avoid missing an event because of the granularity of the propagated orbit, the event detection and prediction is based on polynomials fit to functions of the propagated points. For the contact events, a polynomial is fit to the elevation of the TIMED satellite as seen by the various ground stations evaluated at the trajectory points. The roots of this polynomial are the AOS (going+) and LOS (going−) times. If AOS−LOS>5 minutes, it is a valid contact. For the South Atlantic Anomaly, a polynomial is fit to the latitude and longitude polynomials of the sub-satellite point. The points at which the latitude and longitude polynomials cross the latitudes and longitudes of the SAA region is calculated. If the satellite is in the SAA latitude band at the same time it is in the longitude band, an SAA event is flagged. The polar region is done in a similar fashion, except only the latitude is used. For the terminator crossings, a curved is fit to the inner product of the sun-vector and the unit normal to the reference episode at the sub-satellite point. The roots of this polynomial define the terminator crossings.

Kalman Filter Implementation

The following presentation mathematically describes the processes carried out by the software in implementing the various routines used to accomplish the tasks of the extended Kalman filter which forms the nucleus of the GNS.

The state space for the TIMED GNS Kalman filter is:

$$x(t) = \begin{bmatrix} w(\tau(t)) \\ \alpha(t) \\ T(t) \\ \varepsilon(t) \\ sa(t) \\ b(t) \end{bmatrix}_{9+3 \cdot n_{max} \times 1} \quad (35)$$

where $w(\tau(t))$ is the position and velocity of the TIMED center of mass (CM) in the conventional inertial system (CIS):

$$w(\tau(t)) \equiv \begin{bmatrix} r(\tau(t)) \\ v(\tau(t)) \end{bmatrix}_{6 \times 1} \text{(TIMED inertial position \& velocity)}.$$

Note that $w(\tau(t))$ is defined as a composite function: $w(\cdot)$ is an explicit function of true time. The evolution of $w(\cdot)$ is governed by Newton's second law, which involves derivatives taken according to true time (not receiver time). The units of $w(\cdot)$ are meters and meters per second. The drag error parameter is defined as the ratio of the true value of the parameter group $\rho \cdot C_D \cdot A/(2 \cdot M)$ to its nominal value:

$$\alpha(t) \equiv \left(\frac{\rho \cdot C_D \cdot A}{2 \cdot M}\right) \div \left(\frac{\rho \cdot C_D \cdot A}{2 \cdot M}\right)^{nominal} \text{(drag parameter)}.$$

The state $\alpha$ includes the effects of errors in density, drag coefficient, projected area, and satellite mass. The first term on the right is the true parameter group, the second is the parameter group predicted by the density model, with the nominal spacecraft ballistic coefficient, mass, and an average projected area.

The clock related states $T(t)$ and $\varepsilon(t)$ and are defined according to:

$$T(t) \equiv t - \tau(t) \text{ (Clock bias)} \quad (36)$$

$$\varepsilon(\tau) \equiv \frac{f_0^{ref} - f_0(\tau)}{f_0^{ref}} \text{(Fractional frequency bias)}. \quad (37)$$

The effect of selective availability is modeled as a two-state Markov process for each satellite. The vector $sa(t)$ contains two states for each satellite that can be tracked for a total of $2n_{max}$ states:

$$sa(t) = [sa_1(t) sa_2(t) \cdots sa_{2 \cdot n_{max}-1}(t) sa_{2 \cdot n_{max}}(t)]^t. \quad (38)$$

The odd elements of $sa(t)$ represent the effect of SA in meters on the pseudo-range and integrated carrier measurements. The even elements are the (receiver) time derivatives of the odd elements. The vector $b(t)$ is an array of phase derived range biases to account for the arbitrary initialization of the integrated carrier phase measurement:

$$b(t) = [b_1(t) b_2(t) \cdots b_{n_{max}-1}(t) b_{n_{max}}(t)]^t \text{ (Phase derived range biases)}.$$

The equations defining the forming and processing of the Kalman filter measurements use the index k to denote times at which a Kalman filter measurement is to be processed, which is every $m^{th}$ MIC interrupt. Previously, k was used to denote the MIC times.

The pseudo-range measurement begins with the raw data where the GPS signal coming into the TIMED antenna at true time $\tau$ is:

$$s_R(\tau) = CA(PRN^v, t^v(\tau)) \cdot m(t^v(\tau)) \cdot \sin(2\pi \hat{f}_{L1} t^v(\tau) - \Phi_{iono}^{L1/C1}(\tau)) \quad (39)$$

where $PRN^v$ is the PRN (pseudo random noise) number of the satellite in tracking channel v, $CA(PRN^v, t^v)$ is the CA (coarse acquisition) code transmission for the satellite as a function of the signal-indicated transmit time $t^v(\tau)$, $m(t^v(\tau))$ is the data modulation of the GPS transmission, $\sin(2\pi \hat{f}_{L1} t^v(\tau) - \Phi_{iono}^{L1/C1}(\tau))$ is the GPS carrier, $\hat{f}_{L1}$ is the nominal GPS carrier frequency 1575.42 Mhz, and $\Phi_{iono}^{L1/C1}(\tau)$ is the phase retardation of the GPS carrier (relative to the code) caused by ionospheric dispersion. This is equal to the difference in the phase and group delays:

$$\varphi_{iono}^{L1/C1}(\tau) = \frac{2\pi \hat{f}_{L1}}{c}(I_p^v(\tau_k) - I_g^v(\tau_k)) \quad (40)$$

where $I_g^v(\tau^k)$ is the group delay in seconds and $I_p^v(\tau_k)$ is the phase delay. The GNS receiver generates a local replica of the GPS CA code, which is synchronized with the received code when the receiver has locked-up:

$$CA(PRN^v, t^v(\tau)) = CA(PRN^v, t(\tau))$$

At receiver time $t_k = t(\tau_k)$, the local code phase is latched, this is the measurement interrupt clock (MIC) event. The value of the transmit time in seconds since the GPS standard epoch in terms of the local code phase and quantities in the GPS message is:

$$t_k^v = \text{t\_int}_k^v + \text{t\_float}_k^v \quad (41)$$

$$\text{t\_int}_k^v = GPS\_week_v \cdot 86400 \cdot 7 + TOW \cdot 6$$

$$\text{t\_float}_k^v = \begin{bmatrix} \dfrac{bits\_n2\_sframe_x}{50} + \dfrac{epochs\_n2\_bit_x}{1000} + \\ \dfrac{chx\_cacode\_phase + chx\_codenco\_phase/2^{16}}{1023000} \end{bmatrix}$$

Here $t_k^v$ is the receiver estimate of the transmit time of that point in the CA code that the local code was correlating with at the $k^{th}$ MIC. It is composed of an integer part and a floating point part which can never exceed 6 seconds. The quantities $bits\_n2\_sframe_x$ and $epochs\_n2\_bit_x$ represent the number of completed bits into the current subframe and the number of completed code epochs into the current bit for tracking channel x. They are maintained by the tracking software after it has achieved bit and frame synchronization. The quantities $chx\_cacode\_phase$ and $chx\_codenco\_phase$ are read from the registers on the TIMED GTA chip containing the full chip count and the fractional chip count for tracking channel x. The variable $GPS\_week$ (the current GPS week) is initially set by the contents of word 3 of subframe 1 in the GPS message and is incremented by one (and $seconds\_n2\_week$ is decremented by 7·86400) if $seconds\_n2\_week = TOW \cdot 6 + T\_float_k^{84}$ exceeds 7·86400. TOW is the number of 6 second counts from the beginning of the week to the beginning of the next subframe, taken from the handover word of the last completely assembled subframe.

The pseudo-range is then constructed as:

$$\rho_k^v = c \cdot (t_k - t_k^v) \quad (42)$$

$$= c \cdot [(t_k - \text{t\_int}_k^v) - \text{t\_float}_k^v]$$

where c is the speed of light, and $t_k = MIC\_time_k + t_{int}$ is the (controlled) receiver time corresponding to the MIC. Note that the large integers $t_k$ and $t\_int^v$ are differenced before subtracting the floating point number $t\_float_k^v$ so as not to lose precision. The model for the indicated receive time is: $t_k = \tau_k + T_k$.

The signal indicated transmit time is the transmit time derived from the modulation on the GPS signal. The model for the signal-indicated transmit time is:

$$t_k^v = \tau_k^v + T^v(\tau_k^v) + \frac{1}{c} sa_*^v(\tau_k^v) \quad (43)$$

The receiver indicated transmit time is the signal indicated transmit time corrupted with receiver tracking errors:

$$\hat{t}_k^v \equiv t_k^v + \delta t_k^v \quad (44)$$

$$= \tau_k^v + T^v(\tau_k^v) + \frac{1}{c} sa_*^v(\tau_k^v) + \delta t_k^v$$

where $t_k^v$ is the signal-indicated transmit time and $\delta t_k^v$ is the tracking error: $\tau_k^v \equiv \tau^v(t_k)$ is the true transmit time of the signal being tracked in channel v at the $k^{th}$ MIC interrupt, $T^v(\tau_k^v)$ is the GPS satellite clock bias, $sa_*^v(\tau_k^v)$ is the selective availability process, and the receiver tracking error, $\delta t_k^v$, is assumed to be white at the MIC interval. The true transmit and receive times are related by:

$$\tau_k - \tau_k^v = \int_{PATH} \frac{|dr|}{v_g(r)}$$

where $v_g(r)$ is the group speed of the GPS transmission as a function of position, and where the integration path (PATH) begins at the GPS satellite position at the true transmit time $(r_{cis}^v(\tau_k^v))$, and ends at the position of the receiver antenna at the receive time $(r^{ant}(\tau_k) = r(\tau_k) + T_{body}^{cis}(\tau_k) L_{ant})$. Here $r(\tau_k)$ is the TIMED center of mass position in the CIS system at the true receive time $\tau_k$, $r_{cis}^v(\sigma_k^v)$ is the true position of the GPS satellite in track by channel v at the transmit time $\tau_k^v$, $L_{ant}$ is the CM to antenna phase center lever arm in the TIMED body system, and $T_{body}^{cis}(\tau)$ is the transformation from body to inertial coordinates obtained from the attitude system.

Assuming:

$$\frac{1}{v_g} = \frac{1}{c} \cdot \frac{1}{1 - (1 - v_g/c)}$$

$$\cong \frac{1}{c}\left[1 + \left(1 - \frac{v_g}{c}\right)\right]$$

the free space range delay and the ionospheric delay are separable, so that the time difference may be modeled as:

$$\tau_k - \tau_k^v \cong \int_{PATH} \frac{|dr|}{v_g(r)}$$

-continued $$\cong \frac{1}{c}\int_{PATH}|dr| + \frac{1}{c}\int_{PATH}\left(1 - \frac{v_g(r)}{c}\right)|dr|$$

$$= \frac{1}{c}|r^v(\tau - \Delta^v(\tau)) - r^{ant}(\tau)| + \frac{1}{c}\int_{PATH}\left(1 - \frac{v_g(r)}{c}\right)|dr|$$

$$= \Delta^v(\tau_k) + I_g^v(\tau_k)/c$$

where $\Delta^v(\tau)$ is the free-space range delay (in seconds) for the $v^{th}$ link, and $$I_g^v(\tau_k) = \frac{1}{c}\int_{PATH}\left(1 - \frac{v_g(r)}{c}\right)|dr| \quad (45)$$

$$= \frac{1}{c}\int_{PATH}(1 - n(r))|dr|$$

is the ionospheric range delay (in meters) at the true receive time. Here n(r) is the index of refraction as a function of position. The free space range delay is given implicitly by:

$$\Delta^v(\tau) = \frac{1}{c}\left|r^v(\tau - \Delta^v(\tau)) - (r(\tau) + T_{body}^{cis}(\tau)L_{ant})\right|$$

$$= \frac{1}{c}\left|r^v(\tau - \Delta^v(\tau)) - r^{ant}(\tau)\right|$$

where $r^{ant}(\tau) = r(\tau) + T_{body}^{cis}(\tau)L_{ant}$ is the position of the TIMED GPS antenna. The model for the raw pseudo-range measurement is:

$$\rho_k^v = c \cdot (t_k - \hat{t}_k^v) \quad (46)$$

$$= c \cdot (\tau_k + T_k - \tau_k^v - T^v(\tau_k^v) - sa_*^v(\tau_k^v)/c - \delta t_k^v)$$

$$= c \cdot (\Delta^v(\tau_k) + I_g^v(\tau_k)/c + T_k - T^v(\tau_k^v) - sa_*^v(\tau_k^v)/c - \delta t_k^v)$$

$$\cong c \cdot (\Delta^v(\tau_k) + T_k - T^v(\tau_k^v) - \delta t_k^v) + I_g^v(\tau_k) + sa^v(\tau_k)$$

where a second order markov random process in the range domain keyed on receiver time, $sa^v(\tau_k)$, is used to model the true selective availability process—$sa_*^v(\tau_k^v)$ (note the sign reversal).

The Kalman filter pseudo-range difference measurement is constructed as the difference between the measured pseudo-range and pseudo-range predicted from all measurements processed up to the previous time:

$$y_\rho^v(k) \equiv \rho_k^v - \hat{\rho}_{k/k-1}^v \quad (47)$$

The predicted pseudo-range is given by:

$$\hat{\rho}_{k/k-1}^v = c \cdot (\hat{\Delta}_{k/k-1}^v + I_{g,mess}^v(\hat{t}_k^v)/c + \hat{T}_{k/k-1} - T_{mess}^v(\hat{t}_k^v) + \hat{s}\hat{a}^v(t_{k/k-1}))$$

where:

$\hat{\Delta}_{k/k-1}^v \equiv$ estimated free space range delay
$I_{g,mess}^v(\hat{t}_k) \equiv$ group delay from GPS message
$\hat{T}_{k/k-1} \equiv$ estimated receiver clock bias (controlled)

$T_{mess}^v(t_k^v) \equiv$ GPS satellite clock error derived from message $$= a_0^v + a_1^v(siw(\hat{t}_k^v) - t_{0c}) + a_2^v(siw(\hat{t}_k^v) - t_{0c})^2$$

$siw(\hat{t}_k^v) \equiv$ seconds into GPS week corresponding to $\hat{t}_k^v$
$a_i^v \equiv$ Clock compensation the params for sat $v$ (all from current message page)

$t_{0c} \equiv$ epoch for clock compensation (seconds into week)

$\hat{s}\hat{a}^v(t_{k/k-1}) \equiv$ estimated selective availability markov (range)

$$= \hat{s}\hat{a}_{k/k-1}^{2v-1} \text{ (See equation (38))}$$

The estimated range delay is defined implicitly by:

$$0 = \hat{\Delta}_{k/k-1}^v - \frac{1}{c}\left|r^v(\tau_{k/k-1} - \hat{\Delta}_{k/k-1}^v) - r_{k/k-1}^{ant}\right| \quad (48)$$

where: $\hat{r}_{k/k-1}^{ant} \equiv \hat{r}_{k/k-1} + \hat{T}_{body}^{cis}(t_k)\hat{L}_{ant}$ $\hat{\tau}_{k/k-1} \equiv$ estimated true receiver time $$= t_k - \hat{T}_{k/k-1}$$

$\hat{r}_{k/k-1}^{ant}$ is the estimate of TIMED GPS antenna position in the CIS coordinate system at the receive time and $r^v(\hat{\tau}_{k/k-1} - \hat{\Delta}_{k/k-1}^v)$ is the position of the GPS satellite tracked by channel $v$ at the estimated transmit time. (The procedure used to solve equation (48) for $\hat{\Delta}_{k/k-1}^v$ follows.)

An iteration is used to find the solution to the light-time equation:

$$0 = \xi(\hat{\Delta}_{k/k-1}^v)$$

where:

$$\xi(\Delta) = \Delta - \frac{1}{c}\left|r^v(\hat{\tau}_{k/k-1} - \Delta) - \hat{r}_{k/k-1}\right|$$

$$r^v(\tau) = T_{cts}^{cis}(\tau)r_{cts}^v(\tau)$$

$r_{cts}^v(\tau)$ is the position of the $v^{th}$ satellite in the earth-fixed CTS frame calculated from the GPS message ephemeris.

Using an initial guess for $\Delta$:

$$\Delta(0) = \frac{1}{c}\left|r^v(\hat{\tau}_{k/k-1}) - \hat{r}_{k/k-1}\right| \quad (49)$$

the iteration proceeds as:

$$\Delta(j+1) = \frac{1}{c}\left|r^v(\hat{\tau}_{k/k-1} - \Delta(j)) - \hat{r}_{k/k-1}\right| \quad (50)$$

until $|\Delta(j+1) - \Delta(j)| \leq tol$. Typically, tol=1.e−11 seconds. At convergence set $\hat{\Delta}_{k/k-1}^v = \Delta(j)$.

In the Kalman filter, the pseudo-range difference measurement is determined by substituting into equation (47):

$$y_\rho^v(k) = c \cdot (\Delta^v(\tau_k) + T_k - T^v(\tau_k^v) - \delta t_k^v) + I_g^v(\tau_k) + sa^v(t_k) -$$

$$c \cdot (\hat{\Delta}_{k/k-1}^v + \hat{T}_{k/k-1} - T_{mess}^v(t_k^v)) - I_{g,mess}^v(t_k^v) - \hat{s}\hat{a}_{k/k-1}^{2v-1}$$

$$= c \cdot (\delta\Delta_k^v + \delta T_k) + \delta sa_k^{2v-1} + \delta \rho_k^v$$

this assumes that $I_{g,mess}^v(t_k^v) = I_g^v(\tau_k)$ and $T_{mess}^v(t_k^v) = T^v(\tau_k^v)$ (no errors in the ionospheric compensation or GPS clock compensation in the GPS message data). $\delta\rho_k^v = c \cdot \delta t_k^v$ is a white noise process representing all high frequency delay-locked loop errors, and $\delta\Delta_k^v \equiv \Delta^v(\tau) - \hat{\Delta}_{k/k-1}^v$ is the error in the estimated free space range delay. The solution for $\delta\Delta_k^v$ in terms of the Kalman filter error state follows:

The errors in position and velocity are synchronous, therefor:

$$\hat{r}_{k/k-1} = r(\tau(t_k)) - \delta r \qquad (51)$$
$$= r(\tau_k) - \delta r_k$$

Assuming that the attitude system provides an orientation matrix that is a perfect real-time reference and the lever arm is perfect:

$$\hat{T}_{body}^{cis}(t_k)\hat{L}_{ant} = T_{body}^{cis}(\tau_k)L_{ant}$$

so:

$$\hat{r}_{k/k-1}^{ant} = \hat{r}_{k/k-1} + T_{body}^{cis}(\tau_k)L_{ant}$$
$$= r(\tau_k) - \delta r_k + T_{body}^{cis}(\tau_k)L_{ant}$$
$$= r^{ant}(\tau_k) - \delta r_k$$

The true quantity minus the error is substituted for the estimated quantities in equation (48):
Where:

$$0 \cong \Delta^v(\tau_k) - \delta\Delta_k^v - \frac{1}{c}\left|r^v(t_k - \hat{T}_{k,k-1} - \Delta^v(\tau_k) + \delta\Delta_k^v) - r^{ant}(\tau_k) + \delta r_k\right|$$
$$= \Delta^v(\tau_k) - \delta\Delta_k^v - \frac{1}{c}\left|r^v(t_k - (T_k - \delta T_k) - \Delta^v(\tau_k) + \delta\Delta_k^v) - r^{ant}(\tau_k) + \delta r_k\right|$$
$$= \Delta^v(\tau_k) - \delta\Delta_k^v - \frac{1}{c}\left|r^v(\tau_k + \delta T_k - \Delta^v(\tau_k) + \delta\Delta_k^v) - r^{ant}(\tau_k) + \delta r_k\right|$$
$$\cong \Delta^v(\tau_k) - \delta\Delta_k^v - \frac{1}{c}\left|r^v(\tau_k - \Delta^v(\tau)) + \dot{r}^v(\tau_k - \Delta^v(\tau_k)) \cdot (\delta T_k + \delta\Delta_k^v) - r^{ant}(\tau_k) + \delta r_k\right|$$
$$\cong \Delta^v(\tau) - \frac{1}{c}\left|r^v(\tau_k - \Delta^v(\tau_k)) - r^{ant}(\tau_k)\right| - \delta\Delta_k^v - \frac{\hat{e}_k^v}{c} \cdot [\hat{v}^v(\delta T_k + \delta\Delta_k^v) + \delta r_k]$$

Where:

$$\hat{e}_k^v = \frac{r^v(\hat{\tau}_{k/k-1} - \hat{\Delta}_{k/k-1}^v) - \hat{r}_{k/k-1}^{ant}}{\left|r^v(\hat{\tau}_{k/k-1} - \hat{\Delta}_{k/k-1}^v) - \hat{r}_{k/k-1}^{ant}\right|}$$

$$\hat{v}^v = \dot{r}^v(t_k - \hat{T}_{k/k-1} - \hat{\Delta}_{k/k-1}^v) \quad \text{(from GPS ephemeris)}.$$

But $\Delta^v(\tau) - \frac{1}{c}\left|r^v(\tau_k - \Delta^v(\tau_k)) - r^{ant}(\tau_k)\right| = 0$, so $$0 = \delta\Delta_k^v - \frac{\hat{e}_k^v}{c} \cdot [\hat{v}^v \cdot (\delta T_k + \delta\Delta_k^v) + \delta r_k]$$

Solving for $\delta\Delta_k^v$ yields:

$$\delta\Delta_k^v = -\frac{(\hat{e}_k^v)^t[\delta r_k + \hat{v}^v \cdot \delta T_k]}{c + (\hat{e}_k^v)^t\hat{v}^v} \qquad (52)$$
$$= \left[\frac{\partial\Delta^v}{\partial T}\right]_k \delta T_k + \left[\frac{\partial\Delta^v}{\partial r}\right]_k \delta r_k$$

where:

$$\left[\frac{\partial\Delta^v}{\partial T}\right]_k \equiv -\frac{(\hat{e}_k^v)^t\hat{v}^v}{c + (\hat{e}_k^v)^t\hat{v}^v} \qquad (53)$$

$$\left[\frac{\partial\Delta^v}{\partial r}\right]_k \equiv -\frac{(\hat{e}_k^v)^t}{c + (\hat{e}_k^v)^t\hat{v}^v} \qquad (54)$$

The measurement model for the pseudo-range observable is then:

$$y_\rho^v(k) = c \cdot \left(\left\{\left[\frac{\partial\Delta^v}{\partial T}\right]_k + 1\right\}\delta T_k + \left[\frac{\partial\Delta^v}{\partial r}\right]_k \delta r_k\right) + \delta sa_k^{2v-1} + \delta\rho_k^v \qquad (55)$$

leading to the concatenated measurement model:

$$y_\rho(k) = [H_w \ 0 \ H_T \ 0 \ H_{sa} \ 0]\begin{bmatrix}\delta w \\ \delta a \\ \delta T \\ \delta\varepsilon \\ \delta sa \\ \delta b\end{bmatrix}_k + \delta\rho_k \qquad (56)$$
$$= H_\rho \cdot \delta x(t_k) + \delta\rho_k$$

where $\delta\rho_k$ is modeled as white Gaussian noise with $(\delta\rho) = \text{diag}(\sigma_{\rho,k}^2)$ and where the measurement sensitivity partitions are:

$$H_w = c \cdot \begin{bmatrix}\left[\frac{\partial\Delta^1}{\partial r}\right]_k & 0 \\ \left[\frac{\partial\Delta^2}{\partial r}\right]_k & 0 \\ \vdots & \vdots \\ \left[\frac{\partial\Delta^{n_{max}}}{\partial r}\right]_k & 0\end{bmatrix} \qquad (57)$$

$[\partial \Delta^v/\partial r]_k$ as defined in equation (54)

$$H_T = c \cdot \begin{bmatrix} \left[\frac{\partial \Delta^1}{\partial T}\right]_k + 1 \\ \left[\frac{\partial \Delta^2}{\partial T}\right]_k + 1 \\ \vdots \\ \left[\frac{\partial \Delta^{n_{max}}}{\partial T}\right]_k + 1 \end{bmatrix} \quad (58)$$

and $[\partial \Delta^v/\partial T]_k$ as defined in equation (53)

$$H_{sa} = [1\ 0\ 1\ 0\ \cdots\ 1\ 0]^t \quad (59)$$

The raw phase measurement in cycles is constructed as:

$$\phi_{RAW}^v(\tau) = \left[\text{chx\_cyc\_upper} + \frac{\text{chx\_cyc\_cnt\_lower}}{2^{16}}\right]_{x=v} \quad (60)$$

where chx_cyc_cnt_upper, and chx_cyc_cnt_upper are the registers on the TIMED GTA chip containing the whole cycle count and the fractional cycle count for tracking channel x.

In deriving the truth model for the raw phase measurement, the oscillator phase as a function of true time is given by:

$$\psi(\tau) = 2\pi f_0^{ref}(\tau + T^*(\tau)) + \phi_{set},$$

where T* is the uncontrolled time bias.
The GPS signal coming into the antenna is:

$$s_R(\tau) = CA(PRN^v, t^v(\tau)) \cdot m(t^v(\tau)) \cdot \sin(2\pi f_{L1} t^v(\tau) - \Phi_{iono}^{L1/C1}(\tau))$$

If the phase of the signal after code and data wipe-off is $\Phi_R(\tau)$:

$$\Phi_R(\tau) = 2\pi \hat{f}_{L1} t^v(\tau) - \Phi_{iono}^{L1/C1}(\tau)$$

as developed by equation (43), $$t_k^v = \tau_k^v + T^v(\tau_k^v) + \frac{1}{c} sa_*^v(\tau_k^v)$$

and $$\tau_k - \tau_k^v = \Delta^v(\tau_k) + \frac{1}{c} I_g^v(\tau_k)$$

then:

$$\phi_R(\tau_k) = 2\pi \hat{f}_{L1}\left(\tau_k^v + T^v(\tau_k^v) + \frac{sa_*^v(\tau_k^v)}{c}\right) - \varphi_{iono}^{L1/C1}(\tau_k)$$

$$= 2\pi \hat{f}_{L1}\left[\tau_k + T^v(\tau_k) - \Delta^v(\tau_k) + \frac{(sa_*^v(\tau_k^v) - I_g^v(\tau_k))}{c}\right] - \varphi_{iono}^{L1/C1}(\tau_k)$$

The ionospheric phase delay relative to a wave propagating in free space is:

$$I_{92}^v(\tau) = -I_g^v(\tau)$$

The minus sign indicates the wavefront arrives before a wavefront propagating in free space. Referring to the definition $\Phi_{iono}^{L1/C1}(\tau)$ in equation (40), the phase advance relative to the code is:

$$\varphi_{ono}^{L1/C1}(\tau_k) = \frac{2\pi \hat{f}_{L1}}{c}(I_p^v(\tau_k) - I_g^v(\tau_k))$$

$$= \frac{4\pi \hat{f}_{L1}}{c} I_g^v(\tau_k)$$

where $I_g^v(\tau_k)$ the ionospheric group delay defined above. Thus:

$$\Phi_R(\tau_k) = 2\pi \hat{f}_{L1}(\tau_k + T^v(\tau_k) - \Delta^v(\tau_k) + (I_g^v(\tau_k) + sa^v(t))/c)$$

The downconverter-sampler effectively mixes the received signal with a $k_1$ multiplication of the fundamental oscillator. The combined effect of the downconversion and sampling process result in a value for $k_1$ of:

$$k_1 = \underbrace{140\left(1 + \frac{1}{10} + \frac{1}{45}\right)}_{\text{downconverter effect}} + \underbrace{\frac{4}{7}}_{\text{sampling effect}}$$

The continuous-time representation of the output of the downconverter-sampler is:

$$s_{IF}(\tau) = LFP\{\sin\varphi_R(\tau) \cdot \sin(k_1 \psi(\tau))\}$$

$$= \frac{1}{2}\cos[\varphi_R(\tau) - k_1 \psi(\tau)]$$

where $LFP\{x(t)\}$ represents a low-pass filtering of the process x(t). When locked, the phase tracking loop will match the total phase of this signal, modulo $2\pi$. The model for the raw phase measurement (in cycles) is then:

$$\phi_{RAW}^v(\tau) = ([\Phi_R(\tau) - k_1 \psi(\tau)]/2\pi) + N^v + \delta\phi^v$$

where $N^v$ is the cycle integer ambiguity which is constant as long as channel v retains phase lock, and $\delta\phi^v$ represents the phase tracking error, which is regarded as a white noise process at the Kalman crank iterval. The GNS tracking processor samples this process at the MIC interrupts and performs the following deterministic transformation on the raw phase samples to provide the Doppler sense that is conventional to the GPS post-processing community (i.e. consistent with the RINEX file definition), and to eliminate the large variation in phase caused by the known part of the zero Doppler offset:

$$\phi^v(\tau_k) = -\left[\phi_{RAW}^v(\tau_k) - \underbrace{t^*(\tau_k)(\hat{f}_{LI} - k_1 f_0^{ref})}_{\text{zero Doppler offset}}\right] \quad (61)$$

This transformed phase data is what crosses the boundary between the tracking processor and the navigation processor. The model for the phase data is derived by combining the above results:

$$\phi^v(\tau_k) = -\left[\frac{(\varphi_R(\tau_k) - k_1 \psi(\tau_k))}{2\pi} + N^v + \delta\phi^v - t^*(\tau_k)(\hat{f}_{LI} - k_1 f_0^{ref})\right] \quad (62)$$

$$= -\left\{\begin{array}{c} \hat{f}_{LI}\left(\tau_k + T^v(\tau_k) - \Delta^v(\tau_k) + \frac{[I_g^v(\tau_k) - sa^v(t_k)]}{c}\right) \\ -k_1\left(f_0^{ref}(\tau_k + T^*(\tau_k)) + \frac{\phi_{set}}{2\pi}\right) \\ +N^v + \delta\phi^v - t^*(\tau_k)(\hat{f}_{LI} - k_1 f_0^{ref}) \end{array}\right\}$$

-continued $$= \hat{f}_{L1}(-\tau_k - T^v(\tau_k) + \Delta^v(\tau_k) - t^*(\tau_k)) + \frac{(sa^v(\tau_k) - I_g^v(\tau_k))}{\lambda_{L1}} +$$

$$= k_1 f_0^{ref}(\tau_k + T^*(\tau_k) - t^*(\tau_k)) - N^v - \delta\phi^v + \frac{k_1\phi_{set}}{2\pi} \quad 5$$

and $\lambda_{L1} = c/\hat{f}_{L1}$ is the GPS L1 wavelength. From equation (4), $t^*(\tau_k) = \tau_k + T^*(\tau_k)$ leading to:

$$\phi^v(\tau_k) = \hat{f}_{L1}(T^*(\tau_k) - T^v(\tau_k) + \Delta^v(\tau_k)) + (sa^v(t_k) - I_g^v(\tau_k))/\lambda_{L1} + b^v - \delta\phi^v$$

$$= \hat{f}_{L1}(T(\tau_k) - \bar{u}(\tau_k) - T^v(\tau_k) + \Delta^v(\tau_k)) + (sa^v(t_k) - I_g^v(\tau_k))/\lambda_{L1} + b^v - \delta\phi^v$$

when:

$$T(\tau_k) - T^*(\tau_k) = t - \tau(t) - t^* - \tau(t) \quad (63)$$

$$= \int_{\tau_{set}}^{\tau_k} u(\xi) \cdot d\xi$$

$$= \bar{u}_k$$

and where the biases have been absorbed into $b^v \equiv -(N^v - k_1\phi_{set}/2\pi)$.

The observable processed by the Kalman filter is the difference between the phase measurement and its predicted value based on the current state estimates:

$$y_\phi^v(k) = \phi^v(\tau_k) - \hat{\phi}_{k/k-1}^v$$

The estimate of the phase measurement is given by:

$$\hat{\phi}_{k/k-1}^v = \hat{f}_{L1}(\hat{T}_{k/k-1} - \bar{u}(\tau_k) - T^v(\tau_k) + \hat{\Delta}_{k/k-1}^v) + (\hat{s}\hat{a}_{k/k-1}^{2v-1} - I_{g,mess}^v(t_k^v))/\lambda_{L1} + \hat{b}_{k/k-1}^v$$

The phase difference measurement is given by:

$$y_\phi^v(k) = \phi^v(\tau_k) - \hat{\phi}_{k/k-1}^v \quad (64)$$

$$= \hat{f}_{L1}(T(\tau_k) - \bar{u}(\tau_k) - T^v(\tau_k) + \Delta^v(\tau_k)) + (sa^v(t) - I_g^v(\tau_k))/\lambda_{L1} + b^v - \delta\phi^v -$$

$$\left[\hat{f}_{L1}(\hat{T}_{k/k-1} - \bar{u}(\tau_k) - T^v(\tau_k) + \hat{\Delta}_{k/k-1}^v) + (\hat{s}\hat{a}_{k/k-1}^{2v-1} - I_{g,mess}^v(t_k^v))/\lambda_{L1} + \hat{b}_{k/k-1}^v\right]$$

$$= \hat{f}_{L1}(\delta\Delta_k^v + \delta T_k) + \left(\underbrace{-I_g^v(\tau) + I_{g,mess}^v(t_k^v)}_{assumed=0} + sa^v(t) - \hat{s}\hat{a}_{k/k-1}^{2v-1}\right)/\lambda_{L1} + \delta b_k - \delta\phi^v$$

$$= \hat{f}_{L1}\left(\left[\frac{\partial\Delta}{\partial T}\right]\delta T_k + \left[\frac{\partial\Delta}{\partial r}\right]_k \delta r_k + \delta T_k\right) + \delta s a_{k/k-1}^{2v-1}/\lambda_{L1} + \delta b_k - \delta\phi^v$$

$$= \hat{f}_{L1}\left(\left[1 + \frac{\partial\Delta}{\partial T}\right]\delta T_k + \left[\frac{\partial\Delta}{\partial r}\right]_k \delta r_k\right) + \delta s a_{k/k-1}^{2v-1}/\lambda_{L1} + \delta b_k - \delta\phi^v$$

Because of the similarity between equations 64 and 55, the concatenated measurement $y_\Phi(k) \equiv [y_\Phi^1(k), y_\Phi^2(k) \ldots y_\Phi^{n_{max}}(k)]$ can be in the same form as equation (56):

$$y_\phi(k) = \frac{1}{\lambda_{L1}}[H_w \; 0 \; H_T \; 0 \; H_{sa} \; 0]\begin{bmatrix}\delta w \\ \delta\alpha \\ \delta T \\ \delta\varepsilon \\ \delta sa \\ \delta b\end{bmatrix}_k + \delta\phi_k \quad (65)$$

$$= H_\phi \cdot \delta x(t_k) + \delta\phi_k$$

where $\delta\phi_k$ is modeled as white Gaussian noise with $$cov(\delta\phi_k) = diag(\sigma_{\phi,k}^2).$$

The concatenated measurement matrices is defined as:

$$y_k \equiv \begin{bmatrix} y_\rho \\ y_\phi \end{bmatrix} \quad (66)$$

$$H_k \equiv \begin{bmatrix} H_\rho \\ H_\phi \end{bmatrix}$$

$$R_k \equiv \begin{bmatrix} cov(\delta\rho_k) & 0 \\ 0 & cov(\delta\phi_k) \end{bmatrix}$$

The measurement update proceeds as follows:

$R_k = R_k^{1/2} R_k^{t/2}$ is factored where $R_k^{t/2}$ is the upper triangular. Note that since $R_k$ is diagonal, $R_k^{1/2} = diag(\sqrt{(R_k)_1})$ Q-R decomposition is preformed $$\begin{bmatrix} R_k^{t/2} & 0 \\ P_{k/k-1}^{t/2} H_k^t & P_{k/k-1}^{t/2} \end{bmatrix} = T \begin{bmatrix} R_k^{t/2} & W_k^t \\ 0 & P_{k/k}^{t/2} \end{bmatrix} \quad (67)$$

where $P_{k/k-1}^{t/2}$ is the factor of the prior covariance, $B_k^{t/2}$ is the factor of the residual covriance, and $K_k = W_k B_k^{-1/2}$ is the Kalman gain. The posterior covariance factor is $P_{k/k}^{t/2}$.

The measurement update of the state is then:

$$\delta\hat{x}_{k/k} = K_k y_k \quad (68)$$

Since:

$$\delta \hat{x}_{k/k-1} = 0$$

The whole-value dynamic state is re-initialized as:

$$\hat{x}_{k/k} = \hat{x}_{k/k-1} + \delta \hat{x}_{k/k}$$

The evolution of the position and velocity states depends on the drag and clock states, but not the SA states or the PDR range biases. The state dynamics can therefore be decoupled by partitioning the state as follows.

$$x_{dyn} = \begin{bmatrix} w(\tau(t)) \\ \alpha(t) \\ T(t) \\ \varepsilon(t) \end{bmatrix} \quad (69)$$

$$x_{sat} = \begin{bmatrix} sa(t) \\ b(t) \end{bmatrix}$$

The time update is then represented as:

$$\begin{bmatrix} x_{dyn}(t_{k+1}) \\ x_{sat}(t_{k+1}) \end{bmatrix} = \begin{bmatrix} \phi(x_{dyn}(t_k), t_k, t_{k+1}) \\ \Phi 2(t_{k+1}, t_k) \cdot x_{sat}(t_k) \end{bmatrix} \quad (70)$$

The update of $x_{sat}$ can be written in terms of the transition matrix $\Phi 2(t_{k+1}, t_k)$ since its dynamics are linear. The vector $\phi(x_{dyn}(t_k), t_k, t_{k+1})$ is the soution of:

$$\frac{d}{dt} x_{dyn}(t) = f_{dyn}(x_{dyn}(t), t)$$

integrated from $t_k$ to $t_{k+1}$ with $x_{dyn}(t_k)$ as the initial condition.

By using the chain rule, the position and velocity partition $w(\tau(t))$ is evolved according to:

$$\frac{dw}{dt} = \frac{dw(\tau(t))}{d\tau} \cdot \frac{d\tau}{dt} \quad (71)$$

$$= f_w(w(\tau(t)), \alpha, \tau(t)) \dot{\tau}(t)$$

Where $\dot{\tau}(t)$ is evaluated as described with respect to equation (11), and where the rate of change of $w(\cdot)$ with respect to true time is $f_w(w(\tau(t)), \alpha, \tau(t))$. The term $\dot{\tau}(t)$ is the ratio of a true time differential to a receiver time differential and arises because the system is integrating with respect to receiver time. The explicit relation for the true time derivative $f_w(w(\tau(t)), \alpha, \tau(t))$ is:

$$f_w(w(\tau), \alpha, \tau) = \frac{d}{d\tau} \begin{bmatrix} r(\tau) \\ v(\tau) \end{bmatrix} \quad (72)$$

$$\frac{dr(\tau)}{d\tau} = v(\tau)$$

$$\frac{dv(\tau)}{d\tau} = T_{cts}^{cis}(\tau) \cdot g_{cts}(r_{cts}(\tau)) - \frac{\rho(r_{cts}(\tau), \tau)}{2\beta_0} (1+\alpha) \cdot$$

$$|v^{rel}(\tau)| \cdot v^{rel}(\tau)$$

where $r_{cts}(\tau) = T_{cis}^{cts}(\tau) \cdot r(\tau)$ is the CTS position of the TIMED CM, $g_{cts}(r_{cts}(\tau))$ is the acceleration of gravity, $T_{cis}^{cts}(\tau)$ is the transformation from the conventional inertial system to the conventional terrestrial system (see "GPS Theory and Practice" by B. Hoffmann-Wellenhof, et. al., published by Springer-Verlag 1992, the contents thereof which is incorporated herein by reference), $\rho(r(\tau), \tau)$ is the mass density from the atmospheric model, and $\beta_0$ is the nominal TIMED ballistic coefficient, defined as $M/C_d \cdot A$. The earth-relative velocity coordinatized in the CIS frame is given by:

$$v^{rel}(\tau) = v(\tau) - \omega_e \times r(\tau)$$

where $\omega_e$ is the angular velocity of the Earth in the CIS frame. Note that the explicit dependence on receiver time is suppressed with the understanding that $\tau = \tau(t)$. The time rate of change of the clock error is given by the following form of equation (12):

$$\dot{T}(t) = \frac{u(t) - \varepsilon(t)}{1 + u(t) - \varepsilon(t)} \quad (73)$$

$$= (u(t) - \varepsilon(t)) \dot{t}(t)$$

The time rate of change of $x_{dyn}$ is then:

$$f_{dyn}(x_{dyn}(t), t) = \begin{bmatrix} f_w(w(\tau(t)), \alpha, \tau(t)) \cdot \dot{t}(t) \\ 0 \\ (u(t) - \varepsilon(t)) \cdot \dot{t}(t) \\ 0 \end{bmatrix}$$

$$\dot{t}(t) = \frac{1}{1 + u(t) - \varepsilon(t)}$$

The PDR biases are not dynamically coupled with the SA states, therefor the transition matrix $\Phi 2(t_{k+1}, t_k)$ can be partitioned as:

$$\Phi_{sat}(t_{k+1}, t_k) = \begin{bmatrix} \Phi_{sa}(t_{k+1}, t_k) & 0 \\ 0 & \Phi_{pdr}(t_{k+1}, t_k) \end{bmatrix} \quad (75)$$

The PDR bias states are true biases, they have no dynamics. However the transition matrix must take account of rising and setting satellites. (Loss of lock is modeled by increasing the covariance on the PDR biases to infinity.). To do this, a list of the PRN numbers is constructed for the satellites in each tracker. At receiver time t, $PRN(t)_i$ is the PRN number of the satellite being tracked by receiver channel i, for $i \in \{1, 2, \ldots, n_{max}\}$. If channel i is not tracking any satellite $PRN(t)_i = 0$. The selector matrix $S1(t_{k+1}, t_k)$ is defined as:

$$S1(t_{k+1}, t_k)_{i,j} = \delta(PRN(t_{k+1})_i, prn(t_k)_j) \quad (76)$$

Where $$\delta(i, j) = \begin{cases} 1 & i = j, \neq 0, j \neq 0 \\ & i, j \in \{1, 2, 3 \ldots, n_{max}\} \\ 0 & \text{otherwise} \end{cases}$$

For instance, assume a scenario with 3 tracking channels ($n_{max} = 3$) and PRN 10, 14, and 22 are being tracked by channels 1, 2, and 3 at $t_k$. At measurement time $t_{k+1}$, PRN is 14, 10, and 20 are being tracked by channels 1, 2, and 3:

$$PRN(t_k) = [10\ 14\ 22]$$

$$PRN(t_{k+1}) = [14\ 10\ 20]$$

$$S1(t_{k+1}, t_k) = \begin{bmatrix} 0 & 1 & 0 \\ 1 & 0 & 0 \\ 0 & 0 & 0 \end{bmatrix}$$

$S1(t_{k+1},t_k)$ connects the satellite identities at time $t_k$ to the identities at time $t_{k+1}$. Then:

$$\Phi_{pdr}(t_{k+1},t_k) = S1(t_{k+1},t_k) \quad (77)$$

For each satellite, SA is modeled as a second order Markov process:
The solution can be written in terms of the transition matrix as:

$$\frac{d}{dt}\begin{bmatrix} s_1(t) \\ s_2(t) \end{bmatrix} = \begin{bmatrix} -2\cdot\xi\cdot-\varpi_n^2 \\ 1 \quad 0 \end{bmatrix}\begin{bmatrix} s_1(t) \\ s_2(t) \end{bmatrix}$$

$$\frac{d}{dt}s(t) = F_{mkv} \cdot s(t)$$

Written in terms of the transition matrix, the foregoing is:

$$s(t_{k+1}) = \phi_{mkv}(t_{k+1},t_k) \cdot s(t_k)$$

where $\phi_{mkv}(t_{k+1},t_k)$ is given by:

$$\phi_{mkv}(t_{k+1},t_k) = \alpha_0 I = \alpha_1 \cdot F_{mkv} \cdot \Delta t (2\times 2)$$

$$u = -\Delta t \cdot \xi \cdot \overline{\omega}_n$$

$$\omega = \Delta t \cdot \overline{\omega}_n \sqrt{1-\xi^2}$$

$$\alpha_0 = -e^u \cdot (u \cdot \sin \omega - \omega \cdot \cos \omega)/\omega$$

$$\alpha_1 = e^u \cdot \sin \omega/\omega$$

$$\Delta t = t_{k+1} - t_k \quad (78)$$

The full SA state vector is the concatenation of $n_{max}$ copies of the per-link SA states, so that the full SA transition matrix is block diagonal with $\phi_{mkv}(t_{k+1},t_k)$ on the diagonals:

$$sa(t_{k+1}^-) = \Phi_{mkv}(t_{k+1},t_k) \cdot sa(t_k)$$

$$\Phi_{mkv}(t_{k+1},t_k) = \text{diag}[\phi_{mkv}(t_{k+1},t_k)](2 \cdot n_{max} \times 2 \cdot n_{max}) \quad (79)$$

where $t_{k+1}^-$ is a fictional time prior to updating the satellite states to account for the addition and deletion of satellites. Bookkeeping is accomplished with the selector matrix defined in equation (76) by segregating the SA states into terms associated with range (sa_1) and those associated with range rate (sa_2):

$$\begin{bmatrix} sa\_1(t_{k+1}^-) \\ sa\_2(t_{k+1}^-) \end{bmatrix} = P \cdot sa(t_{k+1}^-)$$

where P is a (constant) permutation matrix given by:

$$P = [E_1 \; E_2 \cdot E_m \ldots E_{n_{max}}] \quad (2 \cdot n_{max} \times 2 \cdot n_{max}) \quad (80)$$

$$E_m = \begin{bmatrix} e_m & 0 \\ 0 & e_m \end{bmatrix} \quad (2 \cdot n_{max} \times 2)$$

$$e_m = \begin{bmatrix} 0 & 0 & \ldots & 0 & 1 & 0 & \ldots & 0 \end{bmatrix}^t \quad (n_{max} \times 1)$$
$$\qquad\qquad\qquad m^{th}\text{component}$$

The addition and deletion of satellites is accomplished with the selector matrix defined above:

$$\begin{bmatrix} sa\_1(t_{k+1}^+) \\ sa\_2(t_{k+1}^+) \end{bmatrix} = \begin{bmatrix} S1(t_{k+1},t_k) & 0 \\ 0 & S1(t_{k+1},t_k) \end{bmatrix}\begin{bmatrix} sa\_1(t_{k+1}^-) \\ sa\_2(t_{k+1}^-) \end{bmatrix}$$

P is a permutation matrix, there for its inverse is its transpose so the SA states are returned to their original order by premultiplying by the transpose:

$$sa(t_{k+1}) = P^t \begin{bmatrix} sa\_1(t_{k+1}^+) \\ sa\_2(t_{k+1}^+) \end{bmatrix}$$

The complete update to the SA states is:

$$sa(t_{k+1}) = \Phi_{sa}(t_{k+1},t_k) \cdot sa(t_k)$$

where:

$$\Phi_{sa}(t_{k+1},t_k) = P^t \cdot S2(t_{k+1},t_k) \cdot P \cdot \Phi_{mkv}(t_{k+1}^-,t_k)$$

$$S2(t_{k+1},t_k) = \begin{bmatrix} S1(t_{k+1},t_k) & 0 \\ 0 & S1(t_{k+1},t_k) \end{bmatrix} \quad (81)$$

The time update of the extended Kalman filter state estimates is exactly the same as the evolution of the Kalman filter state described in the foregoing truth model, i.e.:

$$\begin{bmatrix} \hat{X}_{dyn}(t_{k+1/k}) \\ \hat{X}_{sat}(t_{k+1/k}) \end{bmatrix} = \begin{bmatrix} \phi(\hat{X}_{dyn}(t_{k/k}), t_k, t_{k+1}) \\ \Phi_{sat}(t_{k+1},t_k) \cdot \hat{X}_{sat}(t_{k/k}) \end{bmatrix}$$

The TIMED Kalman filter is a square root covariance implementation wherein the state error covariance $P = \text{cov}(\delta x)$ is maintained in factored form as $P = P^{t/2} \cdot P^{1/2}$ where $P^{t/2}$ is upper triangular and $P^{1/2} = (P^{t/2})^t$. The the covariance factor update is achieved by post multiplying the transpose of the transition matrix:

$$\tilde{P}_{k+1/k}^{t/2} = P_{k/k}^{t/2} \cdot \Phi(t_{k+1},t_k)^t \quad (82)$$

where $\tilde{P}_{k+1/k}^{t/2}$ is the state error covariance after the deterministic update and prior to the stochastic update.

The full transition matrix used in equation (82) is:

$$\begin{bmatrix} \Phi_{dyn}(t_{k+1},t_k) & 0 \\ 0 & \Phi_{sat}(t_{k+1},t_k) \end{bmatrix}$$

where $\Phi_{sat}(t_{k+1},t_k)$ is as computed above, and $\Phi_{dyn}(t_{k+1},t_k)$ is the solution to:

$$\frac{d}{d\xi}\Phi_{dyn}(\xi, t_k) = F_{dyn}(\xi) \cdot \Phi_{dyn}(\xi, t_k) \quad (83)$$

between $\xi = t_k$ and $\xi = t_{k+1}$. The initial condition is $\Phi_{dyn}(t_k, t_k) = I$. $F_{dyn}$ is the gradient of $f_{dyn}$ with respect to $x_{dyn} = [w^t, \alpha, T, \epsilon]^t$ as derived below:

$$F_{dyn} \equiv \frac{\partial f_{dyn}}{\partial x_{dyn}} \quad (84)$$

-continued $$= \begin{bmatrix} \frac{\partial(f_x \cdot \dot{\tau})}{\partial w} & \frac{\partial(f_x \cdot \dot{\tau})}{\partial \alpha} & \frac{\partial(f_x \cdot \dot{\tau})}{\partial T} & \frac{\partial(f_x \cdot \dot{\tau})}{\partial \varepsilon} \\ 0 & 0 & 0 & 0 \\ 0 & 0 & 0 & \frac{\partial \dot{T}}{\partial \varepsilon} \\ 0 & 0 & 0 & 0 \end{bmatrix}$$

The partitions of $F_{dyn}$ are:

$$\frac{\partial(f_w \cdot \dot{\tau})}{\partial w} = \frac{\partial f_w}{\partial w} \cdot \dot{\tau}$$

$$\frac{\partial(f_w \cdot \dot{\tau})}{\partial \alpha} = \frac{\partial f_w}{\partial \alpha} \cdot \dot{\tau}$$

-continued $$\frac{\partial(f_w \cdot \dot{\tau})}{\partial T} = \frac{\partial f_w}{\partial T} \cdot \dot{\tau} + f_w \cdot \underbrace{\frac{\partial \dot{\tau}}{\partial T}}_{=0}$$

$$= \frac{\partial f_w}{\partial \tau} \cdot \underbrace{\frac{\partial(t)}{\partial T}}_{=1} \dot{\tau} = -\frac{\partial f_w}{\partial \tau} \dot{\tau}$$

$$\frac{\partial(f_w \cdot \dot{\tau})}{\partial \varepsilon} = f_w \cdot \frac{\partial \dot{\tau}}{\partial \varepsilon} = f_w \cdot \dot{\tau}^2$$

$$\frac{\partial \dot{T}}{\partial \varepsilon} = -\frac{\partial(1-\dot{\tau})}{\partial \varepsilon} = \frac{\partial \dot{\tau}}{\partial \varepsilon} = -\dot{\tau}^2$$

In the last two rows above:

$$\frac{\partial \dot{\tau}}{\partial \varepsilon} = \frac{\partial}{\partial \varepsilon} \cdot \frac{1}{(1+u-\varepsilon)} = \left[\frac{1}{(1+u-\varepsilon)}\right]^2 = \dot{\tau}^2$$

The above results are substituted into equation (84):

$$F_{dyn} = \begin{bmatrix} \frac{\partial f_w}{\partial w} & \frac{\partial f_w}{\partial \alpha} \cdot \dot{\tau} & -\frac{\partial f_w}{\partial \tau} \cdot \dot{\tau} & f_w \cdot \dot{\tau}^2 \\ 0 & 0 & 0 & 0 \\ 0 & 0 & 0 & -\dot{\tau}^2 \\ 0 & 0 & 0 & 0 \end{bmatrix} \quad (85)$$

where $\dot{\tau}=(1+u(t)-\epsilon(t))^{-1}$ and $f_w$ is given by equation (72). The $\partial f_w/\partial w$ partition is:

$$\frac{\partial f_w}{\partial w} = \begin{bmatrix} \frac{\partial \dot{r}}{\partial r} & \frac{\partial \dot{r}}{\partial v} \\ \frac{\partial \dot{v}}{\partial r} & \frac{\partial \dot{v}}{\partial v} \end{bmatrix} \quad (86)$$

$$\frac{\partial \dot{r}}{\partial r} = 0$$

$$\frac{\partial \dot{r}}{\partial v} = I_{3\times 3}$$

$$\frac{\partial \dot{v}}{\partial r} = \frac{\partial}{\partial r}\left\{T_{cts}^{cis}(\tau)g_{cts}(r_{cts}) - \frac{\rho(r_{cts},\tau)}{2\cdot\beta_0}(1+\alpha)|v^{rel}|v^{rel}\right\}$$

$$\cong T_{cts}^{cis}(\tau)\frac{\partial g_{cts}}{\partial r_{cts}} \cdot \frac{\partial r_{cts}}{\partial r} - \frac{\rho(r_{cts},\tau)}{2\cdot\beta_0}(1+\alpha)\frac{\partial}{\partial r}\{|v^{rel}|v^{rel}\}$$

$$= T_{cts}^{cis}(\tau)\frac{\partial g_{cts}}{\partial r_{cts}}T_{cis}^{cts}(\tau) + \frac{\rho(r_{cts},\tau)}{2\cdot\beta_0}(1+\alpha)\left(\frac{v^{rel} \cdot v^{rel}I + v^{rel}(v^{rel})^t}{|v^{rel}|}\right)\{\varpi_e x\}$$

$$\frac{\partial \dot{v}}{\partial v} = \frac{\partial}{\partial v}\left\{T_{cts}^{cis}(\tau)g_{cts}(r_{cts}) - \frac{\rho(r_{cts},\tau)}{2\cdot\beta_0}(1+\alpha)|v^{rel}|v^{rel}\right\}$$

$$= -\frac{\rho(r_{cts},\tau)}{2\cdot\beta_0}(1+\alpha)\left(\frac{v^{rel} \cdot v^{rel}I + v^{rel}(v^{rel})^t}{|v^{rel}|}\right)$$

In the above differentiations, variation of density with position are not considered. The $\partial f_w/\partial \alpha$ partition is given by:

$$\frac{\partial f_w}{\partial \alpha} = \begin{bmatrix} \frac{\partial \dot{r}}{\partial \alpha} \\ \frac{\partial \dot{v}}{\partial \alpha} \end{bmatrix}$$

$$= \left[-\frac{\rho(r_{cts},\tau)^0}{2\cdot\beta_0} \cdot |v^{rel}| \cdot v^{rel}\right]$$

The $\partial f_w/\partial \tau$ partition is:

$$\frac{\partial f_w}{\partial \tau} = \begin{bmatrix} \frac{\partial \dot{r}}{\partial \tau} \\ \frac{\partial \dot{v}}{\partial \tau} \end{bmatrix} \quad (87)$$

$$= \begin{bmatrix} \dot{v}(\tau) \\ \ddot{v}(\tau) \end{bmatrix}$$

where $\dot{v}(\tau)$ is as given in equation (72) and the important terms in $\ddot{v}(\tau)$ are given by:

$$\dot{v}(\tau) = \frac{\partial}{\partial(\tau)} \left\{ T_{cts}^{cis}(\tau) \cdot g_{cts}(T_{cis}^{cts}(\tau)r(\tau)) - \frac{\rho(r_{cts},\tau)}{2\cdot\beta_0}(1+\alpha)|v^{rel}|v^{rel} \right\} \quad (88)$$

$$\cong \dot{T}_{cts}^{cis}(\tau) \cdot g_{cts}(r_{cts}) + T_{cts}^{cis}(\tau) \frac{\partial g_{cts}}{\partial r_{cts}} \cdot \frac{d(T_{cis}^{cts}(\tau)r(\tau))}{d\tau}$$

$$- \frac{\rho(r_{cts},\tau)}{2\cdot\beta_0}(1+\alpha) \left( \frac{v^{rel}(\dot{v}^{rel}\cdot v^{rel}) + \dot{v}^{rel}(v^{rel}\cdot v^{rel})}{|v^{rel}|} \right)$$

$$= \dot{T}_{cts}^{cis}(\tau) \cdot g_{cts}(r_{cts}) + T_{cts}^{cis}(\tau) \frac{\partial g_{cts}}{\partial r_{cts}} (\dot{T}_{cis}^{cts}r + T_{cis}^{cts}v)$$

$$- \frac{\rho(r_{cts},\tau)}{2\cdot\beta_0}(1+\alpha) \left( \frac{v^{rel}(\dot{v}^{rel}\cdot v^{rel}) + \dot{v}^{rel}(v^{rel}\cdot v^{rel})}{|v^{rel}|} \right)$$

where the time rate of change of the Earth relative velocity is: $v^{rel}=\dot{v}-\overline{\omega}_{ex}v$ (89)

The effects of process noise on the covariance factor are accounted for by the following Q-R decomposition:

$$T \begin{bmatrix} P_{k+1/k}^{t/2} \\ 0 \end{bmatrix} = \begin{bmatrix} \tilde{P}_{k+1/k}^{t/2} \\ QD^{1/2} \end{bmatrix} \quad (90)$$

where T is an orthonormal matrix and QD is a discrete-time process noise covariance matrix for the entire state, which is partitioned as:

$$QD \begin{bmatrix} QD_{dyn} & 0 & 0 \\ 0 & QD_{sa} & 0 \\ 0 & 0 & QD_{pdr} \end{bmatrix} \quad (91)$$

where $QD_{dyn}=\text{cov}(\delta x_{dyn})$ is the error covariance of the $x_{dyn}$ partition of the state. $QD_{dyn}$ is the solution of:

$$\frac{d}{d\xi}QD_{dyn} = F_{dyn}(\xi)\cdot QD_{dyn} + QD_{dyn}\cdot F_{dyn}^t(\xi) + \cdot Q_{dyn} \quad (92)$$

between $\xi=t_k$ and $\xi=t_{k+1}$. The initial condition is $QD_{dyn}=0$. The square root $QD^{1/2}$ is given by: $QD^{1/2}=US^{1/2}$ where $QD=USU^t$ is the SVD factorization of (the symmetric) QD. ($QD^{1/2}$ obtained in this way is a symmetric square root, not lower triangular. Although lower triangular square roots are baselined in the Levy SRCF algorithm, any square root will do)

The process noise for the dynamic states ($Q_{dyn}$) is essentially a tuning parameter. The physics of the problem dictate that: 1) There should be no process noise driving position. 2) There should be enough process noise driving the velocity to cover all of the unmodeled accelerations (third body effects, Earth tides and so on). 3) The process noise on the drag parameter must be large enough to allow the filter to react to changes in the conditions in the upper atmosphere. 4) There should be enough process noise driving the clock frequency error $\epsilon$ to model the oscillator Allan variance.

Analytically, the process noise for the SA states is:

$$QD_{sa} = \text{block diag}(\sum_v)$$

where the blocks are initialized to the steady state SA covariance matrix if the satellite is new in track, or the accumulated process noise appropriate for an interval of length $\Delta=t_{k+1}-t_k$ if it is not a new satellite:

$$\sum_v = \begin{cases} \sum_\infty & \text{if } v^{th} \text{ row of } SI(t_{k+1},t_k)=0 \\ \sum_\Delta & \text{otherwise} \end{cases} \quad (93)$$

where the steady-state covariance is:

$$\sum_\infty = \begin{bmatrix} \sigma_{sa\_vel}^2 & 0 \\ 0 & \sigma_{sa\_rng}^2 \end{bmatrix} \quad (94)$$

$\sigma_{sa\_rng}$ is the steady state standard deviation of the sa process (currently 75 m), $\sigma_{sa\_vel}=\sigma_{sa\_rng}\overline{\omega}_n$ is the velocity sigma, and $\overline{\omega}_n$ is the natural frequency of the sa markov (currently 300 seconds). The covariance for the existing satellites is:

$$\sum_\Delta = q_s \begin{bmatrix} c & b \\ b & a \end{bmatrix} \quad (95)$$

$$b = \frac{e^{-2\varsigma\overline{\omega}_n\Delta}}{4\overline{\omega}_n^2(1-\varsigma)}(1-\cos(2\overline{\omega}_{nd}\Delta))$$

$$c = \frac{1}{4\varsigma\overline{\omega}_n} + \frac{e^{-2\varsigma\overline{\omega}_n\Delta}}{4\overline{\omega}_{nd/\omega_n}^2}\left(-\frac{1}{\varsigma} + \cos(2\overline{\omega}_{nd}\Delta) + \frac{\overline{\omega}_{nd}}{\overline{\omega}_n}\sin(2\overline{\omega}_{nd}\Delta)\right)$$

$$a = \frac{1}{4\varsigma\overline{\omega}_n^3} - \frac{e^{-2\varsigma\overline{\omega}_n\Delta}}{4\overline{\omega}_n\overline{\omega}_{nd}^2}\left(\frac{1}{\varsigma} - \cos(2\overline{\omega}_{nd}\Delta) + \frac{\overline{\omega}_{nd}}{\overline{\omega}_n}\sin(2\overline{\omega}_{nd}\Delta)\right)$$

$$\overline{\omega}_{nd} = \overline{\omega}_n\sqrt{1-\varsigma^2} \quad \beta_1 = 2\varsigma\overline{\omega}_n \quad \beta_2\overline{\omega}_n^2 \quad q_s = \sigma_{sa\_rng}^2\beta_1\beta_2$$

The process noise for the carrier cycle ambiguities is zero unless the satellite is new or a break in track has occurred, in which case it is set to a very large value. Thus:

$$QD_{pdr} = 1\cdot e9\cdot\text{diag}(p_v) \quad (96)$$

where:

$$p_v = \begin{cases} 1 & \text{if } v^{th}, v^{th} \text{element of } SI(t_{k+1},t_k)=0 \text{ or loss\_lock}_v=1 \\ 0 & \text{otherwise} \end{cases}$$

The GNS state can be initialized or reset by any one of three different ways:
1) The GNS state can self-initialize (or reinitialize) using two GPS point solutions.
2) Initially, the state can be set using preloaded orbital insertion data.
3) The state can be set (or reset) by a command upload of a NORAD state vector.

Two GPS point solutions are used to initialize the state and covariance partitions for all of the dynamic states except for drag. In each point solution, the system solves for the receiver position and clock parameters. It assumes constant velocity, the two point solutions are therefor treated as data for estimating the position, velocity, receiver clock error, and receiver fractional frequency error at the second epoch. At least 4 satellites must be in track before point solutions can be obtained which are defined completely by the data. With the inclusion of prior information on the clock and fractional frequency error, the technique works with three satellites. The information on the clock is obtained from the constraint that the propagation delay is around 60 milliseconds (+/−20 milliseconds) and is applied in the non-linear least squares point solutions. The information on the fractional frequency error is obtained from preflight calibration and is applied in the combining procedure.

Under the assumption of constant velocity, and assuming there is no MIC control being applied, equation (9) may be approximated as $\dot{T}=-\epsilon$, then:

$$\underbrace{\begin{bmatrix} r(t_1) \\ T(t_1) \\ r(t_2) \\ T(t_2) \end{bmatrix}}_{z} = \underbrace{\begin{bmatrix} I & -I\cdot\Delta t & 0 & 0 \\ 0^t & 0^t & 1 & \Delta t \\ I & 0 & 0 & 0 \\ 0^t & 0^t & 1 & 0 \end{bmatrix}}_{H} \underbrace{\begin{bmatrix} v(\tau(t_2)) \\ r(\tau(t_t)) \\ T(t_2) \\ \varepsilon(t_2) \end{bmatrix}}_{x} \quad (97)$$

$z=[z_1{}^t, z_2{}^t]$ with $\hat{z}_i = [\hat{r}^t(t_i), \hat{T}(t_i)]^t$ is then calculated from the position-clock point solutions at epochs i=1,2 (as described below). The point solution estimate errors are regarded as independent (although this is not true for the errors caused by selective availability), to enable the system to solve the Bayesian least-squares problem:

$$z = Hx + v$$

$$x \sim N(\mu, \Sigma)$$

$$v \sim N(0, R)$$

where H is as above, $\Sigma$ and $\mu$ represent any prior information on x, and R is the measurement noise associated with uncertainty of the single point solutions given below. The solution to this problem is obtained using the same method that was used to perform the measurement update, namely equations (67) and (68). This is a square root procedure requiring that the covariance matrices be factored as $$\Sigma = \Sigma^{1/2} \Sigma^{1/2}$$

and $R = R^{1/2} R^{1/2}$ where $$\Sigma^{1/2}$$

and $R^{1/2}$ are upper triangular. Since only prior information need be incorporated in the case where there are only three satellites in the solution;

$$\Sigma^{1/2}$$

and $\mu$ (partitioned consistent with the partitioning of x in equation (97)) are of the form:

$$\Sigma^{1/2} = \begin{bmatrix} \infty I & 0 & 0 & 0 \\ 0^t & \infty I & 0 & 0 \\ 0^t & 0^t & \infty & 0 \\ 0^t & 0^t & 0 & a \end{bmatrix}$$

$$a = \begin{cases} \sigma_\varepsilon & \text{three satellite solutions} \\ \infty & \text{four or more satellite solutions} \end{cases}$$

$$\mu = [0^t, 0^t, 0, b]^t$$

$$b = \begin{cases} \varepsilon_0 & \text{three satellite solutions} \\ 0 & \text{four or more satellite solutions} \end{cases}$$

where $\epsilon_0$ and $\sigma_\epsilon$ are the prior estimate of the fractional frequency error and its associated one-sigma uncertainty. The noise factor is given by:

$$R^{1/2} = \begin{bmatrix} \Gamma_1^{1/2} & 0 \\ 0 & \Gamma_2^{1/2} \end{bmatrix}$$

where $\Gamma_i^{1/2}$ are the covariance matrices from the point solution nonlinear least-squares procedure described below. The aposteriori covariance and state estimate are nexed mapped into the Kalman filter order.

The point solutions used above are arrived at by the following a nonlinear least squares solution to the point navigation equations.

Starting with an initial guess for the receiver position in the inertial frame ($\hat{r}$) and the receiver clock error ($\hat{T}$), the initial guess for the clock bias is obtained by subtracting the estimate of the transmit time corrected for a mean propagation time of 60 milliseconds with the receiver reference time from the tracking processor:

$$\hat{T} = t_k - (t_k^v + 0.060)$$

The true time at the receiver $\tau = t + \hat{T}$ is then determined: For tracking channels $v=1, n_{max}$, the implicit light time equation is solved:

$$\Delta^v = \frac{1}{c}|r^v(\tau^v) - \hat{r}(\tau)|$$

$$\tau^v = \tau - \Delta^v$$

$$r^v(\tau) = T_{cts}{}^{cis}(\tau) r_{cts}{}^v(\tau) \quad (98)$$

where $r_{cts}{}^v(\tau)$ is the satellite position according to the message ephemeris After convergence, the unit vectors are computed:

$$u^v = \frac{r^v(\tau - \Delta^2) - \hat{r}(\tau)}{|r^v(\tau - \Delta^2) - \hat{r}(\tau)|} \quad (99)$$

The sensitivity matrix is then created:

$$M = \begin{bmatrix} -(u^1)^t & 1 \\ -(u^2)^t & 1 \\ \vdots & \vdots \\ -(u^{n_{max}})^t & 1 \end{bmatrix} \quad (100)$$

If channel v is not tracking a satellite, that row of M is zeroed out.

The measurement vector is formed:

$$y = [y_1, y_2, \ldots y_{n_{max}}, 0] \quad (101)$$

where:

$$y_v = \rho^v - \underbrace{c[\Delta^v + (\hat{T} - T^v(\tau^v))]}_{\text{predicted pseudorange}}$$

where $\rho^v$ is the raw pseudo-range measurement and $\hat{T}((\tau^v))$ is the satellite clock bias computed from the message data. (The SA and the ionosphere are ignored in the foregoing initialization procedure.)

Next, errors in the state are determined and the state is updated:

$$\begin{bmatrix} \hat{r} \\ \hat{T} \end{bmatrix}_{new} = \begin{bmatrix} \hat{r} \\ \hat{T} \end{bmatrix}_{old} + By \qquad (102)$$

where B is the Kalman gain associated with the Bayesian least-squares problem:

$y = Mx + v$ $xN(0,D)$ $vN(0,E)$ $$D = \begin{bmatrix} \infty I & 0 \\ 0^t & e \end{bmatrix}$$

$$e = \begin{cases} \sigma_T & \text{three satellite solution} \\ \infty & \text{four or more satellite solution} \end{cases}$$

where $E^{1/2}$=diag(UERE) is a diagonal matrix representing the average user effective ranging error and $\sigma_T$=0.020 represents the uncertainty in the coarse estimate of clock error obtained from the constraint that the range delay is aproximatly 60 milliseconds. (This is dominated by SA if it is on.) The above process is repeated until the estimates are not changing rapidly, i.e. $|By| \leq \text{test}$. At convergence, the error covariance factor using the algorithm of equation (67) is selected as $P^{1/2}$. This is used to form the measurement noise factor for the combining step described previously.

The Delta guidance system will place TIMED at a position and velocity specified in the Conventional Terrestrial System (CTS).

$$w_{cts}(t) = \begin{bmatrix} r_{cts}^{nom}(t) \\ v_{cts}^{nom}(t) \end{bmatrix}_{6 \times 1}$$

represents the true position and earth-relative velocity of the TIMED CM in the CTS system and $w_{cts}^{nom}(t)$ represents its nominal value. Then the orbital insertion error appearing in the Delta specification will be of the form:

$$\delta w_{cts}^{ins} = w_{cts}(\tau_{ins}) - w_{cts}^{nom}(t_{ins}^{nom}) \qquad (103)$$

where $\tau_{ins}$ is the true orbital insertion time, defined to be the time immediately after all thrusting (including pyrotechnic separation devices) is over, and $t_{ins}^{nom}$ is its nominal value. By specifying the insertion error in this way, there is no penalty for placing TIMED in the correct position and velocity at a different time than intended. The desired orbital insertion vector $W_{cts}^{nom}(t_{ins}^{nom})$ is a point fixed in the Conventional Terrestrial System (CTS). If the launch time slips, this aim-point will remain constant, implying that the right ascension of the ascending node of the TIMED orbit will rotate at Earth rate. The six-vector $w_{cts}^{nom}(t_{ins}^{nom})$ will be loaded into memory on the spacecraft prior to launch. The actual orbital insertion time ($\tau_{ins}$), which may be substantially different than the nominal time ($t_{ins}^{nom}$), is communicated to the TIMED GNS via a measurement of the TIMED disconnect switch time ($t_{dsw}$). The difference $T_{bias}^{dsw} \equiv t_{dsw} - \tau_{ins}$ is the error in time tagging the insertion event and is assumed to be small (at most a few seconds). The TIMED Guidance and Navigation System (GNS) position and velocity state vector is defined in the Conventional Inertial System (CIS). Therefore $w_{cst}^{nom}(t_{ins}^{nom})$ must be transformed into the CIS using a transformation valid at $t_{dsw}$:

$$w_{cis}^{gns}(t_{dsw}) = A(t_{dsw}) \cdot w_{cts}^{nom}(t_{ins}^{nom}) \qquad (104)$$

where:

$$A(t) = \begin{bmatrix} T_{cts}^{cis}(t) & 0 \\ 0 & T_{cts}^{cis}(t) \end{bmatrix} \begin{bmatrix} I & 0 \\ \{\omega_e x\} & I \end{bmatrix}.$$

The transformation from Earth-relative to inertial velocity is built-in to A(t). The synchronous error of the TIMED position and velocity state at $t_{dsw}$ is then:

$$\delta w_{cis}^{gns}(t_{dsw}) \equiv w_{cis}(\tau^{gns}(t_{dsw})) - w_{cis}^{gns}(t_{dsw})$$

$$\cong w_{cis}(\tau_{ins}) + \dot{w}_{cis}(\tau_{ins}) \cdot (\tau^{gns}(t_{dsw}) - \tau_{ins}) - A(t_{dsw}) \cdot w_{cts}^{nom}(t_{ins}^{nom})$$

$$= w_{cis}(\tau_{ins}) + \dot{w}_{cis}(\tau_{ins}) \cdot (\tau^{gns}(t_{dsw}) - t_{dsw} + t_{dsw} - \tau_{ins}) -$$

$$[A(t_{dsw}) + \dot{A}(t_{dsw}) \cdot (t_{dsw} - \tau_{ins})] \cdot w_{cts}^{nom}(t_{ins}^{nom})$$

$$= w_{cis}(\tau_{ins}) - A(\tau_{ins}) w_{cts}^{nom}(t_{ins}^{nom}) + w_{cis}(\tau_{ins}) \cdot (T_{bias}^{dsw} - T(t_{dsw})) -$$

$$A(\tau_{ins}) \cdot w_{cts}^{nom}(t_{ins}^{nom}) \cdot T_{bias}^{dsw}$$

where:

$$\dot{A}(t) = \begin{bmatrix} T_{cts}^{cis}(t)\{\omega_e x\} & 0 \\ 0 & T_{cts}^{cis}(t)\{\omega_e x\} \end{bmatrix} \begin{bmatrix} I & 0 \\ \{\omega_e x\} & I \end{bmatrix}$$

$T(t_{dsw}) \equiv t_{dsw} - \tau^{gns}(t_{dsw})$ $T_{bias}^{dsw} \equiv t_{dsw} - \tau_{ins}$ $\delta w_{cis}^{gns}$ has to be written in terms of the orbital insertion error defined in equation (103), since $w_{cis}(\tau_{ins}) = A(\tau_{ins}) \cdot w_{cts}(\tau_{ins})$:

$$\delta w_{cis}^{gns}(t_{dsw}) = A(\tau_{ins}) \cdot w_{cts}(\tau_{ins}) - A(\tau_{ins}) w_{cts}^{nom}(t_{ins}^{nom}) +$$

$$\dot{w}_{cis}(\tau_{ins}) \cdot (T_{bias}^{dsw} - T(t_{dsw})) - \dot{A}(\tau_{ins}) w_{cts}^{nom}(t_{ins}^{nom}) \cdot T_{bias}^{dsw}$$

$$= A(\tau_{ins}) \cdot \delta w_{cts}^{ins} + \dot{w}_{cis}(\tau_{ins}) \cdot (T_{bias}^{dsw} - T(t_{dsw})) -$$

$$\dot{A}(\tau_{ins}) \cdot w_{cts}^{nom}(t_{ins}^{nom}) \cdot T_{bias}^{dsw}$$

$$= A(\tau_{ins}) \cdot \delta w_{cts}^{ins} - \dot{w}_{cis}(\tau_{ins}) \cdot T(t_{dsw}) +$$

$$[\dot{w}_{cis}(\tau_{ins}) - \dot{A}(\tau_{ins}) w_{cts}^{nom}(t_{ins}^{nom})] \cdot T_{bias}^{dsw}$$

where $\dot{w}_{cis}(t_{dsw}) = f(w_{cis})(t_{dsw})$ is the model predicted rate of change of inertial position and velocity (largely driven by local gravity). Arranged in matrix form to clearly show the error source contributors as:

$$\begin{bmatrix} \delta_s w_{cis}^{gns}(t_{dsw}) \\ T(t_{dsw}) \end{bmatrix} = \begin{bmatrix} A(\tau_{ins}) & -\dot{w}(\tau_{ins}) & \dot{w}(\tau_{ins}) - \dot{A}(\tau_{ins}) \cdot w_{cts}^{nom}(t_{ins}^{nom}) \\ 0 & 1 & 0 \end{bmatrix} \begin{bmatrix} \delta w_{cts}^{ins} \\ T(t_{dsw}) \\ T_{bias}^{dsw} \end{bmatrix}$$

$$\cong \underbrace{\begin{bmatrix} A(t_{dsw}) & -\dot{w}(t_{dsw}) & \dot{w}(t_{dsw}) - \dot{A}(t_{dsw}) \cdot w_{cts}^{nom}(t_{ins}^{nom}) \\ 0 & 1 & 0 \end{bmatrix}}_{M} \begin{bmatrix} \delta w_{cts}^{ins} \\ T(t_{dsw}) \\ T_{bias}^{dsw} \end{bmatrix}$$

The following approximations have been used $$A(t_{dsw}) \cong A(\tau_{ins}) + \dot{A}(\tau_{ins})(t_{dsw} - \tau_{ins})$$
$$= A(\tau_{ins}) + \dot{A}(\tau_{ins}) T_{bias}^{dsw}$$

to substitute the computable $A_{(t_{dsw})}$, $\dot{w}_{(t_{dsw})}$ and $\dot{A}_{(t_{dsw})}$ for the corresponding quantities evaluated at (the unknown) $\tau_{ins}$, realizing that terms like $T_{bias}^{dsw}\dot{A}(\tau_{ins})\delta w_{cts}^{ins}$ are higher order. The covariance structure for the synchronous errors consistent with the initialization in equation (104) is then:

$$\begin{bmatrix} cov(\delta_s w_{cis}^{gns}) & cov(\delta_s w_{cis}^{gns}, T) \\ (\text{symmetric}) & cov(T) \end{bmatrix}_{t_{dsw}} = \quad (105)$$

$$M \begin{bmatrix} cov(\delta_s w_{cis}^{ins}) & 0 & 0 \\ 0 & cov(T) & cov(T, T_{bias}^{dsw}) \\ 0 & (\text{symmetric}) & cov(T_{bias}^{dsw}) \end{bmatrix}_{t_{dsw}} M_t$$

The actual correlation between the errors in the disconnect switch time tagging of the insertion time and the receiver clock error $(cov(T, T_{bias}^{dsw}))$ depends on whether and how recently the C&DH clock has been synchronized with the GNS 1 pps. It is assumed to be zero.

In addition to the initial setting of the position and velocity state vector, the system can reset the state vector by command based on NORAD radar tracking. This command consist of CIS position and velocity estimates along with a defined time of validity ($\tau_{upld}$).

The first step in implementing this upload is to transform the orbital elements provided by NORAD on its two-line element set format into the CIS position and velocity:

$$w_{cis}^{norad}(\tau_{upld}) = \xi(\theta, \tau_{upld}) \quad (106)$$

$$\delta w_{cis}^{norad}(\tau_{upld}) = \Xi \cdot \delta\theta$$

$$\text{where } \Xi = \frac{\partial \xi(\theta, \tau_{upld})}{\partial \theta}$$

$$cov(\delta w_{cis}^{norad}) = \Xi \cdot cov(\delta_p \theta) \cdot \Xi^t$$

where $\theta$ are the orbit-defining quantities in the two-line element set, and $\xi(\theta, \tau_{upld})$ is the nonlinear transformation implemented in SPG4 that takes these quantities into the inertial position and velocity at time $\tau_{upld}$. The derivative of the transformation $\Xi$ can be found analytically or by the numerical differentiation of SGP4. The error $\delta w_{cis}^{norad}(\tau_{upld})$ is not identified as synchronous or asynchronous because there is no error associated with $\tau_{upld}$ since it is a defined time at which the SGP4 transformation is evaluated. The error (if any) associated with time-tagging the NORAD epoch will propagate through the transformation $\xi(\bullet)$. In this case, the synchronous and asynchronous errors are equal, so a generic designator is used.

Since the Kalman filter time update propagates between receiver times, the time of validity must be transformed from a true time to a GNS receiver time, using the process illustrated below:

$$\hat{t}_{upld}^{gns} \leftarrow \tau^{-1}(\bullet) \leftarrow \tau_{upld}$$

where $\tau^{-1}(\bullet)$ is the inverse of the function that takes GNS reference times into their corresponding true times. Specifically, the GNS time corresponding to $\tau_{upld}$ is calculated from the relation:

$$\frac{t_k - \hat{t}_{upld}^{gns}}{\tau_k - \tau_{upld}} \cong 1 + \hat{\epsilon}_k$$

where:

$t_k$=current receiver time (know)

$\tau_k$=true time corresponding to $t_k$ $\tau_{upld}$=time of validity of uploaded state acording to NORAD $\hat{t}_{upld}^{gns}$=receiver clock reading corresponding to $\tau_{upld}$ $\hat{\epsilon}_k$=current estimate of receiver frequency bias which is solved for $\hat{t}_{upld}^{gns}$ to obtain:

$$\hat{t}_{upld}^{gns} \cong t_k - (\tau_k - \tau_{upld})(1 + \hat{\epsilon}_k) \quad (107)$$

$$\cong t_k - (\tau_k - \hat{T}_k - \tau_{upld})(1 + \hat{\epsilon}_k)$$

The foregoing completely defines the TIMED state upload. The position and velocity are given by:

$$w_{cis}^{gns}(\hat{t}_{upld}^{gns}) = w_{cis}^{norad}(\tau_{uplds})$$

and the start time for the time update ($t_{last}$) is set to $\hat{t}_{upld}^{gns}$ from equation (107).

The covariance matrix implied by this initialization process is derived s follows. The synchronous error of the GNS state is:

$$\delta_s w(t) \equiv w_{cis}(\tau(t)) - w_{cis}^{gns}(t)$$

$$\delta_s w(\hat{t}_{upld}^{gns}) = w_{cis}(\tau(\hat{t}_{upld}^{gns})) - w_{cis}^{gns}(\hat{t}_{upld}^{gns})$$

$$= w_{cis}(\tau_{upld}) - w_{cis}^{norad}(\tau_{upld})$$

$$= \delta_s w_{cis}^{norad}(\tau_{upld})$$

$$= \delta w_{cis}^{norad}(\tau_{upld})$$

indicating that the GNS inherits the synchronous error of the NORAD uplinked state vector, which is the generic error defined in equation (106). The appropriate transformation of the error state is then:

$$\begin{bmatrix} \delta_s w(\hat{t}_{upld}^{gns}) \\ T \end{bmatrix} = \begin{bmatrix} I & 0 \\ 0 & 1 \end{bmatrix} \begin{bmatrix} \delta w_{cis}^{norad} \\ T \end{bmatrix}$$

The appropriate transformation of covariance is:

$$\begin{bmatrix} cov(\delta_s w) & cov(\delta_s w, T) \\ (\text{symmetric}) & cov(T) \end{bmatrix}_{\hat{t}_{upld}^{gns}} = \begin{bmatrix} cov(\delta w_{cis}^{norad}) & 0 \\ (\text{symmetric}) & cov(T) \end{bmatrix}$$

The foregoing defines only the GNS position, velocity, and clock error covariance. Default values are used for the rest of the state space.

Short Term Propagator

The short term propagator creates the navigation data that is placed on the TIMED data bus every second. This short term data includes (in the order of calculation):
Data Validity Flags (5),
CIS frame Position and Velocity,
Time,
Sun Vector,
Geodetic Latitude, Longitude, Altitude,
East, North, Up Velocity,
Day/Night Event Notification Flag,
South Atlantic Anomaly (SAA) Event Notification Flag,
Polar Region Event Notification Flag,
Ground Station Event Notification Flags (GSENF)

The methodology used to create these data is described by the following derivations wherein reference is made to the dynamic propagation rutine, a primary part of the Kalman Filter (KF) that performs the time update for the KK Crank. This routine is capable of operating in both covariance propagation and non-covariance propagation modes.

During the short term propagation, the dynamic propagation routine operates in the noncovariance propagation mode.

These data are computed after the time update in each KF Crank interval. This is part of the "Cleanup" of the KF Crank interval. During each KF Crank, the short term data is computed for a 180 second interval beginning at the start time of the next KF Crank. Thus, the basic flow of the KF Crank for a single crank interval is:
KF Crank Start at $T_i$
Command Input
Measurement Update,
Time Update (TU) (state propagated to $T_{i+180}$)
Short Term Propagate (for $T_{i+180}$ to $T_{i+360}$)

In the following description, the short term data is valid for the period $T_{i+180}$ to $T_{i+360}$. The short term data cannot be created for the same interval as the KF Crank because the KF Crank takes longer than 1 second to complete. Therefore, the short term data for the for the first several seconds of the current interval is not available when it is needed.

The short term propagator begins with the propagated dynamic state vector $X^-$ (position(3), velocity(3), drag, clock, frequency), state vector derivative $\dot{X}^-$, and covariance factor matrix $\underline{L}^-$. These variables are created by the time update part of the KF Crank and are valid at time $T_{i+180}$. To simplify the notation, the superscript "$-$" denoting "before measurement" is dropped. Assuming $T_{so}=T_{i+180}$, the required calculations are:
Compute Data Validity Flags
Propagate State to $T_{i+180}$ and $T_{i+360}$
Compute Polynomial Fit Coefficients
First 180 Second Loop: at every second
    Compute X(t)
    Compute $T_{cis}^{cts}(t)$
    Compute Sun Vector
    Compute OTS Frame Position, Velocity, and Sun Vector
        Take $\Omega \times R$ out of velocity in $X_{cts}$
        Compute Geodetic Latitude, Longitude, and Altitude
        Compute East, North, Up Velocity
    Compute Day/Night Event Notification Flag
    Compute South Atlantic Anomaly Event Notification Flag
    Compute Polar Region Event Notification Flag
    Compute Ground Station Event Notification Flag (GSENF)

Second 180 Second Loop: at every second
    Compute X(t)
    Compute $T_{cis}^{cts}(t)$
    Compute GSENF
Shift GSENFs The data validity flags are computed using the $\underline{L}$ matrix. They are constant throughout the 180 second interval. The following values are used to compute the one sigma values:
The covariance matrix $\underline{P}=\underline{L}\cdot\underline{L}^T$ and that $\underline{L}$ is lower triangular. This means that the diagonal values of $\underline{P}$ are given by $$P(i,i) = \sum_{j=i}^{i} L(i,j)^2.$$

This yields the one sigma values for position, velocity and time. The data validity flags are then set from these one sigma values according to the following:

if all three $\sigma_{position}$ values are <the position validity value, the position and event validity flags are set to VALID, if all three $\sigma_{velocity}$ values are <the velocity validity value, the velocity valid velocity flag is set to VALID, if the σclock value is <the time validity value, the time and sun vector validity flags are set to VALID.

The same dynamic propagator that is used in the Time Update of the KF Crank is used to propagate the state to $T_{i+180}$ and $T_{i+360}$. (See equation (34) and the derivations leading thereto.) This gives state vectors and state derivative vectors at S0, S0+180(S1), and S0+360(S2). At. this point the system has the following information:
$X(S0)$, $\dot{X}(S0)$, $X(S1)$, $\dot{X}(S1)$, $X(S2)$, $\dot{X}(S2)$ The system requires short term data at a 1-Hertz rate, therefor the data is interpolated between S0, S1, and S2. This is accomplished by fitting a 5th order polynomial to the curve described by:
$X(S0)$, $\dot{X}(S0)$, $X(S1)$, $\dot{X}(S1)$, $X(S2)$, $\dot{X}(S2)$.

This structure is used to interpolate data for the state vector and the state vector derivative defined as follows:
For the state vector:

$$X(t)=A+B\cdot t+C\cdot t^2+D\cdot t^3+E\cdot t^4+F\cdot t^5 \tag{108}$$

For the state vector derivative:

$$\dot{X}(t)=B+2\cdot C\cdot t+3\cdot D\cdot t^2+4\cdot E\cdot t^3+5\cdot F\cdot t^4 \tag{109}$$

The interval between S0 and S1 is the same as the interval between S1 and S2 and denoted by I. By letting the time(t) for the above equations go from −180 to +180 instead of 0 to 360, the system can then use the following six equations to determine the six coefficients:

$$X(t=-I)=A-B\cdot I+C\cdot I^2-D\cdot I^3+E\cdot I^4-F\cdot I^5$$

$$\dot{X}(t=-I)=B-2\cdot C\cdot I+3\cdot D\cdot I^2-4\cdot E\cdot I^3+5\cdot F\cdot I^4$$

$$X(t=0)=A$$

$$\dot{X}(t=0)=B$$

$$X(t=I)=A+B\cdot I+C\cdot I^2+D\cdot I^3+E\cdot I^4+F\cdot I^5$$

$$\dot{X}(t=I)=B+2\cdot C\cdot I+3\cdot D\cdot I^2+4\cdot E\cdot I^3+5\cdot F\cdot I^4$$

This yields the following equations for the six coefficients:

$A = X(S1)$ $B = \dot{X}(S1)$ $C = (1/I^2) \cdot (X(S2) - 2 \cdot X(S1) + X(S0) - I \cdot \dot{X}(S2)/4 + I \cdot \dot{X}(S0)/4)$ $D = (1/(4 \cdot I^3)) \cdot (5 \cdot X(S2) - 5 \cdot X(S0) - 8 \cdot I \cdot \dot{X}(S1) - I \cdot \dot{X}(S2) + I \cdot \dot{X}(S0))$ $E = -(1/2 \cdot I^4) \cdot (X(S2) - 2 \cdot X(S1) + X(S0) - I \cdot \dot{X}(S2)/2 + I \cdot \dot{X}(S0)/2)$ $F = (1.0/(4 \cdot I^5)) \cdot (3 \cdot X(S2) - 3 \cdot X(S0) - 4 \cdot I \cdot \dot{X}(S1) - I \cdot \dot{X}(S2) + I \cdot \dot{X}(S0))$ The foregoing provides the coefficients required to compute X(t) at any point by looping through the first 180 second interval and proceeding as follows at each of the 180 ($t_{S0+1}$ to $t_{S0+180}$) points.

Using the previously described points, equation (108), $X(t) = A + B \cdot t + C \cdot t^2 + D \cdot t^3 + E \cdot t^4 + F \cdot t^5$, X(t) is computed each time (t) goes from −180 to 180 while the trajectory time goes from S0 to S0+180.

The same routine is used to compute $T_{cis}^{cts}$ that is used in the Dynamic Propagation Routine (see also equations (71) and (72) and the comments therefor).

The sun vector, $S_{cis}$, in conventional inertial system, CIS, coordinates is computed using the same routine that is used in the Dynamic Propagation Routine.

With $T_{cis}^{cts}$ and $S_{cis}$ computed, the system determines position, velocity and sun vector in the conventional terrestrial system, CTS, frame:

The position vector in the CTS frame is determined by:

$$P_{cts} = T_{cis}^{cts} \cdot X_{cis}(\text{position}) \qquad (110)$$

The velocity vector in the CTS frame is determined by transforming the coordinate system from CIS to CTS and removing the earths relative velocity from the inertial velocity. The velocity vector in the CTS frame is:

$$V_{cts} = T_{cis}^{cts} \cdot X_{cis}(\text{velocity}) - \Omega_{earth,cts} \times P_{cts} \qquad (111)$$

The matrix multiplication is eliminated because:

$$\Omega_{earth,cts} \times P_{cts} = \begin{bmatrix} 0 & -\omega_{earth} & 0 \\ \omega_{earth} & 0 & 0 \\ 0 & 0 & 0 \end{bmatrix} \cdot \begin{bmatrix} P_1 \\ P_2 \\ P_3 \end{bmatrix}$$

which simplifies the process and results in:

$(\Omega_{earth,cts} \times P_{cts})(1) = -\omega_{earth} \cdot P_{cts}(2)$ $(\Omega_{earth,cts} \times P_{cts})(2) = \omega_{earth} \cdot P_{cts}(1)$ $(\Omega_{earth,cts} \times P_{cts})(3) = 0$ The sun vector in the CTS frame is:

$$S_{cts} = T_{cis}^{cts} \cdot S_{cis} \qquad (112)$$

The Geodetic Latitude (lat) and Altitude are computed using a routine that is the same as used in the Dynamic Propagation Routine. The Longitude (ion) is computed using the standard C library routine atan2:

$$\text{longitude} = \alpha \tan 2(P_{cts}(y\_\text{axis}), P_{cts}(x\_\text{axis})) \qquad (113)$$

To compute the east, north, and up velocity, the system computes the transformation from CTS coordinates to East, Down, and North @ Equator (EDN) coordinates:

$$T_{cts}^{edn} = \begin{bmatrix} \cos(lon + \pi/2) & \sin(lon + \pi/2) & 0 \\ -\sin(lon + \pi/2) & \cos(lon + \pi/2) & 0 \\ 0 & 0 & 1 \end{bmatrix}$$

It then computes the transformation from EDN to East, North, Up (ENU) coordinates:

$$T_{edn}^{enu} = \begin{bmatrix} 1 & 0 & 0 \\ 0 & \cos(\pi/2 - lat) & \sin(\pi/2 - lat) \\ 0 & -\sin(\pi/2 - lat) & \cos(\pi/2 - lat) \end{bmatrix} \qquad (114)$$

$T_{cts}^{enu} = T_{edn}^{enu} \cdot T_{cts}^{edn}$ $V_{enu} = T_{edn}^{enu} \cdot V_{cts}$ The system uses the Geodetic Latitude, therefor "UP" is in the local vertical direction.

Because the normal to the surface in the ENU coordinate frame is given by the vector [0,0,1], the system transforms the vector to the CTS frame using:

$$U_{cts} = T_{enu}^{cts} \cdot \begin{bmatrix} 0 \\ 0 \\ 1 \end{bmatrix}$$

which provides:

$U_{cts}(1) = T_{enu}^{cts}(1,3) = T_{cts}^{enu}(3,1)$ $U_{cts}(2) = T_{enu}^{cts}(2,3) = T_{cts}^{enu}(3,2)$ $U_{cts}(1) = T_{enu}^{cts}(3,3) = T_{cts}^{enu}(3,3) \qquad (115)$ This provides a vector normal to the surface of the earth in the CTS coordinate frame. The system then creates: $D = U_{cts} \cdot S_{cts}$. If $U_{cts} \cdot S_{cts} \geq 0.0$, then the latitude and longitude point is in sunlight and the flag=1. When $U_{cts} \cdot S_{cts} < 0.0$, the flag=0.

The South Atlantic Anomaly, SAA is described in the GNS by 12 longitude and latitude points which are vertices, in clockwise order (looking down at the earth), of a convex polygon inside which lies the SAA. When these values are loaded into the KF database, the system computes vectors for each side using $S_i = V_{i+1} - V_i$, where $V_i = (\text{longitude}_i, \text{latitude}_i)$. These are longitude and latitude points (NOT latitude, an longitude) and are ready for use in the Short Term Propagation loop.

To determine if the spacecraft is within the SAA polygon, the system performs the following operations for each side of the SAA after setting the SAA event notification flag to 'EVENT'.

The spacecraft vector, $S_{SC,i}$, is computed using the previously computed spacecraft latitude and longitude ($\text{Lon}_{SC}$, $\text{Lat}_{SC}$), which is in the form of the vector from $V_i$ to the spacecraft location:

$$S_{SC,i} = (\text{Lon}_{SC}, \text{Lat}_{SC}) - V_i \qquad (116)$$

A z-coordinate (=0) is appended to each vector and used to successively compute the cross-product of a side of the SAA polygon with the spacecraft vector:

$$Q = S_i \times S_{SC,i} = \begin{bmatrix} 0 \\ 0 \\ Q_z \end{bmatrix} = \begin{bmatrix} 0 & 0 & S_{iy} \\ 0 & 0 & -S_{ix} \\ -S_{iy} & S_{ix} & 0 \end{bmatrix} \begin{bmatrix} S_{SC,ix} \\ S_{SC,iy} \\ 0 \end{bmatrix} \quad (117)$$

The system uses the right hand rule, i.e., if $Q_z>0$ the spacecraft lies outside the SAA and the SAA Event Notification flag is set to 'NO-EVENT'. The system then exits the loop.

The Compute Polar Region Event Notification flag is set using a simple comparison, i.e., if |Latitude|≧Value, the flag is set to 1.

The location of each ground station is described by a latitude and longitude. When these values are loaded into the KF Database, the system computes CTS coordinates $V_{GSi,cts}$ for each of the ground stations using the ground station latitude and longitude and an altitude 0. It then computes the CTS vector $N_{GSi,cts}$ normal to the surface of the earth at the ground station coordinates using the following steps:

Multiplying the two matrices of equation (114) reduces the operation to:

$$\theta = \frac{\pi}{2} - lat$$

$$\phi = lon + \frac{\pi}{2}$$

$$T_{cts}^{enu} = \begin{bmatrix} \cos(\phi) & \sin(\phi) & 0 \\ -\cos(\theta)\sin(\phi) & \cos(\theta)\cos(\phi) & \sin(\theta) \\ \sin(\theta)\sin(\phi) & -\sin(\theta)\cos(\phi) & \cos(\theta) \end{bmatrix}$$

The normal to the surface in the ENU coordinate frame is given by the vector [0,0,1] as established by equation (115). The vector is transformed to the CTS frame $$N_{GSi,cts} = T_{enu}^{cts} \cdot \begin{bmatrix} 0 \\ 0 \\ 1 \end{bmatrix}.$$

This yields:

$$N_{GSi,cts}(1)=T_{enu}^{cts}(1,3)=T_{cts}^{enu}(3,1)=\sin(\theta)\sin(\phi)$$

$$N_{GSi,cts}(2)=T_{enu}^{cts}(2,3)=T_{cts}^{enu}(3,2)=-\sin(\theta)\cos(\phi)$$

$$N_{GSi,cts}(3)=T_{enu}^{cts}(3,3)=T_{cts}^{enu}(3,3)=\cos(\theta) \quad (118)$$

The values are now ready for use in the Short Term Propagation loop. To determine if the spacecraft is above the horizon relative to each ground station, the system computes the dot product of the vector from the ground station to the spacecraft and the ground station normal vector: $D=(P_{cts}-V_{GSi,cts})\cdot N_{GSi,cts}$ If $D \geq 0$, the spacecraft is at or above the horizon and the GSENF is 1.

The system computes the second 180 second loop using the previously described operations, i.e.:

X(t) is computed each time (t) goes from −180 to 180 while the trajectory time goes from S0 to S0+180.

$$X(t)=A+B\cdot t+C\cdot t^2+D\cdot t^3+E\cdot t^4+F\cdot t^5$$

The same routine is used to compute $T_{cis}^{cts}$ that is used in the first 180 second loop.

The same routine, equation (118), that is used in the first 180 second loop is used to compute the GSENF.

The system then shifts the GSENF as the short term propagation continues to provide GSENFs for each ground station for a period of 360 seconds. The extra 180 seconds allows the system to predict rise or set times up to 180 seconds in advance of the time it outputs the data. The GSENFs which are output may need to be set before the spacecraft rises above the horizon and may need to be unset before the spacecraft has set below the horizon to satisfy Rise/Set Lead Time requirements. The system predicts rise time so that instruments on board the satellite can be ready to send data when the satellite rises above the horizon instead of spending time gaining acquisition to the ground station. The system also computes set lead time so that the satellite may know when to start shutting down the data transmission sequence. The time shifts for the Rise Lead Time $R_{lt}$ and Set Lead Time $S_{lt}$ are GNS parameters.

For example, if $R_{lt}$=4 seconds and the GSENFs are 0 0 0 0 0 0 1 1 1 1 . . . 1 1 1 the time shifted GSENFs are 0 0 0 1 1 1 1 1 1 1 . . . 1 1 1

Or if $R_{lt}$=5 and the GSENFs are 1 1 1 1 . . . 1 1 1 1 1 1 1 0 0 the time shifted GSENFs are 1 1 1 1 . . . 1 1 1 0 0 0 0 0 0 0

There are several situations that can occur in the stream of GSENFs during the 360 second interval.

1) There are no GSENFs set. These flags do not need to be modified for Rise/Set Lead Times.
2) The GSENF stream started unset, changed to set and stayed set for the remainder of the interval. These flags need to be modified as in the first example above.
3) The GSENF stream started set, changed to unset aud stayed unset for the remainder of the interval. These flags need to be modified as in the second example above.
4) The GSENF stream started unset, changed to set, and changed back to unset. These flags need to be modified, first, as in the first example, and next, as in the second example 2. The system performs the modifications in that order to cover the situation in which the GSENFs are set for a period of time$\leq S_{lt}-R_{lt}$.

The foregoing is considered as illustrative only of the principles of the invention. Since numerous modifications and changes will readily occur to those skilled in the art, it is not desired to limit the invention to the exact construction and applications shown and described. Accordingly, all suitable modifications and equivalents may be resorted to and are considered to fall within the scope of the invention and the appended claims and their equivalents.

What is claimed is:

1. A method for orbital platform navigation, including the steps of:

sensing the data transmitted by a plurality of global positioning system satellites; sampling said sensed transmitted data at a plurality of interrupts generated by a Measurement Interrupt Clock (MIC), the timing of said plurality of interrupts being controlled by a software implemented Kalman filter to occur as close as possible to Universal Coordinated Time (UCT) time tics at steady state;

determining from said sampled sensed transmitted data through the application of said Kalman filter, data defining current time and position and velocity of said orbital platform; and initiating and controlling the operation of systems on-board said orbital platform based on said data defining current time and position and velocity.

2. A method for orbital platform navigation as defined by claim 1, wherein said Kalman filter utilizes previously determined data defining time and position and velocity when performing said step of determining from said sensed transmitted sampled data, current time and position and velocity.

3. A method for orbital platform navigation as defined by claim 2, wherein said step of determining current time and position and velocity includes steps executed by said Kalman filter of calculating a square-root covariance form.

4. A method for orbital platform navigation as defined by claim 3, wherein said Kalman filter performs the steps of determining the measurement of slant range from said orbital platform to each of said global positioning system satellites providing data used in determining said data defining current time and position and velocity.

5. A method for orbital platform navigation as defined by claim 4, wherein said plurality of global positioning system satellites comprise at least three satellites.

6. A method for determining orbital platform navigation as defined by claim 5, wherein said Kalman filter performs the steps of providing a plurality of state space determinations arranged in first and second partitions; said first partition including states which directly determined the orbital platform position, velocity, drag parameter error, receiver clock and frequency bias; and said second partition includes states not directly affecting position and time.

7. A method for orbital platform navigation as defined by claim 6, wherein said steps of providing a plurality of state space determinations include the steps of:
calculating a position state space;
calculating a velocity state space;
calculating a drag parameter error state space;
calculating a clock error state space;
calculating a frequency error state space;
calculating a selective availability and Markov process state space; and
calculating an integrated carrier phase bias state space.

8. A method for orbital platform navigation as defined by claim 6, wherein said steps of providing a plurality of state space determinations include the steps of:
calculating three position state spaces;
calculating three velocity state spaces;
calculating a drag parameter error state space;
calculating a clock error state space;
calculating a frequency error state space;
calculating 24 selected availability and Markov process state spaces; and
calculating 12 integrated carrier phase bias state spaces.

9. A method for orbital platform navigation as defined by claim 6, wherein said steps of providing a plurality of state space determinations include the steps of:
calculating a plurality of dynamic states including, a position state space, a velocity state space, a drag parameter error state space, a clock error state space, and a frequency error state space; and
dynamically coupling said dynamic states to each other.

10. A method for orbital platform navigation as defined by claim 3, wherein said Kalman filter performs said step of updating said data defining current time by executing steps propagating the state and covariance between measurements.

11. A method for orbital platform navigation as defined by claim 9, wherein said step of propagating the state uses time as an independent variable.

12. A method for orbital platform navigation as defined by claim 3, wherein said steps of determining current time and position and velocity include update steps executed by said Kalman filter comprised of propagating state and covariance from the present to the next anticipated measurement for the dynamic states of position, velocity, drag, and clock, each of which is expressed as a function $\dot{X}_{dyn}=f(X_{dyn},t)$ where t equals time, according to the nonlinear function $$F_{dyn} \equiv \frac{\partial f_{dyn}}{\partial x_{dyn}}$$

where the covariance is F.

13. A method for orbital platform navigation as defined by claim 12, wherein the deterministic part of said covariance factor F used in performing said update steps is defined by $$\bar{P}_{k+1/k}^{1/2} = P_{k/k}^{1/2} \cdot (\Phi(t_{k+1}, t_k))^t,$$

where $$\bar{P}_{k+1/k}^{1/2}$$

is the state error covariance after a deterministic update and prior to a stochastic update.

14. A method for orbital platform navigation as defined by claim 13, including the Kalman filter executed steps of propagating state and covariance from the present to the next anticipated measurement for the states and biases which obey linear dynamics according to the function $$\Phi_{pdr}(t_{k+1},t_k)=S1(t_{k+1},t_k).$$

15. A method for orbital platform navigation as defined by claim 14, wherein said states and biases which obey linear dynamics include availability states for said global positioning system satellites and phase biases.

* * * * *